(12) United States Patent
Kubo et al.

(10) Patent No.: US 7,926,752 B2
(45) Date of Patent: Apr. 19, 2011

(54) RECORDING MEDIUM DESTRUCTION AND DISCARDING SYSTEM, RECORDING MEDIUM DESTRUCTION AND DISCARDING METHOD, RECORDING MEDIUM DESTRUCTION AND DISCARDING APPARATUS, RECORDING MEDIUM MANAGEMENT APPARATUS, AND RECORDING MEDIUM MANAGEMENT SYSTEM

(75) Inventors: Shusaku Kubo, Kanagawa (JP); Ryuuichi Shiraishi, Kanagawa (JP); Kengo Shinozaki, Kanagawa (JP); Shunsuke Hamasuna, Kanagawa (JP); Hitoshi Suzuki, Kanagawa (JP); Hiroyoshi Uejo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 750 days.

(21) Appl. No.: 11/513,195

(22) Filed: Aug. 31, 2006

(65) Prior Publication Data

US 2007/0057099 A1 Mar. 15, 2007

Related U.S. Application Data

(63) Continuation-in-part of application No. 11/404,804, filed on Apr. 17, 2006, now Pat. No. 7,665,679.

(30) Foreign Application Priority Data

| Sep. 9, 2005 | (JP) | 2005-262133 |
| Oct. 12, 2005 | (JP) | 2005-297283 |
| Oct. 12, 2005 | (JP) | 2005-297284 |
| Oct. 12, 2005 | (JP) | 2005-297285 |
| Jan. 31, 2006 | (JP) | 2006-023725 |

(51) Int. Cl.
*B02C 25/00* (2006.01)

(52) U.S. Cl. ........ 241/36; 241/100; 241/101.2
(58) Field of Classification Search ........... 241/101.2, 241/36, 236, 100; 358/1.14; 707/100, 101, 707/200, 204; 235/375, 476
See application file for complete search history.

(56) References Cited

U.S. PATENT DOCUMENTS

| 5,467,169 A | 11/1995 | Morikawa | |
| 5,813,009 A * | 9/1998 | Johnson et al. | 707/100 |
| 6,763,997 B2 | 7/2004 | Bennett et al. | 235/375 |
| 2003/0146275 A1 | 8/2003 | Bennett et al. | 235/376 |
| 2004/0188512 A1 | 9/2004 | Ikeda | |
| 2006/0274352 A1 | 12/2006 | Nakaguma et al. | |
| 2006/0285147 A1 | 12/2006 | Wolfman et al. | 358/1.14 |

FOREIGN PATENT DOCUMENTS

| CN | 1229489 A | 9/1999 |
| CN | 1542674 A | 11/2004 |
| DE | 196 09 435 A1 | 9/1996 |
| EP | 0 447 581 A1 | 9/1991 |

(Continued)

*Primary Examiner* — Mark Rosenbaum
(74) *Attorney, Agent, or Firm* — Morgan, Lewis & Bockius LLP

(57) ABSTRACT

A recording medium destruction and discarding system for destroying and discarding a recording medium, includes: a registration unit that registers an identification information appended to the recording medium associated with an attribute information of the recording medium; a reading unit that reads the identification information appended to the recording medium; a determination unit that determines whether or not the recording medium may be destroyed and discarded based on the attribute information registered in the registration unit associated with the identification information read by the reading unit; and a destruction and discarding processing unit that performs a destruction and discarding process based on the determination result of the determination unit.

44 Claims, 52 Drawing Sheets

FOREIGN PATENT DOCUMENTS

| | | |
|---|---|---|
| EP | 0 505 109 A1 | 9/1992 |
| EP | 1 462 988 A1 | 9/2004 |
| JP | 5-298160 | 11/1993 |
| JP | 08-328683 | 12/1996 |
| JP | 11-085577 | 3/1999 |
| JP | 2000-42440 | 2/2000 |
| JP | 2002-024076 | 1/2002 |
| JP | 2003-062476 | 3/2003 |
| JP | 2003-196429 | 7/2003 |
| JP | 2004-310144 | 11/2004 |
| JP | 2005-190365 | 7/2005 |
| JP | 2005-244600 | 9/2005 |
| JP | 2005-262135 | 9/2005 |
| JP | 2006-102572 | 4/2006 |
| JP | 2007-4431 | 1/2007 |
| WO | 98/58321 | 12/1998 |

* cited by examiner

FIG. 8

| DOCUMENT ID | DOCUMENT CREATION DATE & TIME | DOCUMENT STORAGE TIME | DOCUMENT DESCTRUCTION DATE & TIME |
|---|---|---|---|
| 0000000001 | 1998.5.31 14:00 | 2004.5.31 14:00 | 2004.6.15 11:32 |
| 0000000002 | 1998.6.12 10:30 | 2001.6.12 10:30 | 2001.6.30 16:09 |
| ... | ... | ... | ... |
| 0000012345 | 2000.10.20 9:55 | NON-DESIGNATED | 2000.8.26 10:38 |
| 0000012346 | 2000.10.25 8:55 | PERMANENT | — |
| ... | ... | ... | ... |
| 0000123456 | 2002.8.15 13:46 | 2005.8.15 13:46 | UNDESTROYED |
| ... | ... | ... | ... |

FIG. 21

| DOCUMENT ID | DOCUMENT CREATION DATE & TIME | DOCUMENT STORAGE TIME | DOCUMENT DESCTRUCTION DATE & TIME |
|---|---|---|---|
| 0000000001 | 1998.5.31 14:00 | 2004.5.31 14:00 | 2004.6.15 11:32 |
| 0000000002 | 1998.6.12 10:30 | 2001.6.12 10:30 | 2001.6.30 16:09 |
| ... | ... | ... | ... |
| 0000012345 | 2000.10.20 9:55 | NON-DESIGNATED | 2000.8.26 10:38 |
| 0000012346 | 2000.10.25 8:55 | PERMANENT | — |
| ... | ... | ... | ... |
| 0000123456 | 2002.8.15 13:46 | 2005.8.15 13:46 | UNDESTROYED |
| ... | ... | ... | ... |

FIG. 34

| DOCUMENT ID | DOCUMENT CREATION DATE & TIME | DOCUMENT STORAGE TIME | DOCUMENT DESTRUCTION DATE & TIME |
|---|---|---|---|
| 0000000001 | 1998.5.31 14:00 | 2004.5.31 14:00 | 2004.6.15 11:32 |
| 0000000002 | 1998.6.12 10:30 | 2001.6.12 10:30 | 2001.6.30 16:09 |
| ... | ... | ... | ... |
| 0000012345 | 2000.10.20 9:55 | NON-DESIGNATED | 2000.8.26 10:38 |
| 0000012346 | 2000.10.25 8:55 | PERMANENT | — |
| ... | ... | ... | ... |
| 0000123456 | 2002.8.15 13:46 | 2005.8.15 13:46 | UNDESTROYED |
| ... | ... | ... | ... |

RECORDING MEDIUM DESTRUCTION AND DISCARDING SYSTEM, RECORDING MEDIUM DESTRUCTION AND DISCARDING METHOD, RECORDING MEDIUM DESTRUCTION AND DISCARDING APPARATUS, RECORDING MEDIUM MANAGEMENT APPARATUS, AND RECORDING MEDIUM MANAGEMENT SYSTEM

CROSS-REFERENCE TO RELATED APPLICATIONS

This application is a continuation-in-part of U.S. patent application Ser. No. 11/404,804 filed Apr. 17, 2006 now U.S. Pat. No. 7,665,679, which is hereby incorporated by reference.

BACKGROUND

1. Technical Field

The present invention relates to a recording medium management system, a recording medium management apparatus, a recording medium destruction and discarding apparatus and a recording medium destruction and discarding method, which are suitably applied in managing the recording medium such as a document.

2. Related Art

Generally, confidential documents, such as documents intended for use only in a section or a company, are frequently handled in corporate offices and public institutions, such as a city office. Originals of such confidential documents are stored under strict control to prevent confidential information from being leaked. Further, confidential documents rendered unnecessary are destroyed by using a shredder or the like.

A storage times are designated for most of accounting documents, such as debit notes, receipts, and statements of account. Thus, in a case where confidential documents are destroyed by being shredded, it is necessary for a person in charge to check in advance according to an original ledger whether the confidential document to be destroyed can really be destroyed.

However, in the case of destroying a large amount of confidential documents, it is very troublesome and time-consuming to perform document destruction by checking the storage times of the confidential documents one by one. Additionally, there is a fear that a confidential document having a remaining storage time may be destroyed by mistake due to human error.

Thus, in JP-A-2002-368966, there was described a scanner apparatus with a shredder function comprising image reading means for reading the papers, image storage means for storing the read image data, image data retention means for retaining the stored image data, and cutting means for cutting the papers after retaining the papers as image data. With this scanner apparatus, even if a confidential document with a storage period left is destroyed and discarded by mistake, an image of the confidential document can be retained as electronic data.

SUMMARY

However, since only one script exists for the confidential document, the original script can not be reproduced, even if the image of the confidential document is retained as electronic data employing the above prior art. Accordingly, it is not possible to omit a troublesome confirmation operation in destroying and discarding the confidential document. Also, it is not possible to avoid a false destruction and discarding due to an artificial confirmation error.

According to an exemplary embodiment, a recording medium destruction and discarding system for destroying and discarding a recording medium, includes: a registration unit that registers an identification information appended to the recording medium associated with an attribute information of the recording medium; a reading unit that reads the identification information appended to the recording medium; a determination unit that determines whether or not the recording medium may be destroyed and discarded based on the attribute information registered in the registration unit associated with the identification information read by the reading unit; and a destruction and discarding processing unit that performs a destruction and discarding process based on the determination result of the determination unit.

According to another exemplary embodiment, a recording medium destruction and discarding method for destroying and discarding a recording medium of destruction and discarding object, the method includes: registering an identification information appended to the recording medium associated with an attribute information of the recording medium; reading the identification information appended to the recording medium; determining whether or not the recording medium may be destroyed and discarded based on the attribute information registered at the registering step associated with the identification information read at the reading step; and performing a destruction and discarding process based on the determination result obtained at the determining step.

According to another exemplary embodiment, a recording medium management system, includes: a recording medium destruction and discarding apparatus that destroys and discards a recording medium of destruction and discarding object; and a recording medium management apparatus connected to the recording medium destruction and discarding apparatus via a communication line; wherein the recording medium destruction and discarding apparatus includes: a reading unit that reads the identification information appended to the recording medium, a transmitting unit that transmits the identification information read by the reading unit to the recording medium management apparatus, a receiving unit that receives a determination result as to whether or not the recording medium may be destroyed and discarded from the recording medium management apparatus, and a destruction and discarding processing unit that performing a destruction and discarding process based on the determination result received by the receiving unit; and the recording medium management apparatus includes: a registration unit that registers the identification information appended to the recording medium associated with an attribute information of the recording medium, a receiving unit that receives the identification information from the recording medium destruction and discarding apparatus, a determination unit that determines whether or not the recording medium may be destroyed and discarded based on the attribute information registered in the registration unit associated with the identification information received by the receiving unit, and a transmitting unit that transmits the determination result obtained by the determination unit to the recording medium destruction and discarding apparatus.

According to another exemplary embodiment, a recording medium destruction and discarding apparatus for destroying and discarding a recording medium, the recording medium destruction and discarding apparatus being connected via a communication line to a recording medium management apparatus having a registration unit for registering an identification information appended to the recording medium of destruction and discarding object associated with an attribute information of the recording medium, the recording medium destruction and discarding apparatus includes: a reading unit that reads the identification information appended to the recording medium; a transmitting unit that transmits the identification information read by the reading unit to the recording medium management apparatus; a receiving unit that receives the determination result whether or not the recording medium may be destroyed and discarded from the recording medium management apparatus; and a destruction and discarding processing unit that performs a destruction and discarding process based on the determination result.

According to another exemplary embodiment, a recording medium management apparatus connected via a communication line to a recording medium destruction and discarding apparatus for destroying and discarding a recording medium of destruction and discarding object, includes: a registration unit that registers an identification information appended to the recording medium associated with an attribute information of the recording medium; a receiving unit that receives the identification information from the recording medium destruction and discarding apparatus; a determination unit that determines whether or not the recording medium may be destroyed and discarded based on the attribute information registered in the registration unit associated with the identification information received by the receiving unit; and a transmitting unit that transmits the determination result obtained by the determination unit to the recording medium destruction and discarding apparatus.

According to another exemplary embodiment, a recording medium destruction and discarding system for destroying and discarding a recording medium of destruction and discarding object, includes: an attribute information reading unit that reads an attribute information appended to the recording medium; a determination unit that determines whether or not the recording medium may be destroyed and discarded based on the attribute information read from the attribute information reading unit; and a destruction and discarding processing that performs a destruction and discarding process based on the determination result of the determination unit.

BRIEF DESCRIPTION OF THE DRAWINGS

Exemplary embodiments may be described in detail with reference to the accompanying drawings, in which:

FIG. 8 is a view showing one example of a document management table.

FIG. 21 is a view showing one example of a document management table.

FIG. 34 is a view showing one example of the document management table.

DETAILED DESCRIPTION

The specific embodiments of the present invention will be described below with reference to the drawings.

<Overall Configuration>

Figure 1:
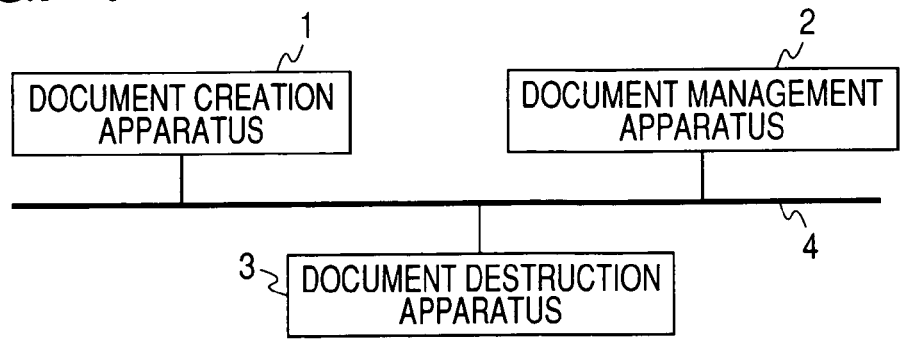
FIG. 1 is a diagram showing the configuration of a document management system according to one form of the present invention.

FIG. 1 is a diagram illustrating the configuration of a document management system according to an embodiment of the invention. The illustrated document management system includes a document creation apparatus 1, a document management apparatus 2, and a document destruction apparatus 3. The document creation apparatus 1, the document management apparatus 2, and the document destruction apparatus 3 are connected to a common network 4. The document creation apparatus 1 is configured to create a document (a paper document) to which a document ID is added. The document management apparatus 2 is configured to perform various management processes on the document created by the document creation apparatus 1. The document destruction apparatus 3 is configured to perform the destruction of the document created by the document creation apparatus 1 and other documents. The network 4 is constituted by using, for example, a LAN (Local Area Network) or a WAN (Wide Area Network).

<Document Generation Apparatus>

Figure 2:
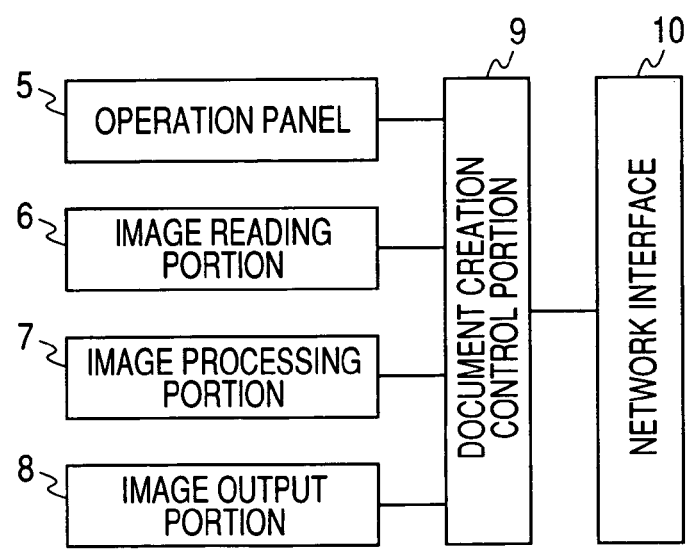
FIG. 2 is a block diagram showing a configuration example of a document generation apparatus.

FIG. 2 is a block diagram illustrating an example of the configuration of the document creation apparatus 1. The document creation apparatus 1 is constituted by using, for example, a digital copier, a digital composite machine (a multifunctional copier), or the like. The document creation apparatus 1 is constituted by using an operation panel 5, an image reading portion 6, an image processing portion 7, an image output portion 8, a document creation control portion 9, and a network interface 10.

The operation panel 5 (for the document creation apparatus 1) serves as a user interface through which a user using the document creation apparatus 1 inputs various information and which diverse information is displayed to users. The operation panel 5 includes an input portion, which has, for instance, various buttons, switches, and keys, and a display portion including a liquid display device with a touch panel.

The image reading portion 6 is adapted to optically read an original image to be read. The image reading portion 6 is configured so that light is irradiated onto a surface of an original set on a transparent original table (a platen glass), that reflection light coming from the surface of the original is read through an imaging optical system including a mirror and a lens, and that an image is formed on a light receiving surface of a reading sensor, such as a CCD sensor, thereby to generate image data (scan data) corresponding to an image of an original. At that time, a surface of the original is read and scanned by movement of the imaging optical system.

The image processing portion 7 performs predetermined image processing (for example, color conversion, color correction, tone correction, scaling, image rotation, or screen generation) on the image data representing the original read by the image reading portion 6.

The image output portion 8 outputs the image data, which has been read by the image reading portion 6 and has undergone the image processing at the image processing portion 7, by printing the image data on a recording medium, such as a sheet of paper. The image output portion 8 prints the image data according to, for example, an electrophotographic method.

The document creation control portion 9 controls various processing operations relating to the document creation. The document creation control portion 9 controls processing operations of the operation panel 5, the image reading portion 6, the image processing portion 7, and the image output portion 8 according to a preliminarily installed control program.

The network interface 10 is a communication interface through the document creation apparatus 1 transmits and receives data to and from other apparatuses, which include the document management apparatus 2 and the document destruction apparatus 3, on the network 4. The data transmission and reception using the network interface 10 are controlled by the document creation control portion 9.

<Document Management Apparatus>

Figure 3:
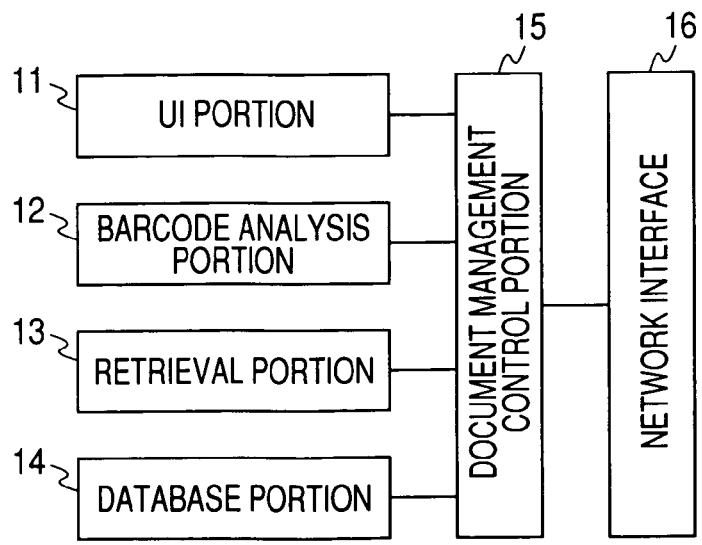
FIG. 3 is a block diagram showing a configuration example of a document management apparatus.

FIG. 3 is a block diagram illustrating an example of the configuration of the document management apparatus 2. The document management apparatus 2 is constituted by using, for example, a personal computer. The document management apparatus 2 is also constituted by using a user interface portion (a UI portion) 11, a barcode analysis portion 12, a retrieval portion 13, a database portion 14, a document management control portion 15, and a network interface 16.

The user interface portion 11 serves as a user interface through the through which a user using the document management apparatus 2 inputs various information and which diverse information is displayed to users. The user interface portion 11 includes an input device, such as a keyboard, and a mouse, and also includes a display device, such as a liquid display device.

The barcode analysis portion 12 analyzes a barcode included in image data (scan data) and performs decoding processing thereon. The barcode to be analyzed by the barcode analysis portion 12 is included in image data obtained when the image of a document with a barcode is read by the document creation apparatus 1. This barcode represents information including at least a document ID. Generally, barcodes are roughly classified into a class of one-dimensional barcodes, whose bars arranged only in one direction represent information, and that of two-dimensional barcodes whose bars arranged in two directions represent information. Both classes of barcodes can be utilized when the invention is implemented. Incidentally, in a case where one barcode includes various information and data in addition to the document ID, it is advisable to use a two-dimensional barcode having larger data capacity, as compared with a one-dimensional barcode. In the present embodiment, it is assumed that a QR-code (registered trademark), which is a kind of a two-dimensional barcode and is in widespread use, is used as an example.

The retrieval portion 13 performs the retrieval of data stored in the database portion 14. The database portion 14 stores various data. The database portion 14 is constituted by using, for example, a hard disk drive.

The document management control portion 15 controls various processing operations relating to document management. The document management control portion 15 controls processing operations of the user interface portion 11, the bar code analysis portion 12, the retrieval portion 13 and the database portion 14 according to a preliminarily installed control program.

The network interface 16 is a communication interface through which data transmission and reception to and from other apparatuses (including the document creation apparatus 1 and the document destruction apparatus 3) on the network 4 are performed. The data transmission and reception using the network interface 16 are controlled by the document management control portion 15.

First Mechanical Embodiment

<Document Destruction and Discarding Apparatus>

Figure 4:
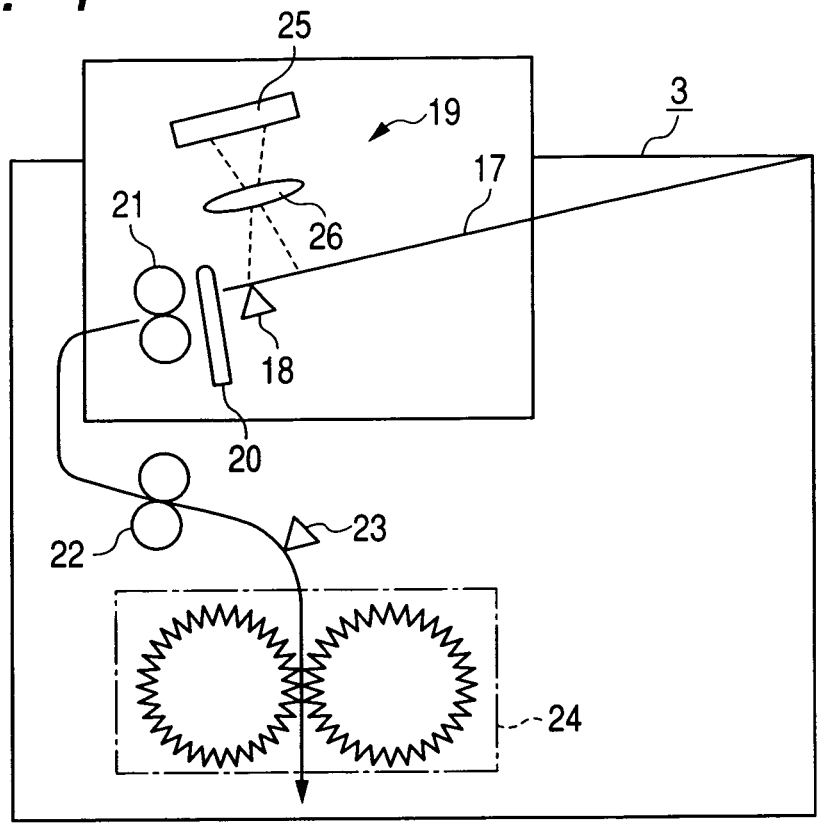
FIG. 4 is a schematic view showing a document destruction and discarding apparatus according to a first mechanical embodiment.

FIG. 4 is a schematic diagram illustrating a first example of the mechanism of the document destruction apparatus 3. The document destruction apparatus 3 is constituted by using, for instance, a shredder. The document destruction apparatus 3 includes a document tray portion 17, an insertion sensor 18, a reading optical system 19 of a barcode reader, a stopper gate 20, feed rolls 21 and 22, a pass sensor 23, and a shredder portion 24.

The document tray portion 17 serves as a part on which a document to be destroyed is placed. The document tray portion 17 is formed to be inclined to a horizontal plane and to become gradually lowered toward the stopper gate 20. An inner side (a lower side) of the document tray portion 17, together with the insertion sensor 18, the reading optical system 19, the stopper gate 20, and the feed roll 21, are covered with a cover member (not shown).

The insert sensor 18 senses that the document is inserted at a predetermined position on the document tray portion 17. The "predetermined position" means the position where the Q code is arranged in a code reading area with the bar code scanner 19, namely, the position where the QR code printed on the document can be read by the bar code scanner 19, when the document with the QR code printed is inserted in the normal orientation. The insert sensor 18 is composed of an optical sensor of the reflection type having a light emitting element and a light receiving element, for example, and turned on when the document exists at a sensing position of the insert sensor 18, or turned off when no document exists.

The bar code scanner 19 takes an image of the bar code into an area sensor 25 by applying the light of a light source, not shown, to a bar code recorded part of the document of destruction and discarding object and receiving a reflected light from the bar code recorded part via a lens 26 with the area sensor 25. The bar code recorded part refers to the part where the bar code including the document ID as one information is recorded within the plane of the document, in which its position (area) is defined beforehand dimensionally at the corner part of the document.

The stopper gate 20 has a long plate-like structure, for example, and is provided between the insert sensor 18 and the feed rolls 21. The stopper gate 20 opens or closes a document conveying path at an entrance part of the document conveying path formed by the feed rolls 21 and 22. In a state where the stopper gate 20 is closed, the stopper gate 20 is disposed to project over a passage of the document leading from the document tray portion 17 to the feed rolls 21 to block the passage. Accordingly, when the document laid on the document tray portion 17 is inserted deeply, the leading edge of the document is pushed against the stopper gate 20. Therefore, if the stopper gate 20 is closed, the document is pushed against the stopper gate 20 and prevented from being taken into the apparatus, even when the user thrusts the document carelessly. Also, it is desirable that the stopper gate 20 is pushed at least two points of the document in the width direction (or direction orthogonal to the document insertion direction) or over the entire width so that the document may not be subjected to a useless inclination or rotational force when the document is pushed against the stopper gate 20. On the contrary, in a state where the stopper gate 20 is opened, the stopper gate 20 is withdrawn from the passage to retreat from the passage of document leading from the document tray 17 to the feed rolls 21. Accordingly, if the document laid on the document tray portion 17 is inserted more deeply, the leading edge of the document is pushed against the nip part of the feed rolls 21.

Figure 5:
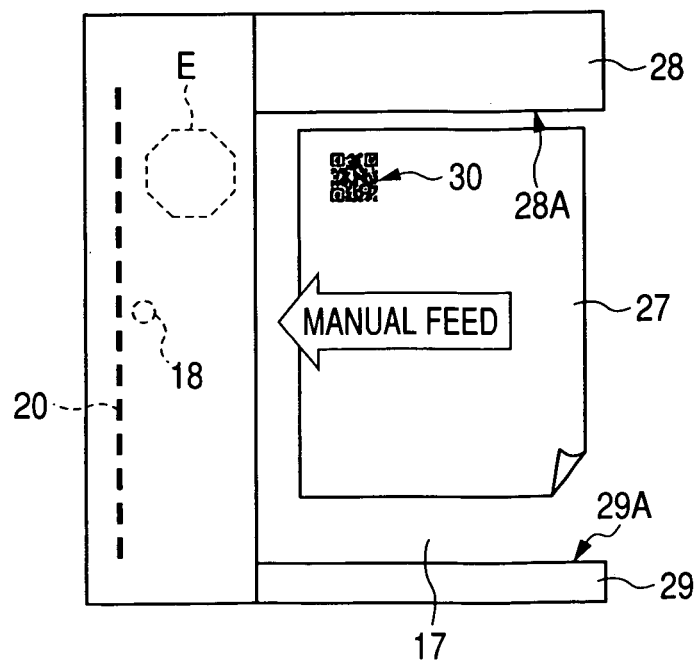
FIG. 5 is a view of a document tray section, as seen from the above.

FIG. 5 is a diagram illustrating the document tray portion 17, which is taken from above. Insertion guides 28 and 29 are provided on both sides in an insertion direction (the direction of an arrow), in which the document 27 is manually inserted, of the document tray portion 17. The insertion guides 28 and 29 have guide faces 28A and 29A, each of which is parallel to the insertion direction of the document, respectively. Between the insertion guides, the insertion guide 28 is provided in a fixed state. However, the insertion guide 29 is provided movably in the direction of width of the document (an up-down direction, as viewed in FIG. 5) according to need. The document 27 to be destroyed is inserted in the direction of the arrow into the document tray portion 17 in an orientation in which the barcode recording part 30 is placed at a leading-end-side corner portion thereof. At that time, to position the document 27 in a direction perpendicular to the insertion direction, one side edge of the document 27 is made to abut against and move along the guide face 28A of the insertion guide 28.

Consequently, in a state in which the document 27 is manually fed by the user so that the end thereof abuts against the stopper gate 20, the barcode recording part 30 is positioned in a code reading area E in which a barcode is read by the barcode reader. Also, the insertion sensor 18 is placed just short of the stopper gate 20. Thus, when an end of the document 27 manually fed by the user abuts against the stopper gate 20, the state of the insertion sensor 18 is changed from an off-state to an on-state just before the end of the document 27 abuts against the stopper gate 20. Consequently, timing, with which the insertion sensor 18 is turned on, indicates that with which the barcode recording portion 30 of the document 27 is placed in the code reading area E.

The feed roll 21 rotates while nipping the document inserted by opening the stopper gate 20. Thus, the document is conveyed along the document conveying path. The document conveying path is formed by using a conveying guide member (not shown), such as a chute. The feed roll 22 rotates while nipping the document conveyed by the feed roll 21. Thus, the document is conveyed to the shredder portion 24 along the document conveying path.

The pass sensor 23 is adapted to detect the passage of a document halfway (nearly at the midpoint of) the document conveying path extending from the feed roll 22 to the shredder portion 24. The pass sensor 23 is constituted by, for example, an optical sensor of the reflection type having a light emitting device and a light receiving device. When a document is present at a sensing position, the pass sensor 23 is in an on-state. When a document is absent at the sensing position, the pass sensor 23 is in an off-state. Therefore, when a leading end of the document passes through the sensing position of the pass sensor 23, the state of the pass sensor 23 is simultaneously changed to the off-state to the on-state. Subsequently, when a rear end of the document passes through the sensing position of the pass sensor 23, the state of the pass sensor 23 is simultaneously changed to the on-state to the off-state.

The shredder portion 24 shreds a document fed thereto by the feed roll 22 while drawing the document thereinto in one direction (the direction of an arrow). The shredder portion 24 can collectively shred a multiple-sheet document (for example, a bundle of about 20 sheets of A4-size plain paper). The shredder portion 24 can shred a document, whose sheets are stapled with a staple, without change (that is, without removing the staple).

Figure 6:
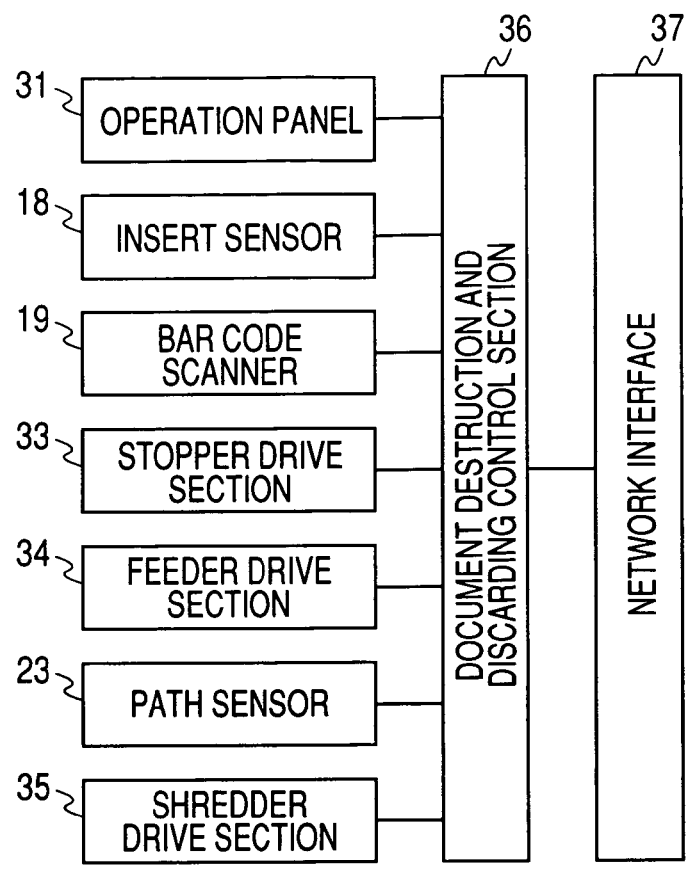
FIG. 6 is a block diagram showing the document destruction and discarding apparatus according to the first mechanical embodiment.

FIG. 6 is a block diagram showing a first mechanical embodiment of the document destruction and discarding apparatus 3. The document destruction and discarding apparatus 3 comprises an operation panel 31, a stopper drive section 33, a feeder drive section 34, a shredder drive section 35, a document destruction and discarding control section 36, and a network interface 37, in addition to the above components.

The operation panel 31 (for the document destruction and discarding apparatus 3) is operated by the user who uses the document destruction and discarding apparatus 3. The operation panel 31 is composed of the operation buttons (e.g., a start button, a stop button) and a display panel for displaying various messages including an operation state of the document destruction and discarding apparatus 3 and an operation guidance (guide message), for example.

The stopper drive section 33 performs the opening or closing (rising or setting) operation of the stopper gate 20. The stopper drive section 33 may have an electronic plunger as the drive source.

The feeder drive section 34 rotates the feed rolls 21 and 22. The feeder drive section 34 may have a motor as the drive source.

The shredder drive section 35 drives and rotates the shredder portion 24. The shredder drive section 35 may have a motor as the drive source.

The document destruction and discarding control section 36 controls various processing operations regarding the destruction and discarding of document. This document destruction and discarding control section 36 controls the processing operations of the bar code scanner 19, the stopper drive section 33, the feeder drive section 34 and the shredder drive section 35 in accordance with a given control program. Also, the document destruction and discarding control section 36 has the insert sensor 18 and the path sensor 23 electrically connected.

The network interface 37 is a communication interface through which the document destruction apparatus 3 transmits and receives data to and from other apparatuses (including the document creation apparatus 1 and the document management apparatus 2) on the network 4. The data transmission and reception using the network interface 37 are controlled by the document destruction control portion 36.

Subsequently, a document management method using the document management system of the aforementioned configuration is described below. First, documents treated by the system according to the invention are created by the document creation apparatus 1 by assigning a unique document ID to each of the documents. The document ID may be constituted by either only numerals or an appropriate combination of alphanumeric characters and symbols. Hereinafter, a practical document management method in the case of treating documents, which are used as exhibits at an account audit and a tax inspection, is described.

Figure 7A:
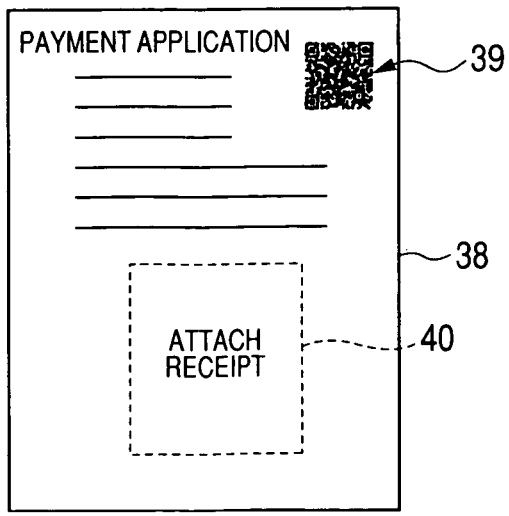
FIGS. 7A and 7B are views for explaining a creation example of document.

First, document data (electronic data) representing a template for a document with a barcode is inputted to the document creation apparatus 1. The document data is outputted at the image output portion 8 by being printed on a sheet of paper. Thus, as illustrated in FIG. 7A, a mount corresponding to a payment application 38 is created. The document data may be generated by, for instance, the document management apparatus 2. Then, the generated document data may be inputted to the document creation apparatus 1 through the network 4 from the document management apparatus 2. Alternatively, the document data may be generated by a server apparatus used to document data. Then, the generated document data may be inputted to the document creation apparatus 1 through the network from the server apparatus.

Figure 7B:
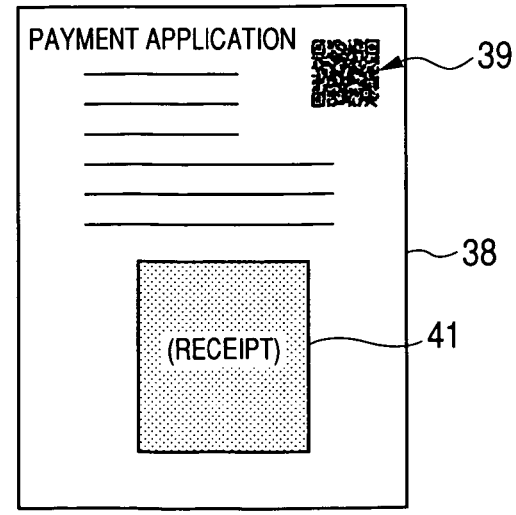

A QR-code 39 including a document ID assigned to a payment application 38 as a piece of information is added to a corner portion of the payment application 38, which is created by the document creation apparatus 1, by printing. That is, the payment application 38 created by the document creation apparatus 1 corresponds to a "document to which a document ID is added". A region 40, on which a receipt is mounted, is provided in the mount corresponding to the payment application 38. Thus, as illustrated in FIG. 7B, a receipt 41 is attached onto the mount corresponding to the payment application 38. According to need, an applicant performs are touch and apposition of a seal (or impression of a seal) thereon. Thus, an original of the payment application 38 is created.

Upon completion of creating the payment application 38, the created payment application 38 is set on the original table of the document creation apparatus 1. Then, an image of the payment application 38 is read by the image reading portion 6. Alternatively, creation information is sent from the document creation apparatus 1 to the document management apparatus 2 through the network 4, so that the creation information is registered in the apparatus 2 as data. Then, image data representing the payment application 38, which is read by the image reading portion, is transmitted to the document management apparatus 2 through the network 4. Upon completion of reading, the original of the payment application 38 is stored in a file or the like.

On the other hand, the document management apparatus 2 having received the image data (or scan data) representing the payment application 38 from the document creation apparatus 1 causes the database portion 14 to store the image data. Also, an image representing the QR-code included in the image data is analyzed by the barcode analysis portion 12. Thus, decode information representing the document ID assigned to the payment application 38 is obtained. Then, the obtained document ID is registered in the document management table by the document management control portion 15. The document management table is created in the database portion 14.

FIG. 8 is a diagram illustrating an example of the document management table. As illustrated in this figure, the document ID, the document creation date and time, the document storage time, and the document destruction date and time are registered in the document management table by being associated with one another. In the case of registering the document creation date and time and the document destruction date and time, it is preferable to use a standard time obtained from a time distribution server or a time authentication server. Data obtained by decoding the QR-code in the barcode analysis portion 12 may be registered as the document ID. Alternatively, data assigned to the aforementioned document with the barcode by the document management apparatus itself 2 or another server apparatus when the document management apparatus 2 or the latter server apparatus generates such document data. The document creation data and time indicates a date and time, at which the document is created. According to the present embodiment, a date and time, at which the document creation apparatus 1 transmits the image data read from the document, such as the payment application 38, to the document management apparatus 2, or a date and time, at which the image data transmitted from the document creation apparatus 1 is received by the document management apparatus 2, is assumed to be registered as the "document creation date and time".

The document storage time indicates the date and time representing the document storage time. It is necessary to store the document, whose document ID is registered in the document management table, until the document storage time expires. Incidentally, in a case where the document storage time is registered as being "permanent", the document can be destroyed at any time. In a case where the document storage time is registered as being "non-designated", the document cannot be destroyed at all times.

Generally, the storage time of a receipt is determined according to a received amount of money. Thus, in a case where information for setting the document storage time is included in, for instance, the QR-code printed on the payment application 38 in addition to information representing the document ID, the document storage time can automatically be set from the decode information obtained by the barcode analysis portion 12. Practically, the date and time corresponding to 6 years reckoned from the date and time, at which the payment application 38 is created, can be set as the document storage time by causing the QR-code to include information designating 6 years as the document storage time of the payment application 38. Another way is that the QR-code is caused to include information representing the received amount of money described in the receipt that is attached to the payment application 38. Thus, the storage time of the receipt is automatically calculated from this information and can be set in the document management table as the document storage time. Additionally, a user can set or change the document storage time in the document management table by performing a manual input (operation) and using the user interface portion 11 of the document management apparatus 2.

The document destruction date and time indicates a date and time at which a document is destroyed. The destruction of the document is performed by the document destruction apparatus 3. Thus, a date and time, at which the document destruction apparatus 3 sends to the document management apparatus 2 a notification (hereunder referred to also as a "destruction completion notification") indicating that destruction of the document, whose document ID is designated, is completed, is registered in the document management table as the document destruction date and time.

Incidentally, the system may be configured so that a user ID of a user having created a document by using the document creation apparatus 1 is registered in the document management table as data indicating a document creator, and that a user ID of a user having destroyed a document by using the document destruction apparatus 3 is registered in the document management table as data indicating a document destroyer. In this case, ID information on a user having created or destroyed a document can be obtained by utilizing existing user authentication techniques (for example, the user authentication technique using an IC card).

Figure 9:
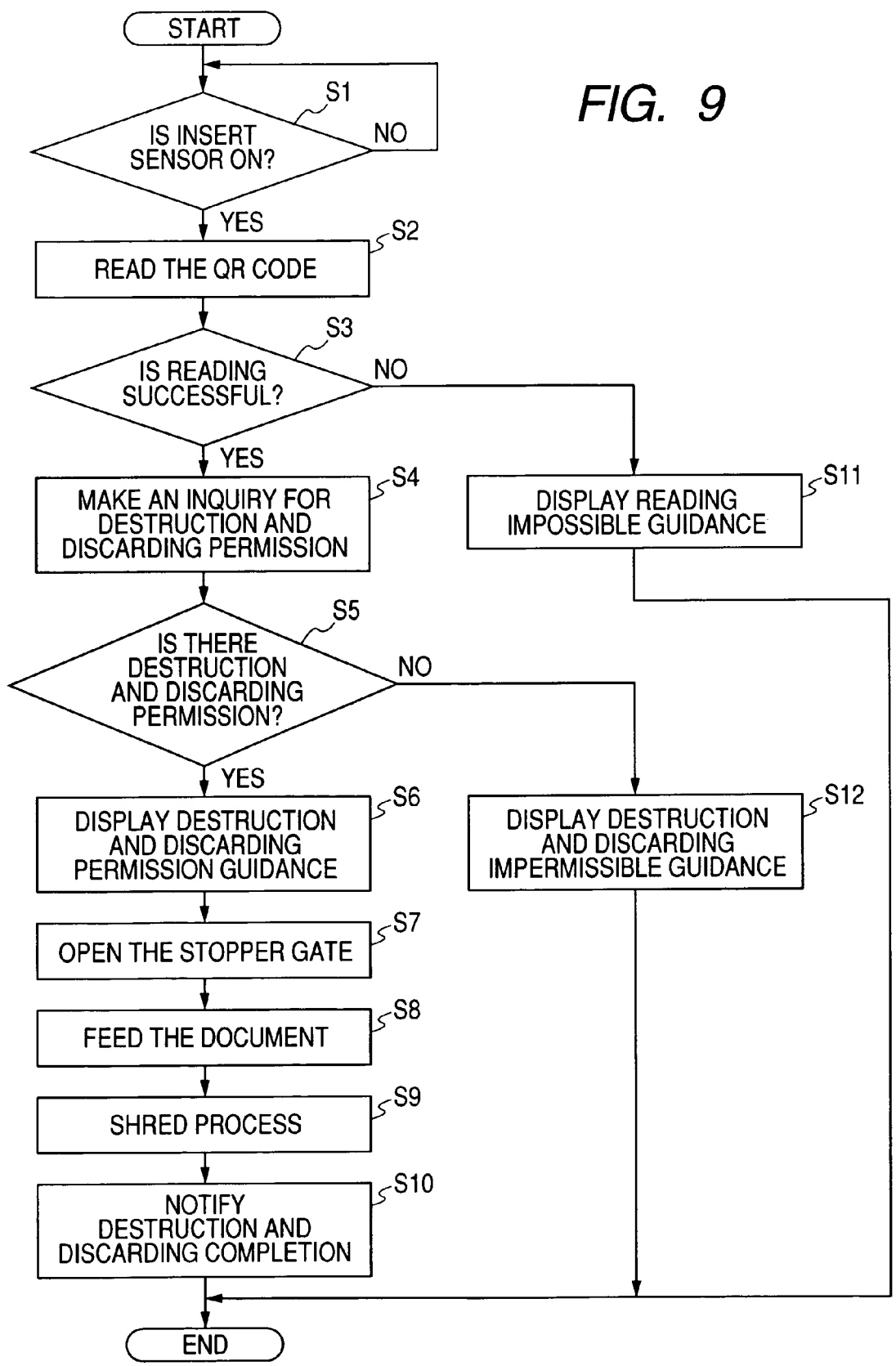
FIG. 9 is a flowchart showing a processing procedure for the document destruction and discarding apparatus according to the first mechanical embodiment.

FIG. 9 is a flowchart showing a processing procedure in destroying and discarding the document in the first mechanical embodiment of the document destruction and discarding apparatus 3. This document destruction and discarding apparatus 3 has a normal destruction and discarding mode in which the code information (document ID) is not read and a scan destruction and discarding mode in which the code information is read. And the flowchart of FIG. 9 represents the processing procedure in the scan destruction and discarding mode.

In the normal destruction and discarding mode, when the start button provided on the operation panel 31 is pressed, the document destruction and discarding control section 36 instructs the stopper drive section 33, the feeder driver section 34 and the shredder drive section 35 to start the driving to open the stopper gate, and start the driving of the feed rolls 21 and 22 and the shredder portion 24. Thereby, if the user who uses the document destruction and discarding apparatus 3 lays the document of destruction and discarding object on the document tray portion 17 and inserts it deeply, the leading edge of the document is nipped by the feed rolls 21, pulled into the inside of the apparatus, directly conveyed by the feed rolls 21 and 22, and shredded by the shredder portion 24.

Also, if the stop button of the operation panel 31 is depressed by the user after the start button of the operation panel 31 is depressed, or a predetermined time passes since the start button is depressed, the document destruction and discarding control section 36 instructs the stopper drive section 33, the feeder drive section 34 and the shredder drive section 35 to stop the driving to restore the stopper gate 20 to its original projecting state, and stop the driving of the feed rolls 21 and 22 and the shredder portion 24. Thereby, the document destruction and discarding apparatus 3 returns to a standby state again.

On the contrary, in the scan destruction and discarding mode, the user who uses the document destruction and discarding apparatus 3 lays the document of destruction and discarding object on the document tray portion 17 and inserts it deeply. At this time, if the QR code is printed on the document of destruction and discarding object, the document is inserted in an orientation where the print face of the QR code is on the top face (face up) and the printed part of the QR code is on the downstream side (deep side) in the thrusting direction. Then, a signal of the insert sensor 18 is switched from the off state to the on state immediately before the leading edge of the document is pushed against the stopper gate 20.

The document destruction and discarding control section 36 continually monitors the signal (on/off state) of the insert sensor 18 while the document destruction and discarding apparatus 3 is on standby (step S1). If the insert sensor 18 is turned on when the user inserts (thrusts) the document, an instruction of reading the bar code is issued to the bar code reader 32. And the bar code reader 32 reads the QR code printed on the document in accordance with this reading instruction (step S2).

Next, the document destruction and discarding control section 36 judges whether or not the reading of the QR code is successful (step S3). Whether or not the reading of the QR code is successful is judged based on whether or not the document ID is normally decoded by the bar code scanner 19 from the QR code printed on the document. There are mainly two cases where the bar code scanner 19 fails in reading the QR code. The first case occurs when the QR code is not originally printed on the document, or when the QR code does not exist in the code reading area E (see FIG. 5) (case of no code) because the orientation of inserting the document (front/back of the document, leading edge/trailing edge of the document) is unsuitable. The second case occurs when the QR code exists in the code reading area E but the QR code is remarkably contaminated or broken, or when the decode information of the QR code does not contain the document ID (case of code defect).

If the reading of the QR code is successful (Yes at step S3), an inquiry as to whether or not the document specified by the document ID contained in this QR code is permitted to destroy and discard is made to the document management apparatus 2 (step S4). The inquiry for the document destruction and discarding permission is made by creating an inquiry message for destruction and discarding permission with the document ID contained in the QR code read by the bar code scanner 19 designated, and transmitting this inquiry message from the network interface 37 via the network 4 to the document management apparatus 2. That is, the inquiry for the document destruction and discarding permission means the inquiry as to whether or not the document specified by the document ID designated in this inquiry may be destroyed and discarded. In this connection, if the reading of the QR code is successful, the information contained in this QR code may be simply displayed on the operation panel 31.

In the document management apparatus 2 receiving the inquiry message, the retrieval section 13 retrieves whether or not the document ID designated in the inquiry message is registered in the document management table. If the applicable document ID exists, the document storage period registered associated with the document ID is checked. And if the date and time (inquiry date and time) when the inquiry for document destruction and discarding permission is received from the document destruction and discarding apparatus 3 passes the document storage period, an answer message indicating that the document destruction and discarding permission is given to the document destruction and discarding apparatus 3 is returned. Also, if the data and time when the inquiry for document destruction and discarding permission is received from the document destruction and discarding apparatus 3 does not pass the document storage period, an answer message indicating that the document destruction and discarding permission is not given to the document destruction and discarding apparatus 3 (the destruction and discarding of the document is inhibited) is returned.

Thus, if the answer message is returned from the document management apparatus 2, the document destruction and discarding control section 36 receives that answer message via the network interface 37, and checks whether or not the content of the answer message gives the destruction and discarding permission for the document upon the inquiry from the self-apparatus (document destruction and discarding apparatus 3) (step S5). And if the answer message gives the destruction and discarding permission for the document, a prepared guidance for document permission (guide message) is displayed on the operation panel 31, and then an instruction of opening the stopper gate 20 is issued to the stopper drive section 33 to open the stopper gate 20 (steps S6 and S7). At this time, the document destruction and discarding control section 36 instructs the feeder drive section 34 to start rotating the feed rolls 21 and 22, and the feeder drive section 34 starts driving the rotation of the feed rolls 21 and 22 in accordance with this instruction. One example of the destruction and discarding permission guidance may be "This document is destroyed and discarded. Insert the document more deeply." In this manner, the destruction and discarding permission guide is displayed to notify the user that the destruction and discarding of the document is permitted, whereby the following process continues without causing the user to feel incompatible.

Thereafter, if the user thrusts in the document in accordance with the guidance displayed on the operation panel 31, the leading edge of the document is pushed against the nip part of the feed rolls 21, and the document is fed into the downstream side on the document conveying path, along with the rotation of the feed rolls 21 (step S8). Thus, the document fed by the feed rolls 21 is passed to the feed rolls 22 on the downstream side in the conveying direction, and conveyed to the shredder portion 24, along with the rotation of the feed rolls 22. At this time, the rear end of the document passes by the sensing position of the insert sensor 18, so that the signal of the insert sensor 18 is switched from the on state to the off state. Then, the document destruction and discarding control section 36 instructs the stopper drive section 35 to return the stopper gate 20 at a preset timing (e.g., timing when the rear end of the document gets rid of the feed roll 21), and thereby restore the stopper gate 20 to its original state (closed state).

Also, the leading edge of the document passes by the sensing position of the path sensor 23 during the conveyance of the document by the feed rolls 22, so that the path sensor 23 is switched from the off state to the on state. Then, the document destruction and discarding control section 36 makes an instruction of starting the driving to the shredder drive section 35, and the shredder drive section 35 starts the driving of the shredder portion 24 upon receiving the instruction. Accordingly, the document fed by the feed roll 22 is directly taken by the shredder portion 24, and shredded through the shred process (destruction and discarding process) (step S9).

Thereafter, the rear end of the document passes by the sensing position of the path sensor 23, so that the path sensor 23 is switched from the on state to the off state. Then, the document destruction and discarding control section 36 transmits a message of destruction and discarding completion notification that the destruction and discarding of the document is completed to the document management apparatus 2 by designating the document ID of the document, for which the document destruction and discarding permission is given ahead, in a certain time since the path sensor 23 is turned off (specifically the time taken since the rear end of the document is taken into the shredder portion 24 till the entire document is shredded) (step S10). The destruction and discarding completion notification message is transmitted from the network interface 37 via the network 4 to the document management apparatus 2. On the contrary, the document management apparatus 2 receiving the destruction and discarding completion notification message from the document destruction and discarding apparatus 3 registers the date and time when the message is received in the column of document destruction and discarding date and time as the destruction and discarding history information corresponding to the document ID designated in the message.

On the other hand, if the reading of the QR code is unsuccessful at step S3, a prepared reading impossible guidance is displayed on the operation panel 31 (step S1) One example of the reading impossible guidance may be "A code reading error occurred. Pull out the document." Also, if the document destruction and discarding permission is not given from the document management apparatus 2 at step S5, a prepared destruction and discarding impermissible guidance is displayed on the operation panel 31 (step S12). One example of the destruction and discarding impermissible guidance may be "This document cannot be destroyed and discarded, because the document storage period is not reached. Pull out the document." In this manner, the destruction and discarding impermissible guidance is displayed to notify the user that the destruction and discarding of the document is not permitted, whereby the following process continues without causing the user to feel incompatible. Also, after the destruction and discarding completion notification is transmitted, the document destruction and discarding apparatus 3 directly returns to the standby state. However, after the reading impossible guidance is displayed at step S11, or the destruction and discarding impermissible guidance is displayed at step S12, the document destruction and discarding apparatus 3 returns to the standby state if the insert sensor 18 is switched form the on state to the off state (the user takes the document out of the document tray portion 17).

Second Mechanical Embodiment

Figure 10:
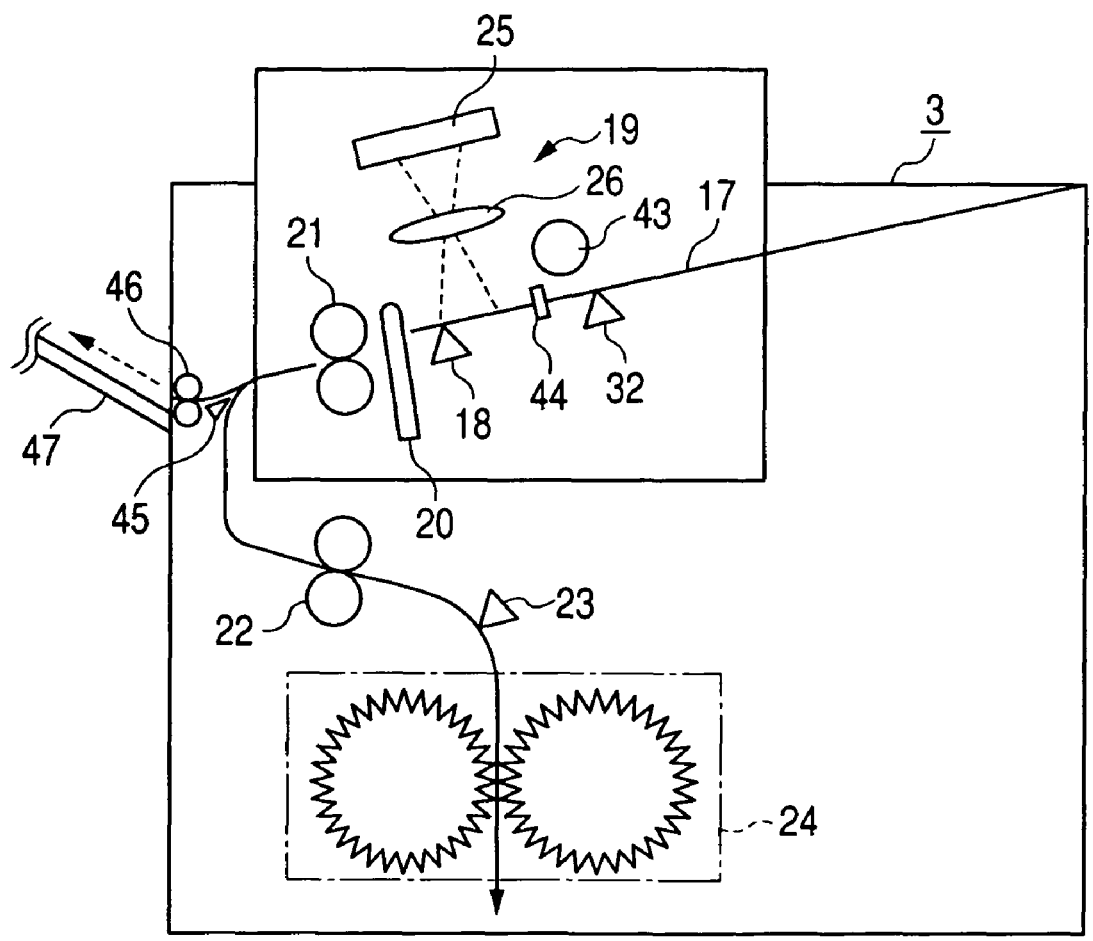
FIG. 10 is a schematic view showing a document destruction and discarding apparatus according to a second mechanical embodiment.

FIG. 10 is a schematic view showing a second mechanical embodiment of the document destruction and discarding apparatus 3. This document destruction and discarding apparatus 3 comprises a set sensor 32, a pull-in roll 43, a separation member 44, a branch gate 45, an exhausting roll 46 and an output tray portion 47, in addition to the same constitution as the first mechanical embodiment (document tray portion 17, insert sensor 18, bar code scanner 19, stopper gate 20, feed rolls 21 and 22, path sensor 23, shredder portion 24).

The set sensor 32 senses whether or not the document is set (laid) on the document tray portion 17. The set sensor 32 is composed of an optical sensor of the reflection type having a light emitting element and a light receiving element, for example. The set sensor 32 is placed in the on state when the document exists at the sensing position of the set sensor 32, or in the off state when no document exists.

The pull-in roll 43 pulls the documents in order from the uppermost level into the stopper gate 20 to automatically convey the document set on the document tray portion 17. The separation member 44 separates the documents so that the documents may be pulled in one by one in order by the pull-in roll 43.

The branch gate 45 switches the travelling direction of the document conveyed along the document conveying path at a branch part of the document conveying path bifurcated on the downstream side of the feed roll 21. That is, the branch gate 45 switches the traveling direction of the document conveyed by the feed roll 21 into any one of the first direction toward the feed roll 22 and the second direction toward the exhausting roll 46.

The exhausting roll 46 exhausts the document onto the output tray portion 47. The output tray portion 47 accommodated the documents exhausted by the exhausting roll 46 by laying them one on the other.

Figure 11:
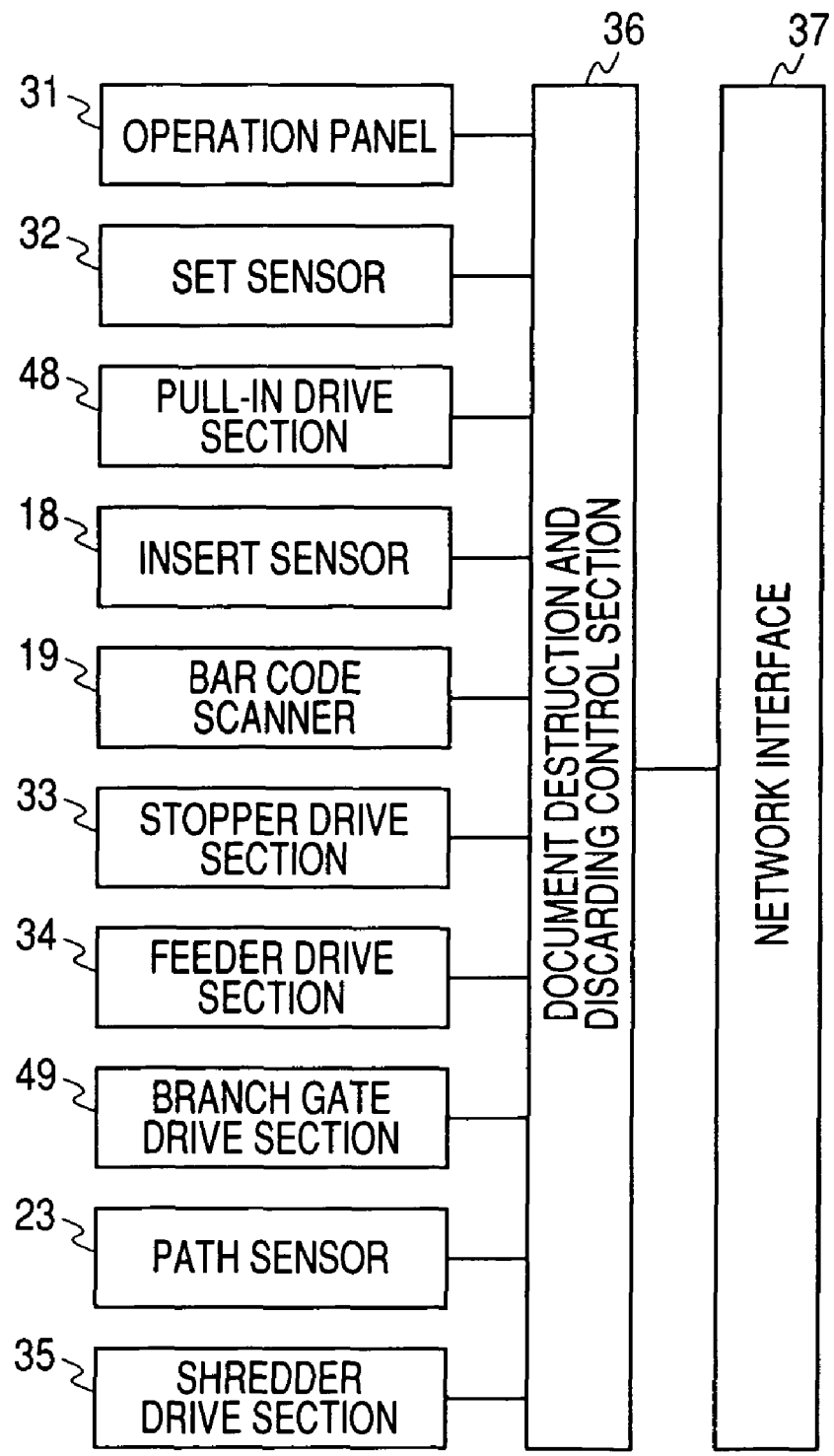
FIG. 11 is a block diagram showing the document destruction and discarding apparatus according to the second mechanical embodiment.

FIG. 11 is a block diagram showing the second mechanical embodiment of the document destruction and discarding apparatus 3. This document destruction and discarding apparatus 3 comprises the set sensor 32, a pull-in drive section 48, and a branch gate drive section 49, in addition to the same constitution as the first mechanical embodiment (operation panel 31, bar code scanner 19, stopper drive section 33, feeder drive section 34, shredder drive section 35, document destruction and discarding control section 36 and network interface 37). Also, the document destruction and discarding control section 36 has the set sensor 32 electrically connected, in addition to the same sensors (insert sensor 18 and path sensor 23) as the first mechanical embodiment.

The pull-in drive section 48 drives the pull-in roll 43 to perform the ascend or descend operation or rotating operation. The pull-in drive section 48 may have an electromagnetic plunger for the roll ascending or descending operation and a motor for the roll rotating operation as the drive sources.

The branch gate drive section 49 performs the switching operation of the branch gate 45. The branch gate drive section 49 may have the electromagnetic plunger as the drive source. The branch gate drive section 49 normally operates the branch gate 45 so that the traveling direction of the document may be the first direction (direction toward the feed roll 22), and operates the branch gate 45 so that the traveling direction of the document may be the second direction (direction toward the exhausting roll 46) when there is a switching instruction from the document destruction and discarding control section 36.

Also, the exhausting roll 46, like the feed rolls 21 and 22, is driven and rotated by the feeder drive section 34.

Figure 12:
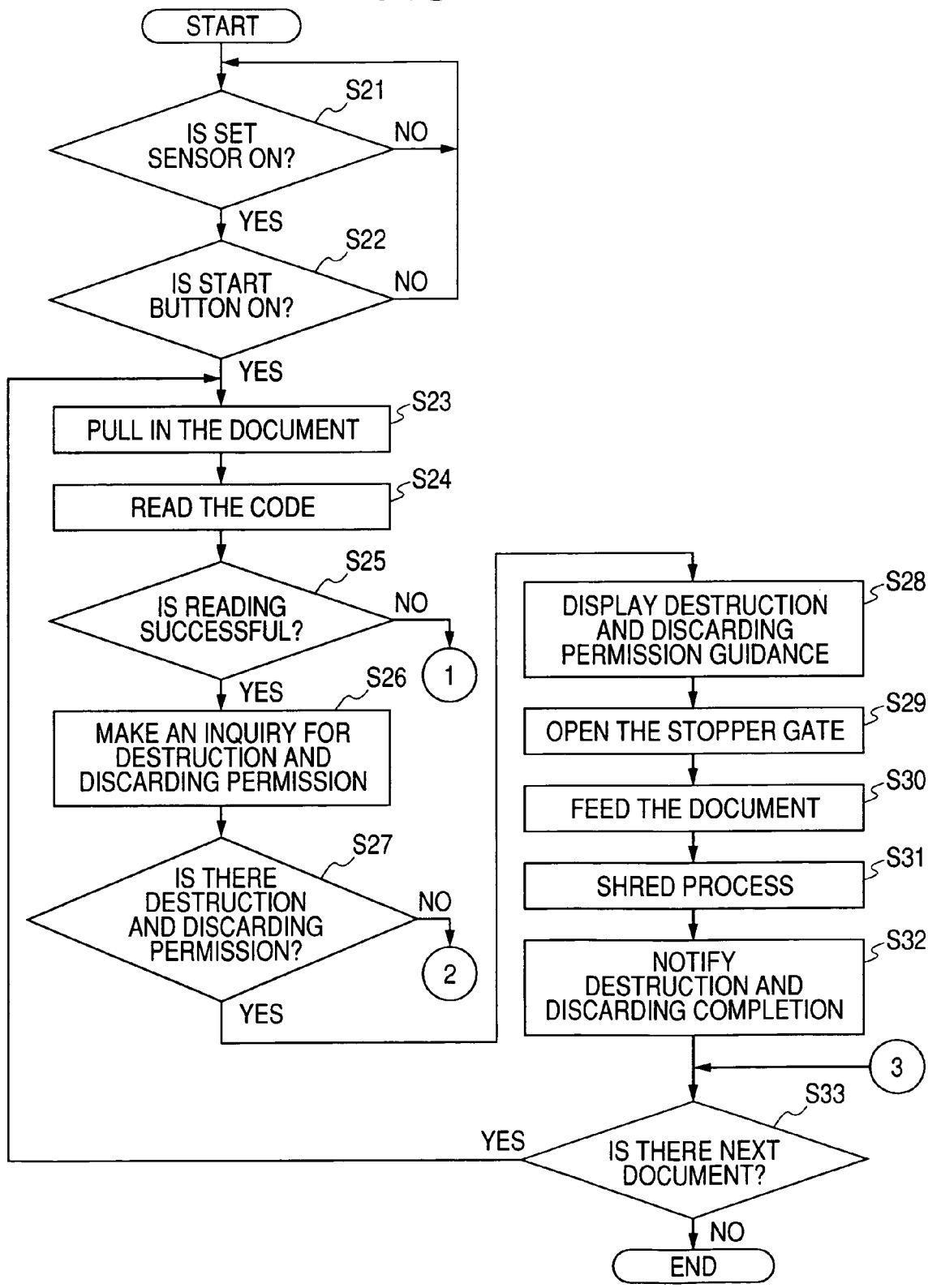
FIG. 12 is a flowchart (No. 1) showing a processing procedure for the document destruction and discarding apparatus according to the second mechanical embodiment.
Figure 13:
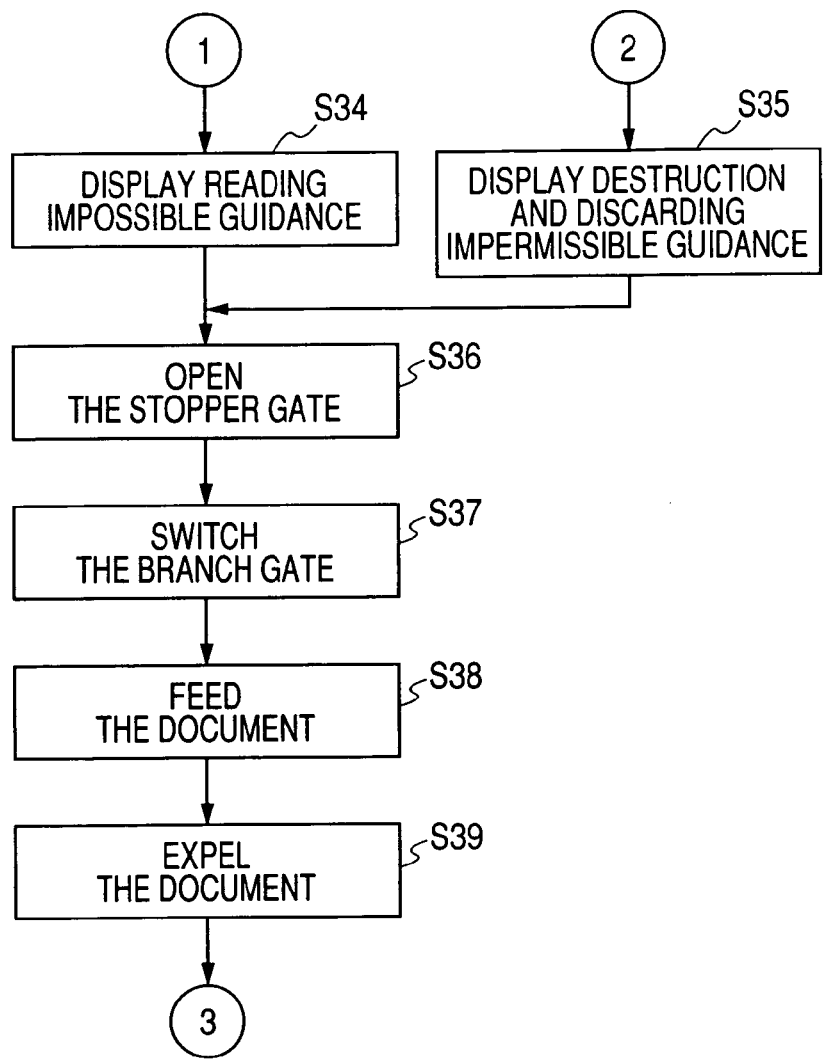
FIG. 13 is a flowchart (No. 2) showing a processing procedure for the document destruction and discarding apparatus according to the second mechanical embodiment.

FIGS. 12 and 13 are flowcharts showing a processing procedure in destroying and discarding the document in the second mechanical embodiment of the document destruction and discarding apparatus 3. This document destruction and discarding apparatus 3 has a normal destruction and discarding mode and a scan destruction and discarding mode as in the above embodiment. And the flowcharts of FIGS. 12 and 13 represent the processing procedure in the scan destruction and discarding mode.

In the normal destruction and discarding mode, the document destruction and discarding apparatus 3 is on standby. When the user who uses the document destruction and discarding apparatus 3 lays the documents to be destroyed and discarded on the document tray portion 17, and depresses the start button of the operation panel 31, the document destruction and discarding control section 36 instructs the pull-in drive section 48, the stopper drive section 33, the feeder driver section 34 and the shredder drive section 35 to start the driving, so that the pulling operation of the document by the pull-in roll 43 is started, the stopper gate 20 is opened, and the driving of the feed rolls 21 and 22 and the shredder portion 24 is started. Thereby, the documents laid on the document tray portion 17 are pulled in orderly from the uppermost level, directly conveyed by the feed rolls 21 and 22, and shredded by the shredder portion 24. And this operation is repeated while there is any document left on the document tray portion 17 (the set sensor 32 is on).

Also, if no document is left on the document tray portion 17 and the set sensor 32 is switched from the on state to the off state, the document destruction and discarding control section 36 instructs the pull-in drive section 48, the stopper drive section 33, the feeder drive section 34 and the shredder drive section 35 to stop the driving, so that the pulling operation of the document by the pull-in roll 43 is ended, the stopper gate 20 is restored to its original state, and the driving of the feed rolls 21 and 22 and the shredder portion 24 is stopped. Thereby, the document destruction and discarding apparatus 3 returns to the standby state again.

On the contrary, in the document scan mode, the user who uses the document destruction and discarding apparatus 3 lays the documents to be destroyed and discarded on the document tray portion 17 and depresses the start button on the operation panel 31 in the same manner as above. The document destruction and discarding control section 36 continually monitors the signal (on/off state) of the set sensor 42 in the standby state of the document destruction and discarding apparatus 3 (step S21). If the set sensor 32 is turned on when the user actually sets the documents on the document tray portion 17, it is judged whether or not the start button is depressed in the on state (step S22). And if it is judged that the start button is depressed, an instruction of pulling the documents is made to the pull-in drive section 48 to pull in the documents with the rotation of the pull-in roll 43 (step S23). Thereby, the documents to be destroyed and discarded are automatically inserted into the back side of the apparatus along with the rotation of the pull-in roll 43.

The pulling (insertion) of the document is performed by causing the pull-in roll 43 to descend so that the outer peripheral face of the roll may contact (press) the uppermost face of the documents laid (set) on the document tray portion 17 and rotating the pull-in roll 43 in this state. At this time, the document destruction and discarding control section 36 continually monitors the signal (on/off state) of the insert sensor 18. If the insert sensor 18 is turned on, an instruction of stopping the pulling is issued to the pull-in drive section 46 immediately after it (at the timing when the leading edge of the document makes contact with the stopper gate 20). The pull-in drive section 46 receiving this instruction once stops the rotation of the pull-in roll 43. Thereby, the document of destruction and discarding object is conveyed up to the "predetermined position" as previously described.

Next, the document destruction and discarding control section 36 issues an instruction of reading the bar code to the bar code reader 32. And the bar code scanner 19 reads the QR code printed on the document in accordance with this reading instruction (step S24). In the case where one document is treated, the bar code is read while the fed document is stopped at the reading position, or flowing, the information is sent or received to or from a database, the information of each document is acquired, and it is judged whether the document is directly destroyed and discarded or outputted onto the output tray 47.

Next, the document destruction and discarding control section 36 judges whether or not the reading of the QR code is successful (step S25). And if the reading of the QR code is successful (Yes at step S25), an inquiry as to whether or not the document specified by the document ID contained in the QR code is permitted to destroy and discard is made to the document management apparatus 2 (step S26). An answer message to that inquiry is received.

Next, the document destruction and discarding control section 36 checks whether or not the content of the answer message gives the destruction and discarding permission for the document (step S27). If the answer message gives the destruction and discarding permission for the document, a prepared guidance for document permission (guide message) is displayed on the operation panel 31, and then an instruction of opening the stopper gate is issued to the stopper drive section 33 to open the stopper gate 20 (steps S28 and S29). One example of the destruction and discarding permission guidance may be "This document is automatically conveyed and destroyed and discarded."

Next, the document destruction and discarding control section 36 issues an instruction of continuing to pull in the document to the pull-in drive section 48 to resume the rotation (pulling of the document) of the pull-in roll 43, and issues an instruction of starting to rotate the feed rolls 21 and 22 to the feeder drive section 34 to start driving and rotating the feed rolls 21 and 22 and the exhausting roll 46. Thereby, the document pulled in by the pull-in roll 43 is taken in by the feed roll 21, and conveyed to the downstream side of the document conveying path, along with the rotation of the feed roll 21. At this time, the branch gate 45 guides the traveling direction of the document to the first direction, so that the document is fed from the feed roll 21 to the feed roll 22 (step S30).

Thus, the document fed by the feed roll 22 is conveyed to the shredder portion 24, along with the rotation of the feed roll 22. At this time, the rear end of the document passes by the sensing position of the insert sensor 18, so that the insert sensor 18 is switched from the on state to the off state. Then, the document destruction and discarding control section 36 instructs the stopper drive section 33 to return the stopper gate at a preset timing (e.g., timing when the rear end of the document gets rid of the feed roll 21), and thereby restore the stopper gate 20 to its original state (closed state).

Also, the leading edge of the document passes by the sensing position of the path sensor 23, while the feed roll 22 is conveying the document, so that the path sensor 23 is switched from the off state to the on state. Then, the document destruction and discarding control section 36 makes an instruction of starting the driving to the shredder drive section 35, and the shredder drive section 35 starts the driving of the shredder portion 24 upon receiving the instruction. Accordingly, the document fed by the feed roll 22 is directly taken by the shredder portion 24, and shredded through the shred process (destruction and discarding process) (step S31).

Thereafter, the rear end of the document passes by the sensing position of the path sensor 23, so that the path sensor 23 is switched from the on state to the off state. Then, the document destruction and discarding control section 36 transmits a message of destruction and discarding completion notification that the destruction and discarding of the document is completed to the document management apparatus 2 by designating the document ID of the document, for which the document destruction and discarding permission is given ahead, in a certain time since the path sensor 23 is turned off (specifically the time taken since the rear end of the document is taken into the shredder portion 24 till the entire document is shredded) (step S32). Thereby, the document management apparatus 2 receiving the destruction and discarding completion notification message from the document destruction and discarding apparatus 3 registers the date and time when the message is received in the column of document destruction and discarding date and time as the destruction and discarding history information corresponding to the document ID designated in the message.

Next, the document destruction and discarding control section 36 checks whether or not the next document is left on the document tray portion 17 (step S33). Specifically, if the set sensor 32 is in the on state, it is judged that the next document is left, and the procedure returns to step S23. Also, if the set sensor 32 is in the off state, it is judged that the next document is not left, and a series of processes is ended. After the series of processes is ended in this manner, the document destruction and discarding apparatus 3 returns to the standby state again.

On the other hand, if the reading of the QR code is unsuccessful at step S25, a prepared reading impossible guidance is displayed on the operation panel 31 (step S34). One example of the reading impossible guidance may be "A code reading error occurred. This document is not destroyed and discarded but exhausted." Also, if the document destruction and discarding permission is not given from the document management apparatus 2 at step S27, a prepared destruction and discarding impermissible guidance is displayed on the operation panel 31 (step S35). One example of the destruction and discarding impermissible guidance may be "This document cannot be destroyed and discarded, because the document storage period is not reached. The document is exhausted onto the output tray."

After this guidance is displayed, the document destruction and discarding control section 36 issues an instruction of opening the stopper gate 20 to the stopper drive section 33 to open the stopper gate 20, and issues an instruction of switching the gate to the branch gate drive section 49 to cause the branch gate 49 to make the switching operation (steps S36 and S37). Next, the document destruction and discarding control section 36 issues an instruction of continuing to pull in the document to the pull-in drive section 48 to resume the rotation of the pull-in roll 43 (pulling of the document), and issues an instruction of starting the rotation of the feed rolls 21 and 22 to the feeder drive section 34 to start driving the rotation of the feed rolls 21 and 22 and the exhausting roll 46. Thereby, the document pulled in by the pull-in roll 43 is taken in by the feed roll 21, and forwarded to the downstream side of the document conveying path along with the rotation of the feed roll 21. At this time, since the branch gate 45 guides the traveling direction of the document to the second direction, the document is fed from the feed roll 21 to the exhausting roll 46, and exhausted onto the output tray portion 47, along with the rotation of the exhausting roll 46 (steps S38 and S39). Thereafter, the procedure transfers to step S33.

While the document that fails to read the QR code and the document that is not given a document destruction and discarding permission from the document management apparatus 2 are exhausted onto the common (same) output tray section 47 in this embodiment, the document that fails to read the QR code and the document that is not given a document destruction and discarding permission from the document management apparatus 2 may be exhausted onto different output tray sections, employing a switching operation of the document conveying path (conveying direction) with a branch gate 45.

In the document management system as described above, the document ID appended to the document is managed corresponding to the document storage period in the document management apparatus 2, in which when the document is destroyed and discarded employing the document destruction and discarding apparatus 3, the document ID contained in the QR code is acquired by reading the QR code printed on the document of destruction and discarding object with a bar code scanner 19, an inquiry as to whether or not the document specified by this document ID is permitted to destroy and discard is made to the document management apparatus 2, and if an answer content to this inquiry is to give a destruction and discarding permission, the destruction and discarding process for the document is performed in the document destruction and discarding apparatus 3. Therefore, the person in charge does not need to confirm the possibility of destroying and discarding the document every time as conventionally performed, and the document in which the storage period has expired can be securely destroyed and discarded. Also, it is possible to avoid falsely destroying and discarding the document due to an artificial check error.

Also, for the document generated employing the document generation apparatus 1, the document ID appended to the document is managed associated with the document storage period in the document management apparatus 2, whereby it is possible to make the management consistently from the generation to the destruction and discarding of the document.

Also, when the destruction and discarding process (shredding process) for the document is made in the document destruction and discarding apparatus 3, a message of destruction and discarding completion notification with the document ID of the document designated is transmitted to the document management apparatus 2, and the document management apparatus 2 receiving its notification message registers the document destruction and discarding date and time as the destruction and discarding history information corresponding to the applicable document ID in the document management table, whereby the date and time when the document is actually destroyed and discarded can be left as the history, together with the fact that the document is destroyed and discarded. Moreover, the user ID information of the person who disposes of document in charge of destroying and discarding the document can be acquired by the user authentication technique and left as one destruction and discarding history information. As a result, it is possible to confirm later when and by whom the document designated by the certain document ID is destroyed and discarded.

Also, when the document generation process (printing process) is performed in the document generation apparatus 1, the date and time when the document is generated and the user ID information of the document creator in charge of generating the document are registered along with the document ID of the document in the document management table of the document management apparatus 2, whereby it is possible to confirm later when and by whom the document designated by the certain document ID is destroyed and discarded.

Further, as an application example employing the user authentication technique, the ID information of the user who employs the document destruction and discarding apparatus 3 is acquired, and the user ID information is transmitted to the document management apparatus 2 before the user actually starts the document destruction and discarding operation (opens a stopper gate 20), whereby as a result of the retrieval section 13 making the retrieval process, if the user ID information transmitted from the document destruction and discarding apparatus 3 does not exist in a use permission user ID list (list of registering the user ID permitted to use the document destruction and discarding apparatus 3) previously registered in the database section 14 a message indicating that the user is not given a use permission is displayed on the operation panel 31, and the stopper gate 20 is kept closed, so that the user of the document destruction and discarding apparatus 3 can be limited by designating the person in charge of destroying and discarding the document.

Also, in the document destruction and discarding apparatus 3 of manual insertion feed type, a plurality of documents (bunches) can be destroyed and discarded collectively even with the staples attached at a time. On the other hand, in the document destruction and discarding apparatus 3 of automatic feed type, only if the user sets the documents on the document tray section 17 and depresses the start button, the document destruction and discarding process can be automatically performed while the user checks the possibility of destroying and discarding the document for each document without intervening the operation. The document not permitted to destroy and discard is exhausted onto the output tray 47.

While the QR code including the document ID is printed on the document in the above embodiment, the invention is not limited thereto, but the number or symbol indicating the document ID may be printed on the document. Also, the appendage of the document ID on the document is not limited to printing, but the document ID may be appended by labeling on the document.

Figure 14:
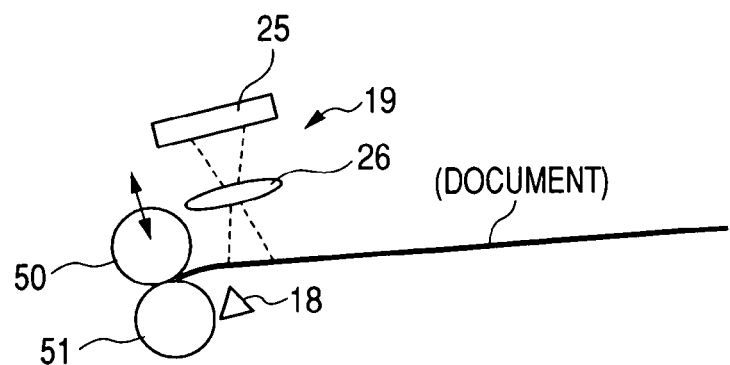
FIG. 14 is a schematic view showing another configuration example of the document destruction and discarding apparatus.

Also, while in the above embodiment the stopper gate 20 is kept closed and the document is pushed against the stopper gate 20 and stopped at the position where the document ID can be read, a pair of rolls, namely, a delivery roll 50 and a retard roll (double delivery prevention roll) 51, as the gate member instead of the stopper gate 20, may be disposed in the nipped state, whereby the document may be pushed against the nip part in a state where the delivery roll 50 and the retard roll 51 are stopped, and stopped at the position where the document ID can be read, as shown in FIG. 14.

In the case where this constitution is adopted for the document destruction and discarding apparatus 3 of manual insertion type, when the document is fed by receiving a destruction and discarding permission of the document, the delivery roll 50 and the retard roll 51 are rotated so that one pair of rolls also serve as the rolls for feeding the document. Therefore, the feeding of the document can be started by the rotation of the delivery roll 50. Accordingly, it is possible to transit to the document feeding operation after receiving a destruction and discarding permission of the document.

Also, at least one of the pair of rolls, for example, the delivery roll 50, is provided to be movable in the arrow direction, so that the nip part with the retard roll 51 can be opened or closed. Therefore, when the document is destroyed and discarded in the normal destruction and discarding mode, the delivery roll 50 is spaced from the retard roll 51, so that a plurality of documents (bunches) can be taken in without problem. Further, for the document destruction and discarding apparatus 3 of automatic feed type (see FIG. 10), the stopper gate 20 may be directly left as the gate member, and the delivery roll 50 and the retard roll 51 may be provided instead of a separation member 44.

Figure 15:
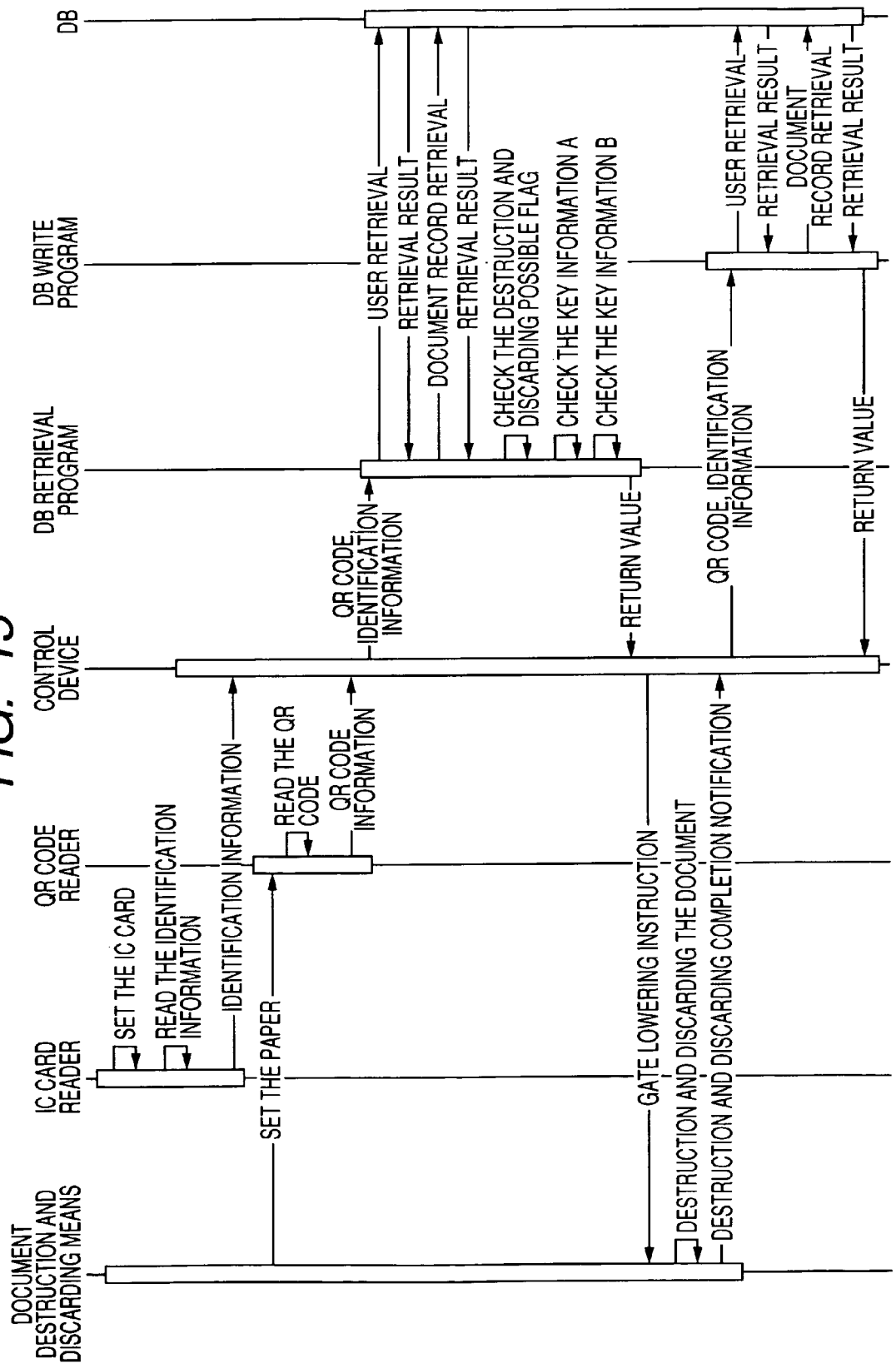
FIG. 15 is a sequence diagram.

(FIG. 15: Sequence Diagram)

If an IC card is set in the IC card reader provided for the document destruction and discarding apparatus, the IC card reader reads the identification information, and the identification information of the IC card is passed to a control device. Also, the paper (or sheaf of papers) to be destroyed and discarded is set on the document destruction and discarding apparatus. A QR code reader reads and analyzes the QR code printed on the paper. An analyzed value of the QR code is passed to the control device. A retrieval program for the database is started with the QR code analyzed value and the identification information of the IC card as the arguments from the controller.

Figure 16:
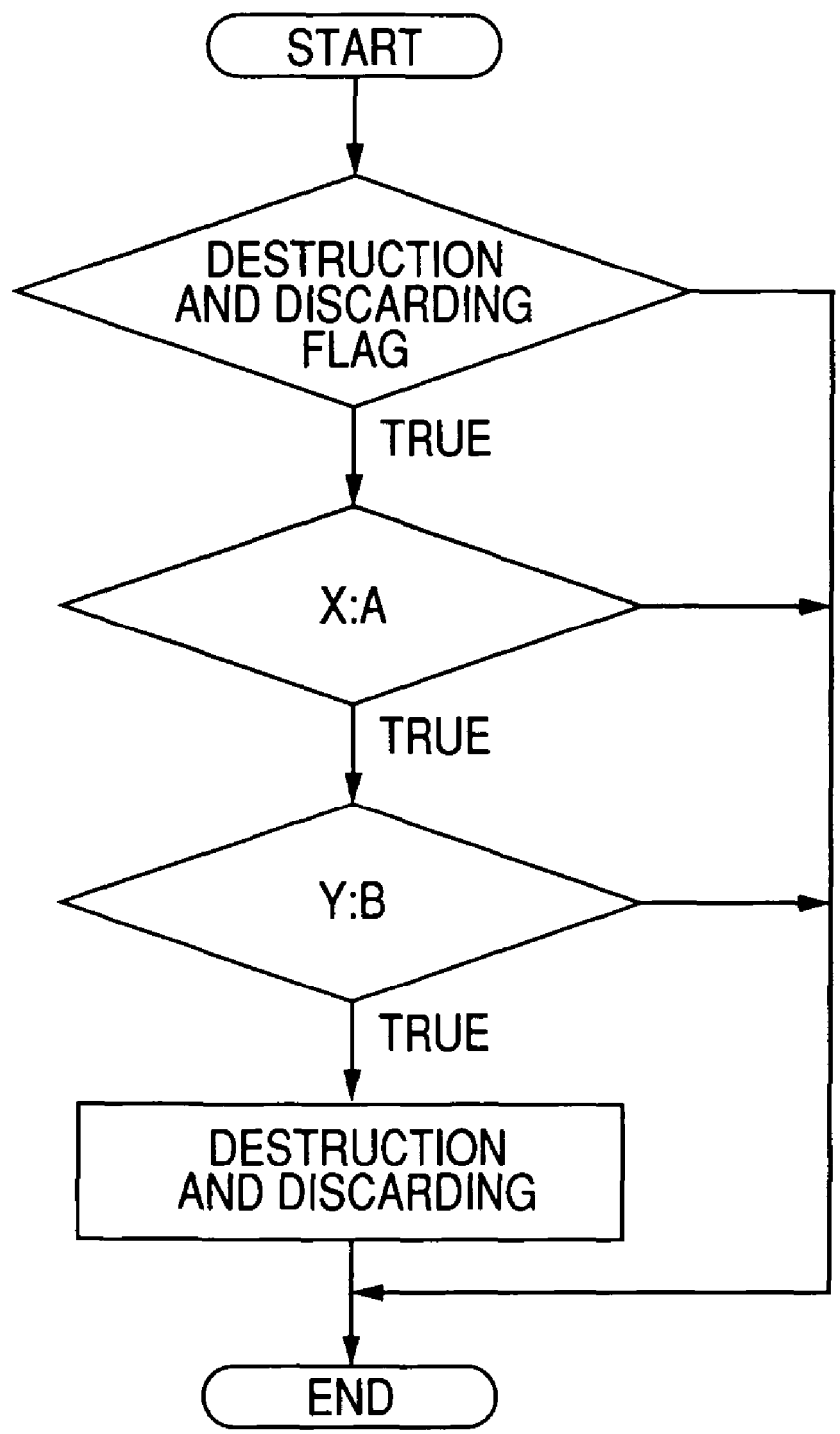
FIG. 16 is a flowchart showing a processing procedure of destruction and discarding determination.

A database retrieval program retrieves the user record from the database with the identification information as the key. The database retrieval program confirms the presence or absence of the user registration. The user registration of (presence or absence) is a cancellation flag (TRUE/FALSE). The database retrieval program acquires the "X (amount of money), Y (document registration date)" from the database, based on the QR code analyzed value. The value such that for the acquired value X, (if X>=A, TRUE) or (if X<A, FALSE), and for Y, (if Y>=B, TRUE) or (if Y<B, FALSE) is acquired, and the destruction and discarding conditions set in the parameter file are compared (FIG. 16). If the destruction and discarding conditions are met, the database retrieval program returns the destruction and discarding information to the control device.

The control device lowers the gate of the document destruction and discarding apparatus. The set paper is taken into the document destruction and discarding apparatus, and destroyed and discarded. If the document is destroyed and discarded, a destruction and discarding completion notification is returned to the control device. The control device starts a database write program with the QR code analyzed value and the identification information of the IC card as the arguments. The database write program retrieves the user recorded from the database with the identification information as the key. The database write program receives the user information. The database write program writes the "destroyed and discarded flag", "destruction and discarding date and time" and "destruction and discarding performer" in a record of the database corresponding to the QR code analyzed value. The database write program returns the written result to the control device.

Third Mechanical Embodiment

Figure 17:
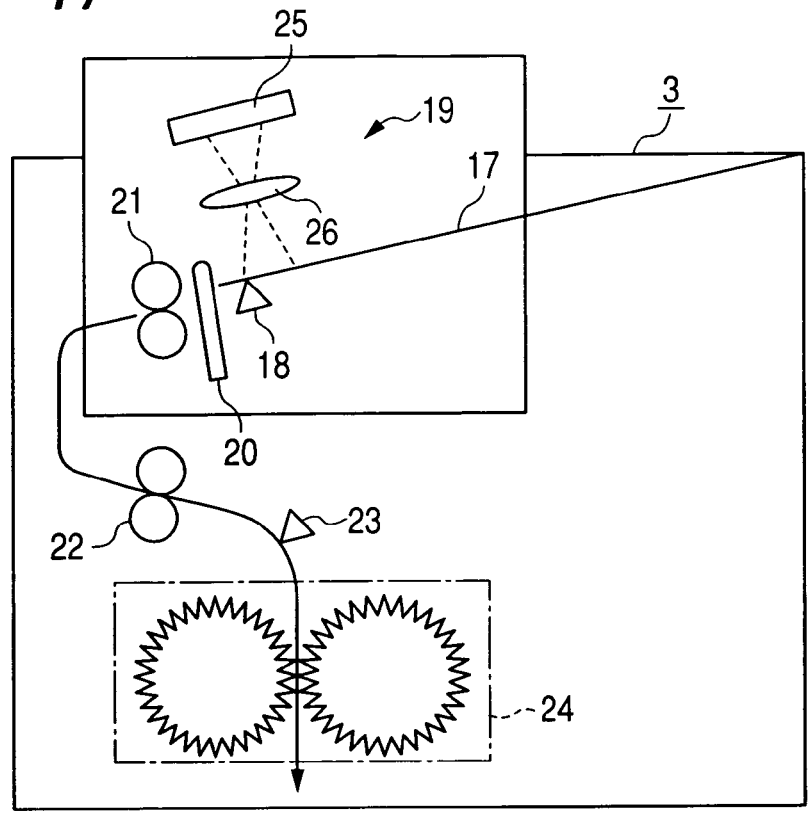
FIG. 17 is a schematic view showing a document destruction and discarding apparatus according to a third mechanical embodiment.

FIG. 17 is a schematic view showing a third mechanical embodiment of the document destruction and discarding apparatus 3.

This document destruction and discarding apparatus 3 is constructed employing a shredder device, for example, and comprises a document tray portion 17, an insert sensor 18, a bar code scanner 19, a stopper gate 20, the feed rolls 21 and 22, a path sensor 23 and a shredder portion 24.

The document tray portion 17 is the portion where the documents to be destroyed and discarded are laid. The document tray portion 17 is inclined obliquely on the horizontal plane to be gradually lower toward the stopper gate 20. The depth side (lower side) of the document tray portion 17 is covered with a cover member, not shown, together with the insert sensor 18, the bar code scanner 19, the stopper gate 20 and the feed roll 21.

The insert sensor 18 senses that the document is inserted into a predetermined position on the document tray portion 17. The insert sensor 18 is composed of an optical sensor of the reflection type having a light emitting element and a light receiving element, for example, and turned on when the document exists at the sensing position of the insert sensor 18, or turned off when no document exists.

The bar code scanner 19 takes an image of the bar code into an area sensor 25 by applying the light of a light source, not shown, to a bar code recorded part of the document of destruction and discarding object and receiving a reflected light from the bar code recorded part via a lens 26 with the area sensor 25. The bar code recorded part refers to the part where the bar code including the document ID as one information is recorded within the plane of the document, in which its position (area) is defined beforehand dimensionally at the corner part of the document.

The stopper gate 20 has a long plate-like structure, for example, and is provided between the insert sensor 18 and the feed rolls 21. The stopper gate 20 opens or closes an entrance of a document conveying path at the entrance part of the document conveying path formed by the feed rolls 21 and 22.

In a state where the stopper gate 20 is closed, the stopper gate 20 is disposed to project over a passage of the document leading from the document tray portion 17 to the feed roll 21 to block the passage. Accordingly, when the document laid on the document tray portion 17 is inserted deeply, the leading edge of the document is pushed against the stopper gate 20. On the contrary, in a state where the stopper gate 20 is opened, the stopper gate 20 is withdrawn from the passage and retracted from the passage of document leading from the document tray 17 to the feed rolls 21. Accordingly, if the document laid on the document tray portion 17 is inserted more deeply, the leading edge of the document is pushed against the nip part of the feed rolls 21.

Figure 18:
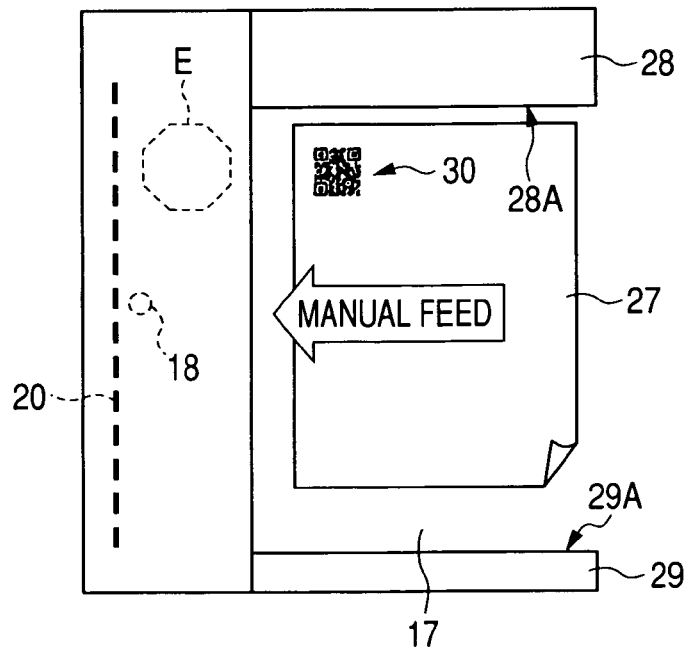
FIG. 18 is a view of a document tray section, as seen from the above.

FIG. 18 is a view of the document tray portion 17, as seen from the above. The document tray portion 17 is provided with the insertion guides 28 and 29 on both sides thereof in the insertion direction (arrow direction) where the document 27 is inserted manually. The insertion guides 28 and 29 have the guide faces 28A and 29A in parallel to the insertion direction of the document. Among them, the insertion guide 28 is fixed, and the insertion guide 29 is provided movably in the width direction (vertical direction in FIG. 15) of the document, as needed. The document 27 to be destroyed and discarded is inserted in the arrow direction into the document tray portion 17 in an orientation where the bar code recorded part 30 is placed at the corner part on the top side.

At this time, one side end of the document 27 is contacted with the guide face 28A of the insertion guide 28 to position the document 27 in the direction orthogonal to the insertion direction.

Thereby, the barcode recorded part 30 is positioned within a code reading area E with the bar code scanner 19 in a state where the leading edge of the document 27 is pushed against the stopper gate 20 by manual insertion of the user. Also, the insert sensor 18 is disposed in front of (directly close to) the stopper gate 20 in the insertion direction of the document. Therefore, when the leading edge of the document 27 manually inserted by the user is pushed against the stopper gate 20, the insert sensor 18 is switched from the off state to the on state immediately before it. Thereby, the timing when the insert sensor 18 is turned on indicates the timing when the bar code recorded part 30 of the document 27 is disposed within the code reading area E.

The feed roll 21 conveys the document along the document conveying passage by rotating while nipping (pinching) the document inserted by opening the stopper gate 20. The document conveying passage is formed employing a conveying guide member (chute), not shown. The feed roll 22 conveys the document along the document conveying passage to the shredder portion 24 by rotating while nipping the document conveyed by the feed roll 21.

The path sensor 23 senses the document passing midway (at almost middle point) on the document conveying passage leading from the feed rolls 22 to the shredder portion 24. The path sensor 23 is composed of an optical sensor of the reflection type having a light emitting element and a light receiving element, for example. The path sensor 23 is placed in the on state when the document exists at a sensing position of the path sensor 23, or in the off state when no document exists. Accordingly, when the front end of the document passes by the sensing position of the path sensor 23, the path sensor 23 is switched from the off state to the on state at the same time, and thereafter, when the rear end of the document passes by the sensing position of the path sensor 23, the path sensor 23 is switched from the on state to the off state at the same time.

The shredder portion 24 cuts (shreds) the document while pulling the document fed by the feed rolls 22 in one direction (arrow direction). This shredder portion 24 can perform a shredding process for a plurality of documents (e.g., a sheaf of about 20 documents of A4 size) collectively. Also, the shredder portion 24 can perform the shredding process for the document subjected to the stapling process by staples in its as-is state (without removing the staples).

Figure 19:
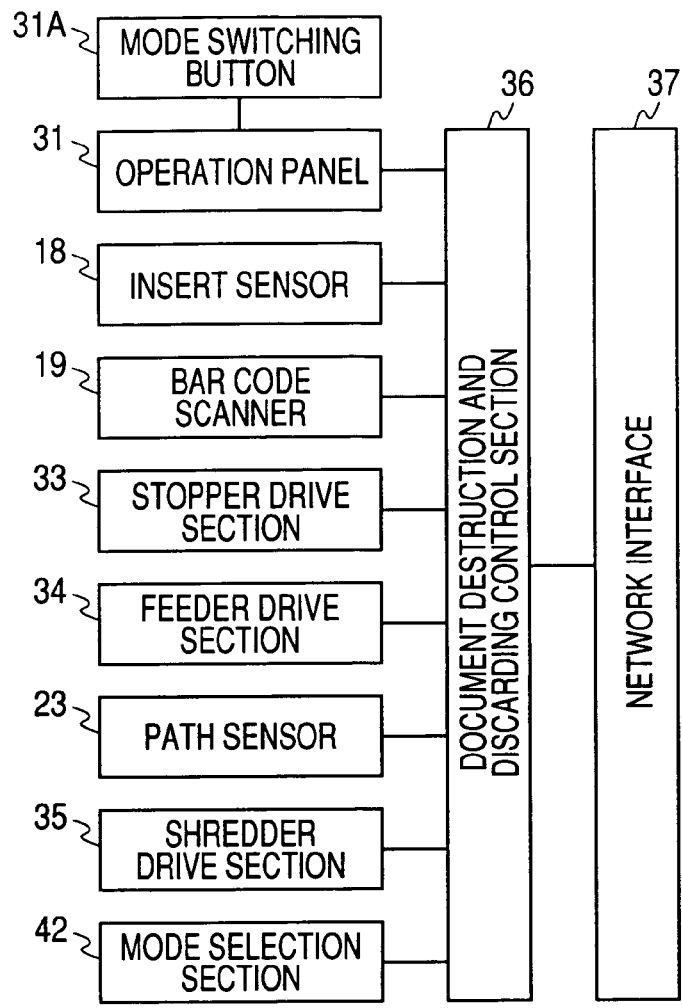
FIG. 19 is a block diagram showing the document destruction and discarding apparatus according to the third mechanical embodiment.

FIG. 19 is a block diagram showing the third mechanical embodiment of the document destruction and discarding apparatus 3. This document destruction and discarding apparatus 3 comprises an operation panel 31, a bar code scanner 19, a stopper drive section 33, a feeder drive section 34, a shredder drive section 35, a mode selection section 42, a document destruction and discarding control section 36 and a network interface 37, in addition to the components as described above.

The operation panel 31 is operated by the user who uses the document destruction and discarding apparatus 3. The operation panel 31 is composed of the operation buttons (e.g., a start button, a stop button) and a display panel for displaying various messages including an operation state of the document destruction and discarding apparatus 3 and an operation guidance (guide message), for example. The operation panel 31 has a mode switching button 31A as one of the operation buttons. The mode switching button 31A is the button for making an instruction of switching the destruction and discarding mode that occurs in the document destruction and discarding apparatus 3.

The bar code scanner 19 optically reads the bar code printed on the document employing the bar code scanner 19, and outputs the original information (data) stored in the bar code within the document, based on the read result.

The stopper drive section 33 performs the opening or closing (rising or setting) operation of the stopper gate 20. The stopper drive section 33 may have an electronic plunger as the drive source.

The feeder drive section 34 rotates the feed rolls 21 and 22. The feeder drive section 34 may have a motor as the drive source.

The shredder drive section 35 drives and rotates the shredder portion 24. The shredder drive section 35 may have a motor as the drive source.

The mode selection section 42 selects any one of two destruction and discarding modes that the document destruction and discarding apparatus 3 has. Of the two destruction and discarding modes that the document destruction and discarding apparatus 3 has, the first destruction and discarding mode is the mode for making the destruction and discarding process for the document without reading the document ID of the document of destruction and discarding object. The second destruction and discarding mode is the mode for making the destruction and discarding process for the document when a destruction and discarding permission is given from the document management apparatus 2 by making an inquiry for the destruction and discarding permission for the document to the document management apparatus 2 with the read document ID designated without reading the document ID of the document of destruction and discarding object.

The document destruction and discarding control section 36 controls various processing operations involving the destruction and discarding of document in accordance with a given control program. Also, this document destruction and discarding control section 36 performs the destruction and discarding process for the document in the destruction and discarding mode selected by the mode selection section 42. This document destruction and discarding control section 36 has the operation panel 31, the bar code scanner 19, the stopper drive section 33, the feeder drive section 34 and the shredder drive section 35 which are electrically connected. Also, the document destruction and discarding control section 36 has the insert sensor 18, the path sensor 23, and the mode selection section 42 which are electrically connected.

The network interface 37 is a communication interface for enabling the document destruction and discarding apparatus 3 to make the data transmission and reception with other apparatuses (including the document generation apparatus 1 and the document management apparatus 2) on the network 4. The data transmission and reception through the network interface 37 is controlled by the document destruction and discarding control section 36.

Next, a document management method employing the document management system with the above configuration will be described below. First of all, the document treated in the invention is assigned an intrinsic document ID and generated by the document generation apparatus 1. The document ID may be composed of numerals alone, or an appropriate combination of numerals and alphabets or symbols. In the following, a specific management method in treating the document that is a voucher for auditing or tax inspection will be described.

Figure 20A:
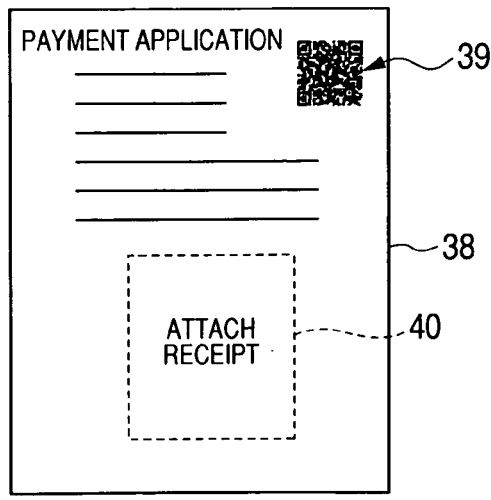
FIGS. 20A and 20B are views for explaining a creation example of document.

First of all, the document data (electronic data) with bar code that is a pattern of the document is inputted into the document generation apparatus 1, and the document data is printed on the paper by an image output section 8, whereby the grounded paper for the payment application 38 as shown in FIG. 20A is created. The document data may be created on the document management apparatus 2, and inputted from this document management apparatus 2 via the network 4 into the document generation apparatus 1, or separately the document data may be created on a server apparatus for creating the document data, and inputted from this server apparatus via the network 4 into the document generation apparatus 1.

Figure 20B:
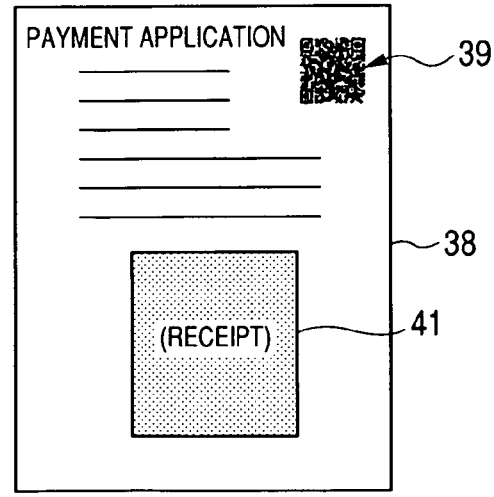

Thus, the QR code 39 including the document ID assigned to the payment application 38 as one information is printed at the corner part of the payment application 38 that is generated by the document generation apparatus 1. That is, the payment application 38 that is generated by the document generation apparatus 1 corresponds to the "document with the document ID appended". Also, the ground paper of the payment application 38 is provided with an area 40 to attach the receipt. Therefore, the applicant attaches the receipt 41 on the ground paper of the payment application 38, as shown in FIG. 20B, and additionally writes and stamps (seals), as needed, to create the original payment application.

If the payment application 38 is created in this way, this payment application 38 is set on a manuscript stand of the document generation apparatus 1, and an image of the payment application 38 is read by an image reading section 6. Or the generation information is transmitted from the document generation apparatus 1 to the document management apparatus 2 via the network 4, and registered as the data. Then, the image data of the payment application 38 read by the image reading section 6 is transmitted to the document management apparatus 2 via the network 4. Also, the original of the payment application 38 that has been read is bound and stored in a file.

On the other hand, the document management apparatus 2 receiving the image data (scan data) of the payment application 38 from the document generation apparatus 1 accumulates its image data in the database section 14, and the image of the QR code included in the image data is analyzed by the bar code analysis section 12, whereby the decode information for the document ID assigned to the payment application 38 is extracted. The document ID acquired in this way is registered in the document management table by the document management control section 15. The document management table is created within the database section 14.

FIG. 21 is a view showing one example of the document management table. The document management table has the document ID, the document generation date and time, the document storage period and the document destruction and discarding date and time, which are registered associated with each other, as shown in FIG. 21. When the document generation date and time and the document destruction and discarding date and time are registered, it is desirable that the time is the standard time acquired from a time distribution server or a time authentication server on the Internet via the network 4. The document ID may be registered by decoding the QR code in the bar code analysis section 12, or when the document data with bar code is created on the document management apparatus 2 or another server apparatus, the document ID assigned to the document by the document management apparatus 2 itself, or another server apparatus may be registered. The document generation date and time indicates the date and time when the document is generated. In this embodiment, the date and time when the document generation apparatus 1 transmits the image data read from the document such as the payment application 38 to the document management apparatus 2, or the document management apparatus 2 receives the image data of the document transmitted from the document generation apparatus 1 is registered as the "document generation date and time".

The document storage period indicates the storage period of the document in date and time. It is required that the document with the document ID registered in the document management table is stored till the document storage period expires. However, if the document storage period is registered as "no designation", the document is treated to be destroyed and discarded at any time, or if the document storage period is registered as "permanent", the document is treated not to be destroyed and discarded at any time.

Generally, as for the receipt, the storage period is decided by its received amount of money. Therefore, if the information for setting the document storage period, in addition to the information of the document ID, is contained in the QR code printed on the payment application 38, for example, the document storage period can be automatically set from the decode information of the bar code analysis section 12. Specifically, if the information specifying the document storage period of the payment application 38 as six years is contained in the QR code, the document storage period can be set to the date and time six years after the generation date and time of the payment application 38. Besides, if the information indicating the received amount of money in the receipt attached on the payment application 38 is contained in the QR code, the storage period of the receipt can be automatically deduced from that information, and set in the document storage period of the document management table. Further, the document storage period of the document management table can be set or changed by manual input (manual operation) of the user, employing the user interface 11 provided for the document management apparatus 2.

The document destruction and discarding date and time indicates the date and time when the document is destroyed and discarded. The destruction and discarding of the document is performed by the document destruction and discarding apparatus 3. Therefore, the document destruction and discarding date and time of the document management table is registered in the date and time when a notification of completing the destruction and discarding of the document (hereinafter referred to a "destruction and discarding completion notification") is issued from the document destruction and discarding apparatus 3 to the document management apparatus 2 by designating the document ID of the document that is destroyed and discarded.

As for the document management table, the user ID of the user who creates the document on the document generation apparatus 1 may be registered as a document creator in the document management table, or the user ID of the user who destroys and discards the document on the document destruction and discarding apparatus 3 may be registered as the person who destroys and discards the document in the document management table. In this case, the ID information of the user who creates or destroys and discards the document can be acquired employing the existent user authentication technique (e.g., user authentication technique employing the IC card).

Figure 22:
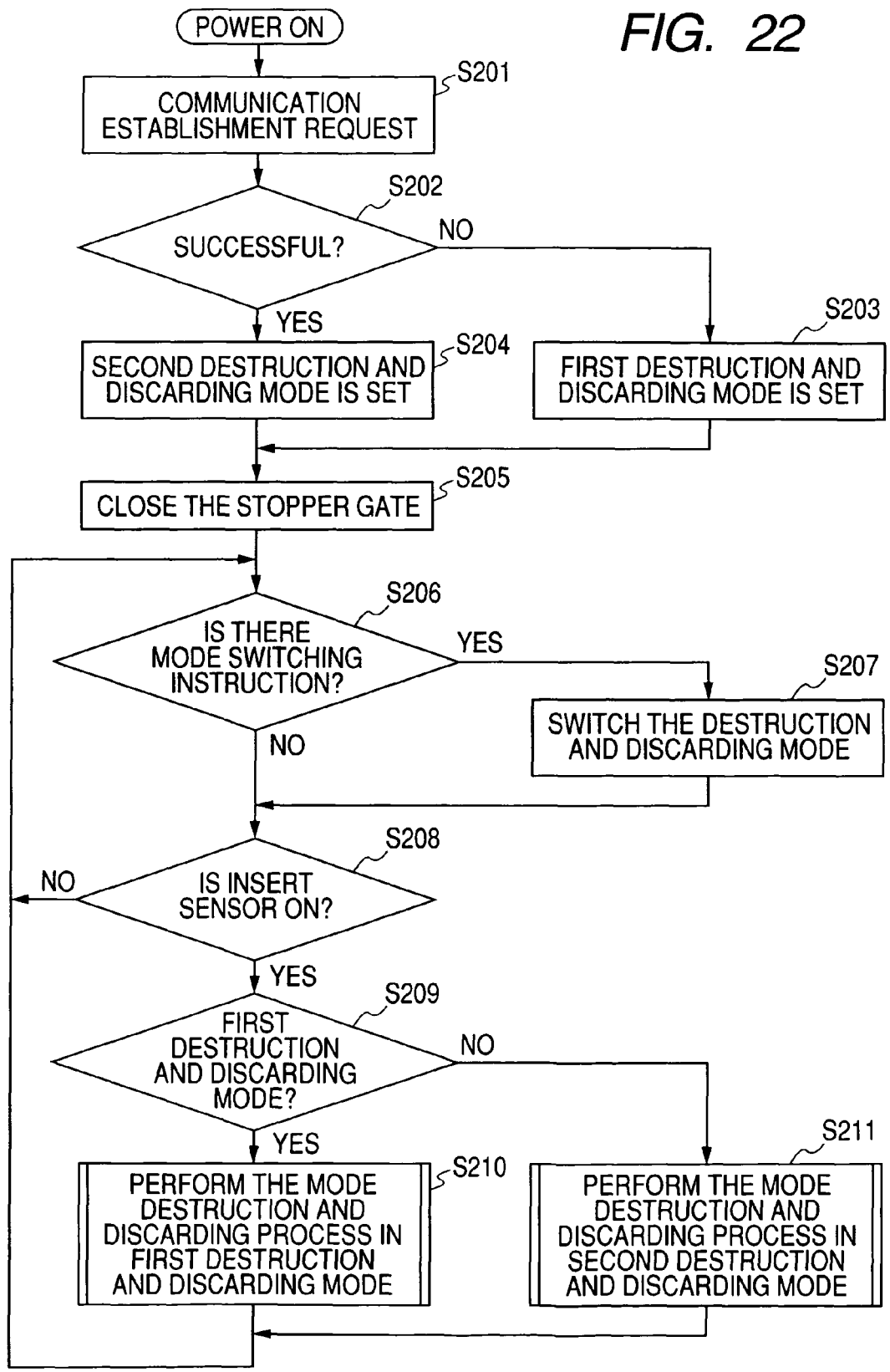
FIG. 22 is a flowchart showing a processing procedure for the document destruction and discarding apparatus according to the third mechanical embodiment.

FIG. 22 is a flowchart showing a processing procedure in destroying and discarding the document in the third mechanical embodiment of the document destruction and discarding apparatus 3. First of all, if the power of the document destruction and discarding apparatus 3 is turned on, the network interface 37 makes a communication establishment request to the document management apparatus 2 upon a control instruction from the document destruction and discarding control section 36 (step S201). At this time, if the document management apparatus 2 normally receives the communication establishment request from the document destruction and discarding apparatus 3 via the network 4, the communication connection between the document management apparatus 2 and the document destruction and discarding apparatus 3 is established. Also, if the document management apparatus 2 does not normally receive the communication establishment request from the document destruction and discarding apparatus 3 for some cause (e.g., disconnection or trouble of the network 4, turning off the document management apparatus 2, system down, etc.), the communication connection between the document management apparatus 2 and the document destruction and discarding apparatus 3 is not established.

Next, the document destruction and discarding control section 36 judges whether or not the communication establishment with the document management apparatus 2 is successful (step S202). And if the communication establishment is unsuccessful, the mode selection section 42 sets the document destruction and discarding mode to the first destruction and discarding mode (step S203), while if the communication establishment is successful, the mode selection section 42 sets the document destruction and discarding mode to the second destruction and discarding mode (step S204). Thereafter, the document destruction and discarding control section 36 drives the stopper drive section 33 to close the stopper gate 20 (step S205).

Next, the document destruction and discarding control section 36 judges whether or not the user depresses a mode switching button 31A (makes an instruction of switching the destruction and discarding mode) (step S206). If the mode switching mode 31A is depressed (there is an instruction of switching the destruction and discarding mode), the setting of the destruction and discarding mode is switched according to the instruction (step S207). That is, if the destruction and discarding mode before the mode switching button 31A is depressed is set at the first destruction and discarding mode, the setting of the destruction and discarding mode is switched from the first destruction and discarding mode to the second destruction and discarding mode. Also, if the destruction and discarding mode before the mode switching button 31A is depressed is set at the second destruction and discarding mode, the setting of the destruction and discarding mode is switched from the second destruction and discarding mode to the first destruction and discarding mode.

On the contrary, if the mode switching button 31A is not depressed, it is judged whether or not the signal (on/off state) of the insert sensor 18 is turned on (step S208). Herein, the user who employs the document destruction and discarding apparatus 3 lays the document of destruction and discarding object on the document tray section 17, and inserts it deeply. Also, if the QR code is printed on the document of destruction and discarding object, the document is inserted in an orientation where the print face of the QR code is on the top face (upward), and the printed part of the QR code is on the downstream side (deep side) in the insertion direction. Then, the signal of the insert sensor 18 is switched from the off state to the on state immediately before the leading edge of the document is pushed against the stopper gate 20. Thus, the document destruction and discarding control section 36 returns to step S206, if the signal of the insert sensor 18 is in the off state, and judges whether or not the current destruction and discarding mode selected (set) by the mode selection section 42 is the first destruction and discarding mode (step S209), if the signal of the insert sensor 18 is in the on state.

Herein, the document destruction and discarding control section 36 performs the document destruction and discarding process in accordance with the first destruction and discarding mode (step S210), if the current destruction and discarding mode is set at the first destruction and discarding mode, and returns to step S206. Also, the document destruction and discarding control section 36 performs the document destruction and discarding process in accordance with the second destruction and discarding mode (step S211), if the current destruction and discarding mode is set at the second destruction and discarding mode, and returns to step S206.

Figure 23:
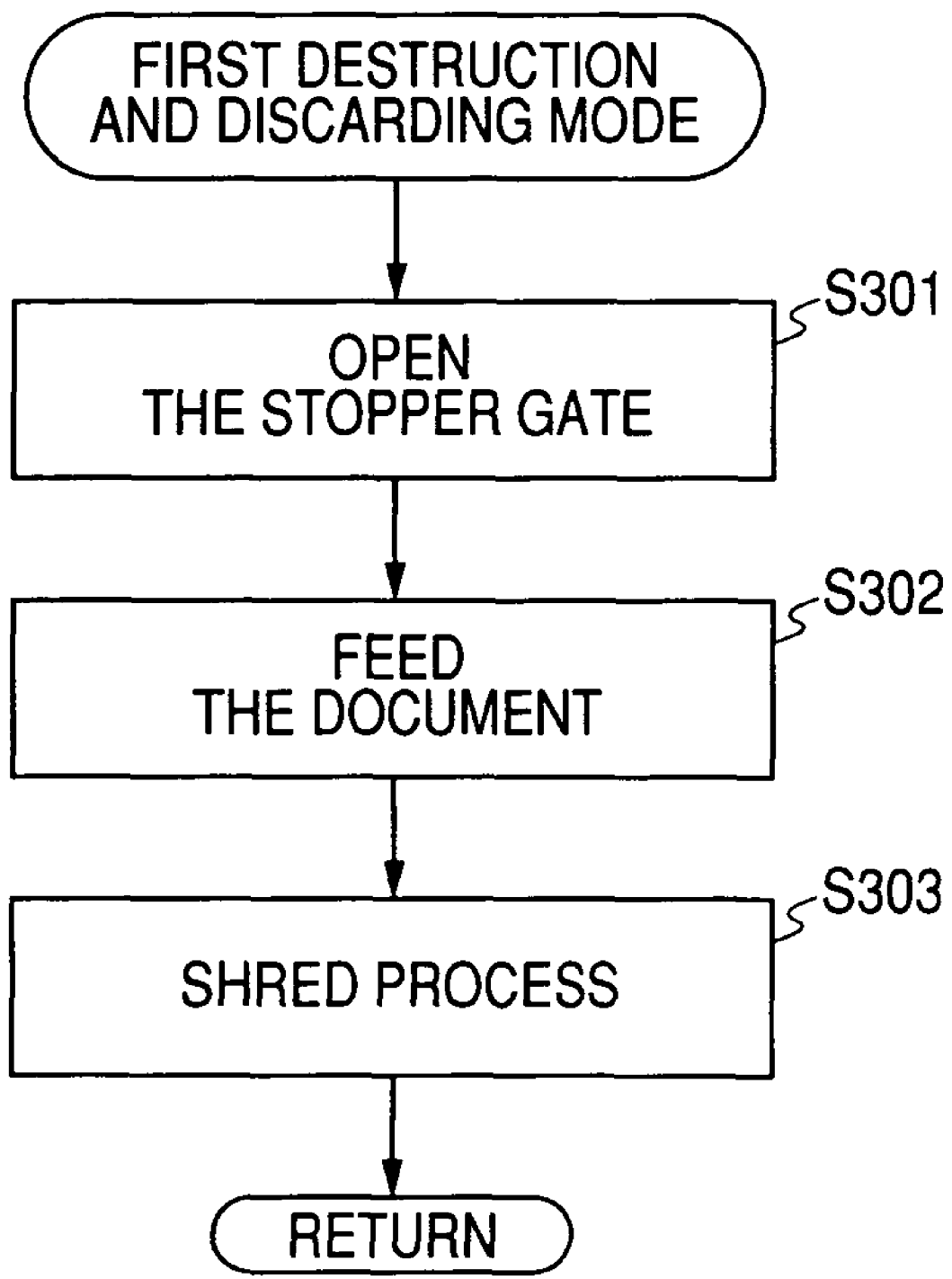
FIG. 23 is a flowchart showing a procedure for performing a document destruction and discarding process in the first destruction and discarding mode.

FIG. 23 is a flowchart showing a procedure for performing the document destruction and discarding process in accordance with the first destruction and discarding mode at step S210. First of all, the document destruction and discarding control section 36 drives the stopper drive section 33 to open the stopper gate 20 (step S301). At this time, the document destruction and discarding control section 36 issues an instruction of starting to rotate the feed rolls 21 and 22, and the feeder drive section 34 starts to rotate the feed rolls 21 and 22 in accordance with this instruction.

Accordingly, the document thrust in by the user is fed to the downstream side of the document conveying path, along with the rotation of the feed rolls 21 (step S302). In this way, the document fed by the feed rolls 21 is passed to the feed rolls 22 on the more downstream side in the conveying direction, and conveyed to the shredder portion 24 along with the rotation of the feed rolls 22. At this time, if the rear end of the document passes by the sensing position of the insert sensor 18, so that the insert sensor 18 is switched from the on state to the off state, the document destruction and discarding control section 36 drives the stopper drive section 33 at a predetermined timing (e.g., the timing when the rear end of the document gets rid of the feed rolls 21), returning the stopper gate 20 to the original state (closed state).

Also, if the leading edge of the document passes by the sensing position of the path sensor 23 during the conveyance with the feed rolls 22, so that the path sensor 23 is switched from the on state to the off state, the document destruction and discarding control section 36 makes an instruction of starting the driving to the shredder drive section 35, and the shredder drive section 35 receiving this instruction starts to drive the shredder portion 24. Accordingly, the document fed by the feed rolls 22 is directly taken in by the shredder portion 24, and shredded through the shredding process (step S303).

Figure 24:
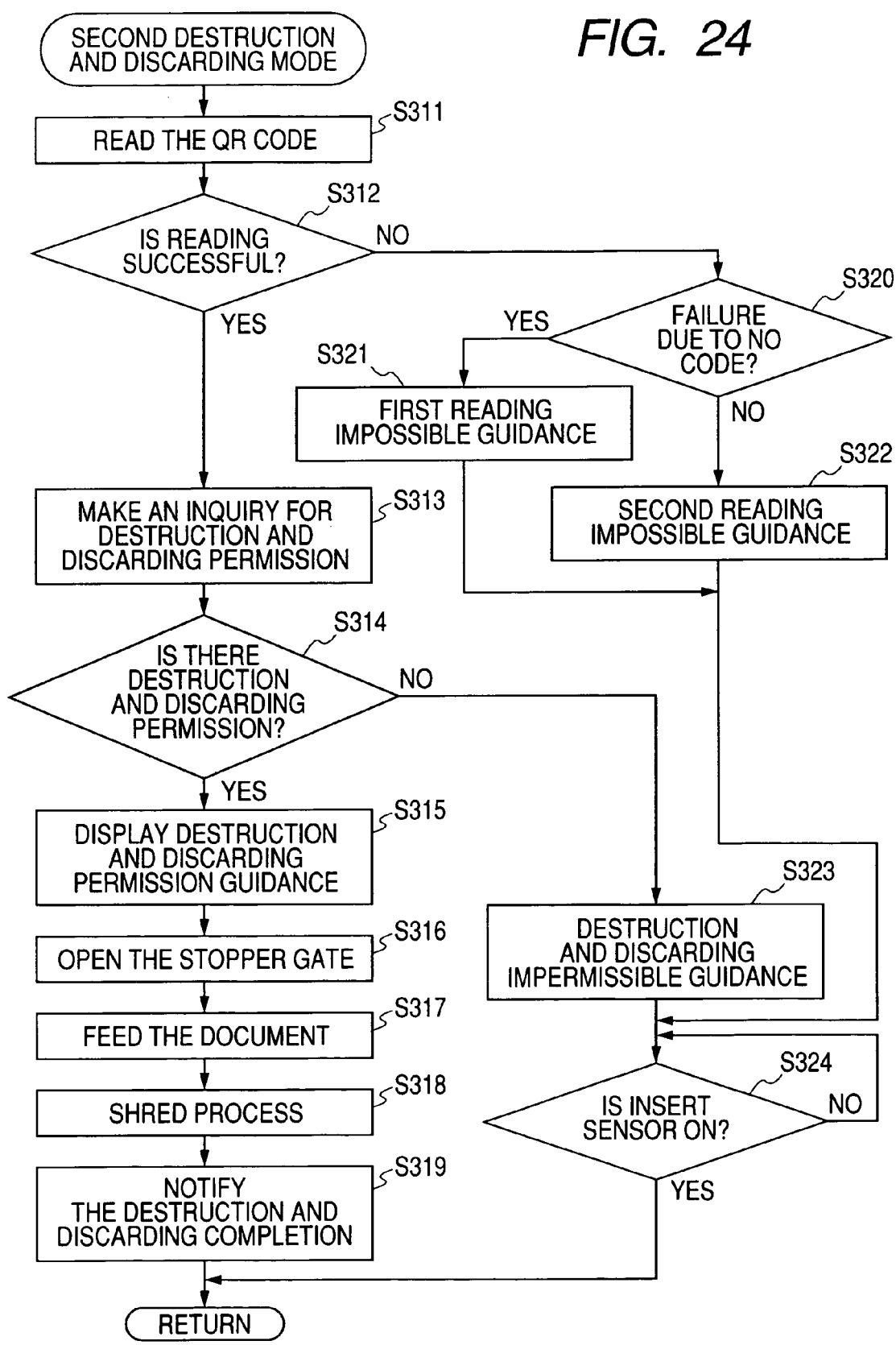
FIG. 24 is a flowchart showing a procedure for performing the document destruction and discarding process in the second destruction and discarding mode.

FIG. 24 is a flowchart showing a procedure for performing the document destruction and discarding process in accordance with the second destruction and discarding mode at step S311. First of all, the destruction and discarding control section 36 makes an instruction of reading the bar code to the bar code scanner 19, and the bar code scanner 19 reads the QR code printed on the document in accordance with this reading instruction (step S311).

Next, the document destruction and discarding control section 36 judges whether or not the reading of the QR code is successful (step S312). Whether or not the reading of the QR code is successful is judged depending on whether or not the document ID is normally decoded from the QR code printed on the document by the bar code scanner 19. There are supposedly mainly two cases where the bar code scanner 19 fails in reading the QR code. The first case occurs where the QR code is not originally printed on the document, or the QR code does not exist in the code reading area E (see FIG. 18) (case of no code) because the orientation of inserting the document (face up or down, or from the top end or rear end of the document) is inappropriate. The second case occurs where the QR code exists in the code reading area E but is remarkably contaminated or broken, or the decode information of the QR code does not include the document ID (case of code defect).

When the reading of the QR code is successful, an inquiry as to whether or not the document designated by the document ID contained in this QR code is permitted to destroy and discard is issued to the document management apparatus 2 (step S313). The inquiry as to the document destruction and discarding permission is made by creating an inquiry message for destruction and discarding permission with the document ID contained in the QR code read by the bar code scanner 19 designated and transmitting this inquiry message from the network interface 37 via the network 4 to the document management apparatus 2. That is, the inquiry for document destruction and discarding permission is the inquiry as to whether or not the document designated by the document ID contained in this inquiry may be destroyed and discarded. In this connection, when the reading of the QR code is successful, the information contained in the QR code may be simply displayed on the operation panel 31.

The document management apparatus 2 receiving the inquiry message retrieves whether or not the document ID specified in the inquiry message is registered in the document management table in the retrieval section 13. If the applicable document ID exists, the document storage period registered associated with the document ID is confirmed. And when the date and time when the inquiry for document destruction and discarding permission is received from the document destruction and discarding apparatus 3 (inquiry date and time) passes the document storage period, an answer message indicating that the document destruction and discarding permission is given is returned to the document destruction and discarding apparatus 3. Also, when the date and time when the inquiry for document destruction and discarding permission is received from the document destruction and discarding apparatus 3 does not pass the document storage period, an answer message indicating that the document destruction and discarding permission is not given (the destruction and discarding of the document is inhibited) is returned to the document destruction and discarding apparatus 3.

If the answer message is returned from the document management apparatus 2 in this way, the document destruction and discarding control section 36 receives the answer message through the network interface 37, and checks whether or not the content of the answer message is to give the document destruction and discarding permission to the inquiry from the self apparatus (document destruction and discarding apparatus 3) (step S314) And if the answer message is to give the document destruction and discarding permission, a prepared destruction and discarding permission guidance (guide message) is displayed on the operation panel 31, and the stopper drive section 33 is driven to open the stopper gate 20 (steps S315 and S316) Also, the document destruction and discarding control section 36 makes an instruction of starting to rotate the feed rolls 21 and 22 to the feeder drive section 34 at this time, and the feeder drive section 34 starts to drive and rotate the feed rolls 21 and 22 in accordance with this instruction. One example of the destruction and discarding permission guidance may be "The stopper gate 20 is opened to destroy and discard this document. Insert the document more deeply."

Thereafter, if the user inserts the document deeply in accordance with a guidance displayed on the operation panel 31, the leading edge of the document is pushed against the nip part of the feed rolls 21, and the document is fed to the downstream side on the document conveying path, along with the rotation of the feed rolls 21 (step S317). In this way, the document fed by the feed rolls 21 is passed to the feed rolls 22 on the more downstream side in the conveying direction, and conveyed to the shredder portion 24 along with the rotation of the feed rolls 22. At this time, the rear end of the document passes by the sensing position of the insert sensor 18, so that the insert sensor 18 is switched from the on state to the off state, the document destruction and discarding control section 36 drives the stopper drive section 33 at a predetermined timing (e.g., the timing when the rear end of the document gets rid of the feed rolls 21), returning the stopper gate 20 to the original state (closed state).

Also, if the leading edge of the document passes by the sensing position of the path sensor 23 during the conveyance with the feed rolls 22, so that the path sensor 23 is switched from the off state to the on state, the document destruction and discarding control section 36 makes an instruction of starting the driving to the shredder drive section 35, and the shredder drive section 35 receiving this instruction starts to drive the shredder portion 24. Accordingly, the document fed by the feed rolls 22 is directly taken in by the shredder portion 24, and shredded through the shredding process (step S318).

Thereafter, if the rear end of the document passes by the sensing position of the path sensor 23, so that the path sensor 23 is switched from the on state to the off state, the document destruction and discarding control section 36 transmits, to the document management apparatus 2, a message of destruction and discarding completion notification indicating that the destruction and discarding of the document is completed by designating the document ID of the document, for which the document destruction and discarding permission is given before, in a predetermined time (specifically the time taken since the rear end of the document is taken into the shredder portion 24 till the entire document is shredded) from the time when the path sensor 23 is turned off (step S319). The destruction and discarding completion notification message is transmitted from the network interface 37 via the network 4 to the document management apparatus 2. On the contrary, the document management apparatus 2 receiving the destruction and discarding completion notification message from the document destruction and discarding apparatus 3 registers the date and time when the message is received as the destruction and discarding history information corresponding to the document ID designated in the message in a column of document destruction and discarding date and time.

On the other hand, if the reading of the QR code is unsuccessful at step S312, it is judged whether or not the cause of failure is no code (first case) (step S320). And if the cause of failure is no code, a prepared first reading impossible guidance is displayed on the operation panel 31 (step S321). One example of the first reading impossible guidance may be "No code is found. Pull out the document and check the position of code or the orientation of document." Also, if the cause of failure is a code defect (second case), a prepared second reading impossible guidance is displayed on the operation panel 31 (step S322). One example of the second reading impossible guidance may be "A code reading error occurred. Pull out the document and check the status of code."

Also, if the document destruction and discarding permission is not given from the document management apparatus 2 at step S314, a prepared destruction and discarding impermissible guidance is displayed on the operation panel 31 (step S323). One example of the destruction and discarding impermissible guidance may be "The destruction and discarding of this document is inhibited. Pull out the document." Also, after the reading impossible guidance is displayed at step S321 or S322 or the destruction and discarding impermissible guidance is displayed at step S323, it is judged whether or not the insert sensor 18 is switched from the on state to the off state (the document is taken out of the document tray portion 17) (step S324). If the insert sensor 18 is switched to the off state, the procedure goes to the next step at that time.

In the document management system as described above, the document ID appended to the document is managed corresponding to the document storage period in the document management apparatus 2, in which when the document is destroyed and discarded employing the document destruction and discarding apparatus 3, the document ID contained in the QR code is acquired by reading the QR code printed on the document of destruction and discarding object with the bar code scanner 19, an inquiry as to whether or not the document specified by this document ID is permitted to destroy and discard is made to the document management apparatus 2, and if an answer content to this inquiry is to give a destruction and discarding permission, the destruction and discarding process for the document is performed in the document destruction and discarding apparatus 3. Therefore, the person in charge does not need to confirm the possibility of destroying and discarding the document every time as conventionally performed, and the document in which the storage period has expired can be securely destroyed and discarded. Also, it is possible to avoid falsely destroying and discarding the document due to an artificial check error.

Also, since there are the first destruction and discarding mode in which the document is destroyed and discarded without reading the document ID and the second destruction and discarding mode in which the document is destroyed and discarded by reading the document ID and receiving the destruction and discarding permission from the document management apparatus 2, the first destruction and discarding mode is selected when the document having no document ID appended is destroyed and discarded, and the second destruction and discarding mode is selected when the document with the document ID appended is destroyed and discarded. Thus, the document destruction and discarding apparatus 3 can be employed properly depending on the class of the document. Accordingly, the efficient document destruction and discarding operation can be performed in the office environment where the confidential document and other general document are mixed.

Also, when the document destruction and discarding apparatus 3 makes a communication establishment request to the document management apparatus 2, if the communication connection is not established between them (the communication establishment is unsuccessful) for some reason (accident), the second destruction and discarding mode is automatically selected by the mode selection section 42 for selecting the destruction and discarding mode, whereby the ordinary document destruction and discarding operation can be performed without trouble.

Also, for the document generated employing the document generation apparatus 1, the document ID appended to the document is managed corresponding to the document storage period in the document management apparatus 2, whereby the document can be managed consistently from the generation to the destruction and discarding of the document.

Also, when the destruction and discarding process (shredding process) for the document is made in the document destruction and discarding apparatus 3, a message of destruction and discarding completion notification with the document ID of the document designated is transmitted to the document management apparatus 2, and the document management apparatus 2 receiving its notification message registers the document destruction and discarding date and time as the destruction and discarding history information corresponding to the applicable document ID in the document management table, whereby the date and time when the document is actually destroyed and discarded can be left as the history, together with the fact that the document is destroyed and discarded. Moreover, the user ID of the person who disposes of document in charge of destroying and discarding the document can be left as one destruction and discarding history information. As a result, it is possible to confirm later when and by whom the document designated by the certain document ID is destroyed and discarded.

Also, when the document generation process (printing process) is performed in the document generation apparatus 1, the date and time when the document is generated and the user ID of the document creator in charge of generating the document are registered along with the document ID of the document in the document management table of the document management apparatus 2, whereby it is possible to confirm later when and by whom the document designated by the certain document ID is destroyed and discarded.

While the QR code including the document ID is printed on the document in the above embodiment, the invention is not limited to this embodiment, but the numerals or symbols indicating the document ID may be printed on the document. Also, the appendage of the document ID on the document is not limited to printing, but the document ID may be appended by labeling on the document.

Also, while the document destruction and discarding apparatus 3 makes a communication establishment request in turning on the power, the communication establishment request may be repeatedly made to the document management apparatus 2 at a predetermined time period, till the communication connection with the document management apparatus 2 is established later, if the communication establishment at the time of turning on the power is unsuccessful. In this case, at the stage where the trouble of the network 4 is resolved or the document management apparatus 2 is recovered from the system down, the communication connection is automatically established, and the setting of the destruction and discarding mode is switched to the second destruction and discarding mode.

Fourth Mechanical Embodiment

Figure 25:
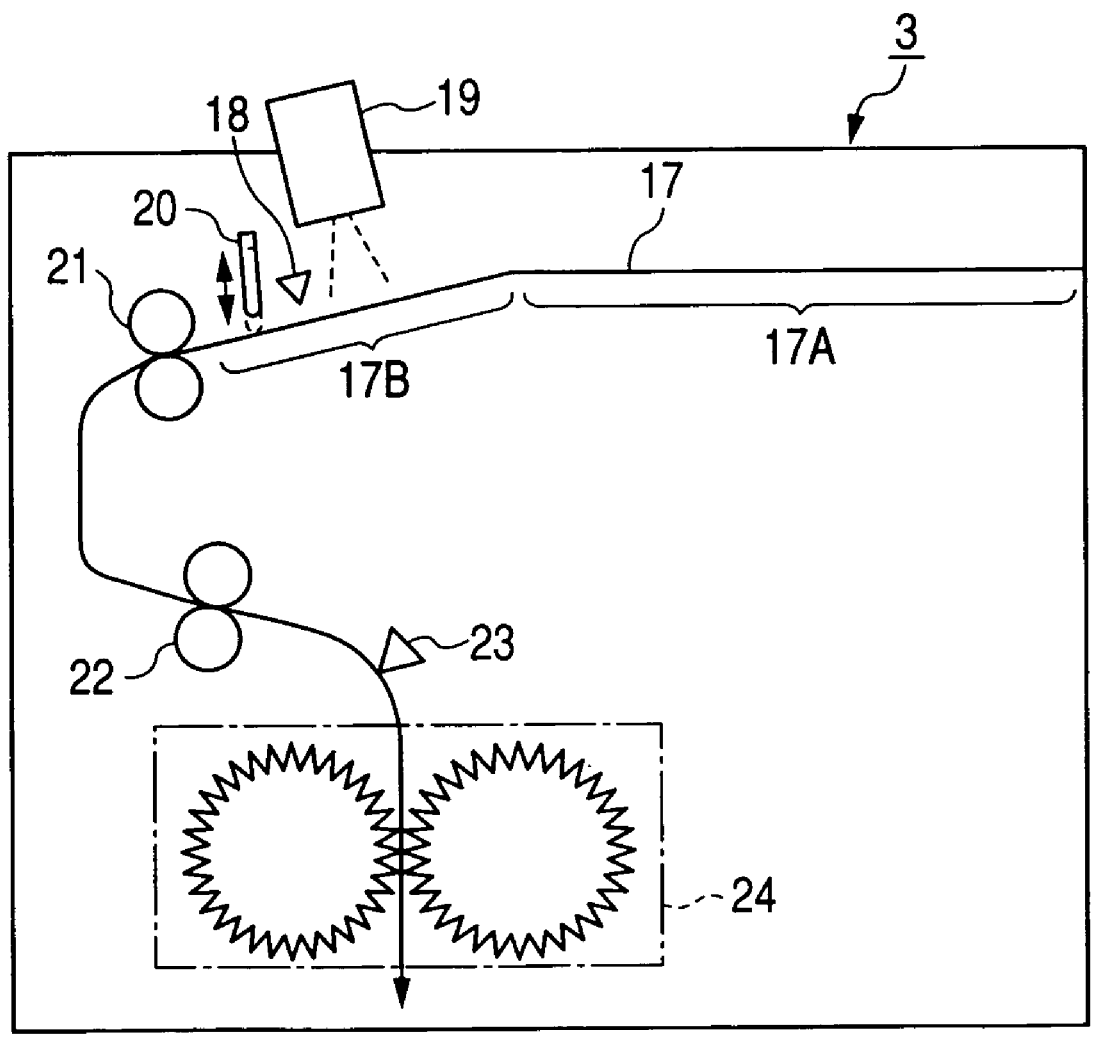
FIG. 25 is a schematic view showing a document destruction and discarding apparatus according to a fourth mechanical embodiment.

FIG. 25 is a schematic view showing a fourth mechanical embodiment of the document destruction and discarding apparatus 3. This document destruction and discarding apparatus 3 is constructed employing a shredder device, for example, and comprises a document tray portion 17, an insert sensor 18, a bar code scanner 19, a stopper gate 20, the feed rolls 21 and 22, a path sensor 23 and a shredder portion 24.

The document tray portion 17 has a guide plane on which the documents to be destroyed and discarded are obliquely carried. The guide plane (upper face) of the document tray portion 17 has a horizontal guide plane 17A formed in almost horizontal state and an inclined guide plane 17B inclined obliquely from the horizontal guide plane 17A. The inclined guide plane 17B of the document tray portion 17 is inclined obliquely from an end part of the horizontal guide plane 17A to be gradually lower toward the feed rolls 21. Also, the inclined guide plane 17B of the document tray portion 17 extends beyond the stopper gate 20 to the front part of the feed rolls 21. Also, a document conveying path is separately formed on the downstream side of the feed rolls 21, employing a chute guide (not shown).

The insert sensor 18 senses that the document is inserted into a predetermined position on the document tray portion 17. The "predetermined position" means the position where the Q code is arranged in a code reading area E with the bar code scanner 19, namely, the position where the QR code printed on the document can be read by the bar code scanner 19, when the document with the QR code printed is inserted in the normal orientation. The insert sensor 18 is composed of an optical sensor of the reflection type having a light emitting element and a light receiving element, for example, and turned on when the document exists at the sensing position of the insert sensor 18, or turned off when no document exists.

The bar code scanner 19 optically reads a bar code appended to the document of destruction and discarding object, and outputs the original information (data) contained in the bar code within the document, based on the read result. The bar code scanner 19 takes an image of the bar code into an area sensor 25 by applying the light of a light source inside the scanner to a bar code recorded part of the document of destruction and discarding object and receiving a reflected light from the bar code recorded part via a lens 26 inside the scanner with the area sensor 25. The bar code recorded part refers to the part where the bar code including the document ID as one information is recorded within the plane of the document, in which its position is defined beforehand dimensionally at the corner part of the document.

The stopper gate 20 is provided to stop the document of destruction and discarding object at the predetermined position in an insertion direction (thrusting direction) of the document on the document tray portion 17 and disposed between the insert sensor 18 and the feed rolls 21. The stopper gate 20 opens or closes an entrance of the document conveying path at the entrance part of the document conveying path formed by the feed rolls 21 and 22. In a state where the stopper gate 20 is closed, the stopper gate 20 is disposed to project downward to block the passage of the document leading from the document tray portion 17 to the feed roll 21. Accordingly, when the document laid on the document tray portion 17 is inserted deeply, the leading edge of the document is pushed against the stopper gate 20. On the contrary, in a state where the stopper gate 20 is opened, the stopper gate 20 is withdrawn upward to retreat from the passage of document leading from the document tray 17 to the feed roll 21. Accordingly, if the document laid on the document tray portion 17 is inserted more deeply, the leading edge of the document is pushed against the nip part of the feed roll 21.

The feed roll 21 conveys the document along the document conveying passage by rotating while nipping (pinching) the document inserted by opening the stopper gate 20. The document conveying passage is formed employing a conveying guide member (chute), not shown. The feed roll 22 conveys the document along the document conveying passage to the shredder portion 24 by rotating while nipping the document conveyed by the feed roll 21.

The path sensor 23 senses the document passing midway (at almost middle point) on the document conveying passage leading from the feed roll 22 to the shredder portion 24. The path sensor 23 is composed of an optical sensor of the reflection type having a light emitting element and a light receiving element, for example. The path sensor 32 is placed in the on state when the document exists at a sensing position of the path sensor 32, or in the off state when no document exists. Accordingly, when the leading edge of the document passes by the sensing position of the path sensor 23, the path sensor 23 is switched from the off state to the on state at the same time, and then, when the rear end of the document passes by the sensing position of the path sensor 23, the path sensor 23 is switched from the on state to the off state at the same time.

The shredder portion 24 cuts (shreds) the document while pulling the document fed by the feed roll 22 in one direction (arrow direction) This shredder portion 24 can perform the destruction and discarding process for a plurality of documents (e.g., a sheaf of about 20 documents of A4 size) collectively. Also, the shredder portion 24 can perform the destruction and discarding process for the document subjected to the stapling process by staples in its as-is state (without removing the staples).

Figure 26:
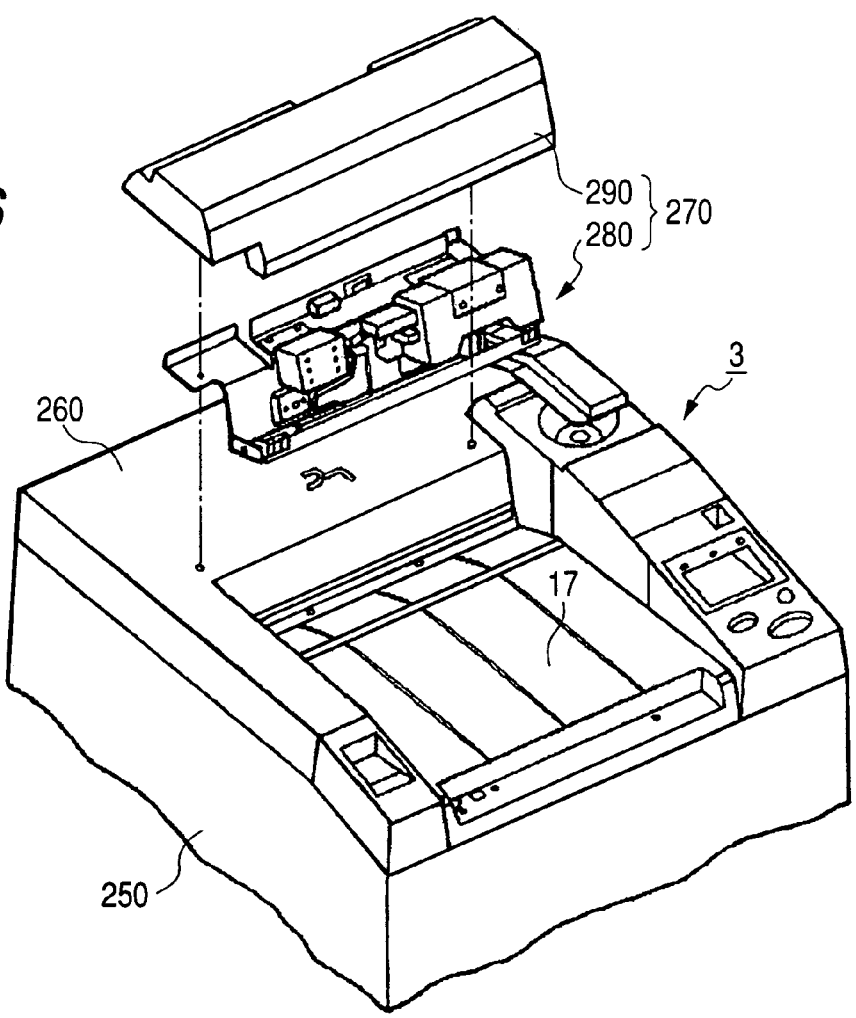
FIG. 26 is a perspective view of the document destruction and discarding apparatus, partly exploded.
Figure 27:
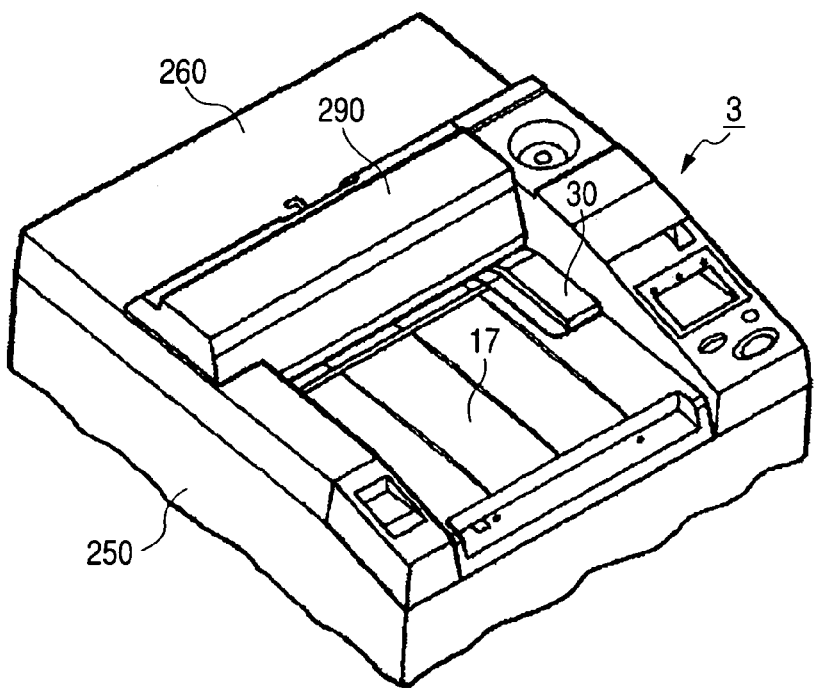
FIG. 27 is a perspective view of the document destruction and discarding apparatus.

FIG. 26 is a perspective view showing the document destruction and discarding apparatus 3, partly exploded. An apparatus main body 250 of the document destruction and discarding apparatus 3 has an upper cover 260 integrally. The document tray portion 17 is integrally formed on the upper cover 260. Also, a scan unit 270 is removably attached (mounted) by screws on the upper cover 260 of the apparatus main body 250. The scan unit 270 is largely composed of a unit main body 280 and a unit cover 290. The unit cover 290 is a resin cover over the unit main body 280 when the scan unit 270 is attached on the apparatus main body 250. Actually, the scan unit 270 is attached on the upper cover 260 of the apparatus main body 250, as shown in FIG. 27.

Figure 28:
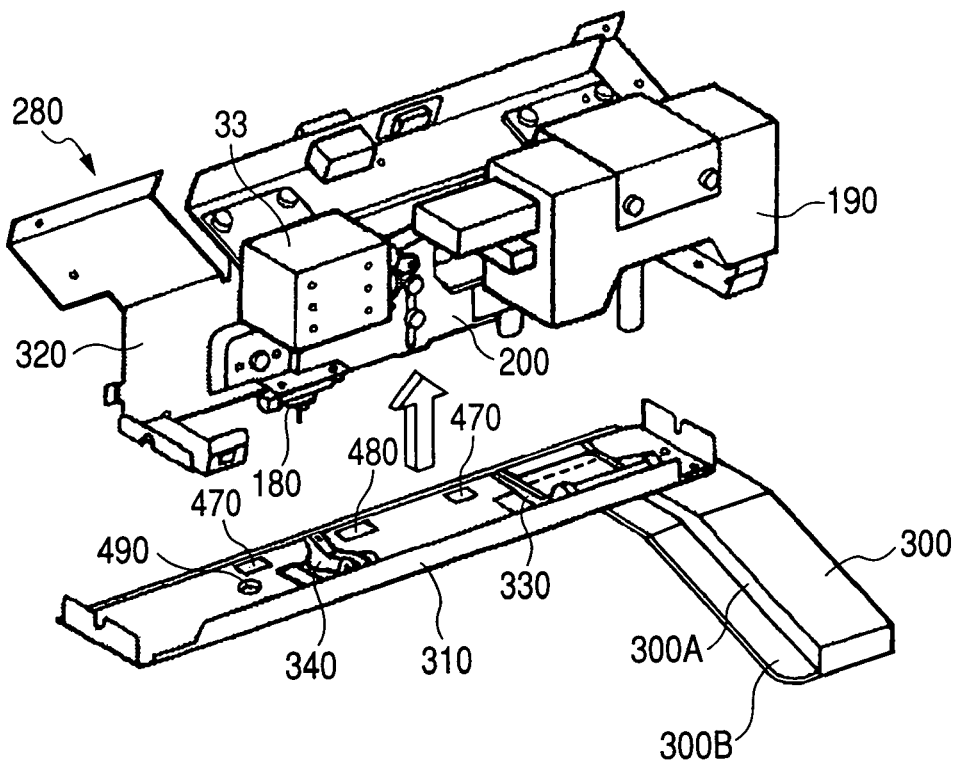
FIG. 28 is a perspective view of a unit main body, partly exploded.

FIG. 28 is a perspective view showing the unit main body 280, partly exploded. The unit main body 280 comprises a side guide 300, a first frame member 310 and a second frame member 320. The side guide 300 is a resin integral molding and attached by screws to one end part of the first frame member 310. The side guide 300 is disposed at one side end part of the document tray portion 17, when the unit main body 280 is attached on the upper cover 260. The side guide 300 is formed with a guide plane 300A along the insertion direction (thrusting direction) of document and a chute plane 300B making right angles (L-character shape) to the guide plane 300A.

The first frame member 310 forms a passage for document insertion guide with the document tray portion 17, and is attached with a predefined gap from the document tray portion 17.

Figure 29:
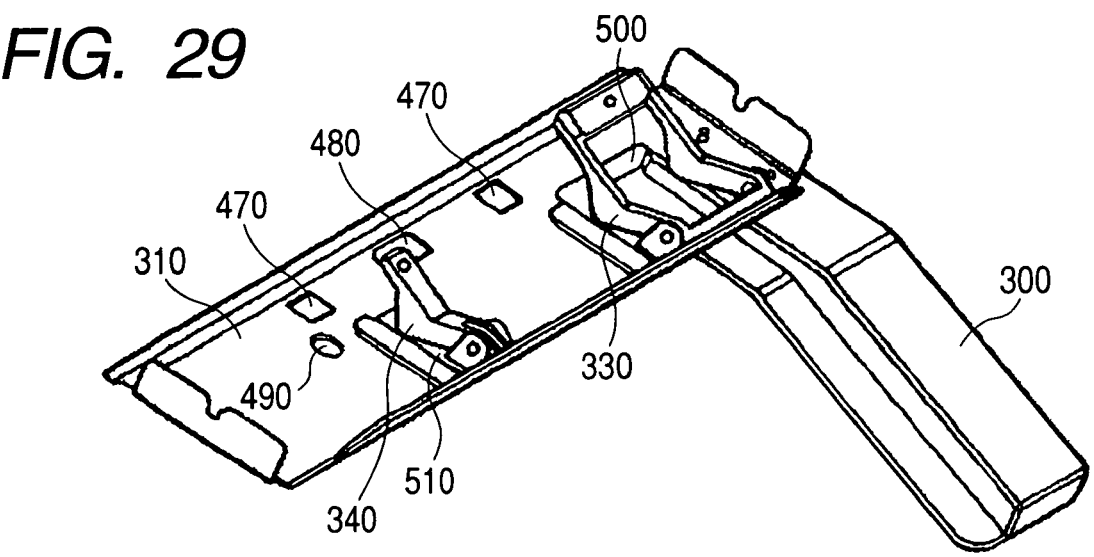
FIG. 29 is a perspective view of a component of the unit main body.

Also, a first weight member 330 and a second weight member 340 are mounted on the first frame member 310, as shown in FIG. 29. Each of the weight members 330 and 340 is supported swingably around a support shaft provided in the first frame member 310. These weight members 330 and 340 exert dead weights on the upper face (top face) of the document manually inserted into the predetermined position by the user to prevent the top end of the document from floating.

The second frame member 32 is attached on the first frame member 310 by screws. The second frame member 320 has attached the stopper drive portion 33, besides the insert sensor 18, the bar code scanner 19 and the stopper gate 20. The stopper drive portion 33 is a drive source for opening or closing the stopper gate 20.

Figure 30:
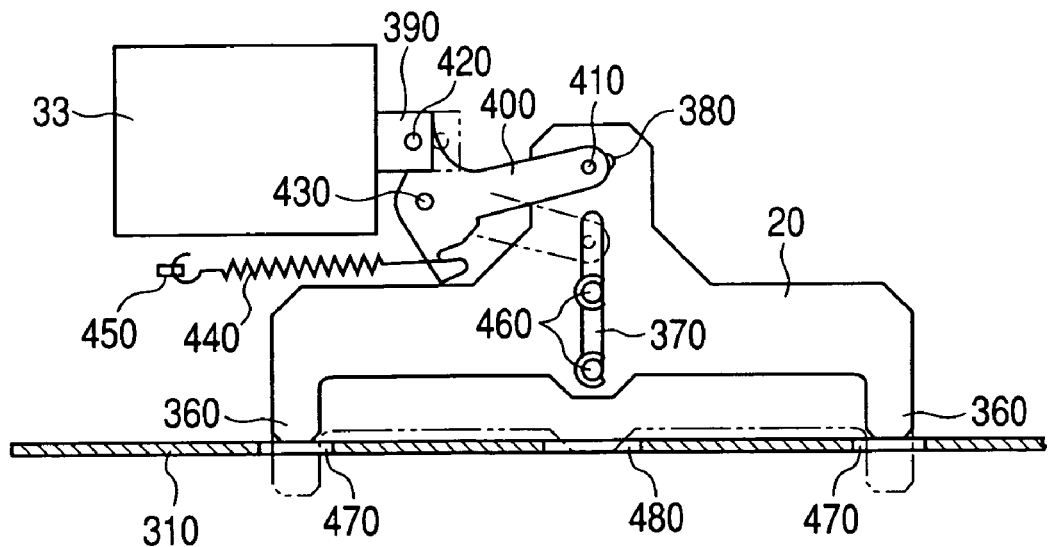
FIG. 30 is a view showing a driving mechanism for a stopper gate.

FIG. 30 is a view showing a drive mechanism for the stopper gate 20 employing the stopper drive portion 33. The stopper gate 20 is composed of a resin plate member, for example, and has one pair of left and right stopper portions 360, a longitudinal guide hole 370 and a transverse guide hole 380 integrally. One pair of stopper portions 360 are formed at both the left and right ends of the stopper gate 20 and in downwardly extending state. The guide hole 370 is formed centrally in a width direction of the stopper gate 20 (longitudinal direction in FIG. 30). The guide hole 380 is formed centrally in the width direction of the stopper gate 20 and almost directly above the guide hole 370.

The stopper drive portion 33 has integrally an output shaft 390. This output shaft 390 is connected via an actuation arm 400 to the stopper gate 20. That is, the actuation arm 400 is connected to the stopper gate 20 employing a first engagement pin 410 and connected to the output shaft 390 employing a second engagement pin 420. Also, the first engagement pin 410 is engaged in the guide hole 380 of the stopper gate 20.

The actuation arm 400 is supported rotatably around a support shaft 430 provided in the second frame member 320. Also, one end of an extension coil spring 440 is engaged to the actuation arm 400. The other end of the extension coil spring 440 is engaged in a spring latch 450 formed integrally with the second frame 320. The extension coil spring 440 is a member for urging the actuation arm 400 in one direction (clockwise direction in FIG. 30) around the support shaft 430.

The stopper gate 20 is supported vertically movably by one pair of upper and lower guide pins 460 provided in the second frame member 320. The guide pins 460 engage the guide hole 370 formed in the stopper gate 20, and are disposed vertically with a certain distance away. Also, each of the guide pins 460 has an anti-slip ring (e.g., C ring) to prevent the stopper gate 20 from falling off the second frame member 320.

Also, the first frame member 310 is formed with a gate hole 470 for pulling or inserting the stopper portion 360 of the stopper gate 20, an escape hole 480 for avoiding contact with the stopper gate 20, a sensing window 490 for the insert sensor 18, an opening portion 500 for making the bottom part of the first weight member 330 contact with the document tray portion 17, and an opening portion 510 for making the bottom part of the second weight member 340 contact with the document tray portion 17.

In a drive mechanism for the stopper gate 20 with the above constitution, the stopper drive portion 33 is turned from the non-energized state to the energized state, so that the output shaft 390 is drawn into a solenoid main body against a biasing force of the extension coil spring 440. Thereby, the actuation arm 400 is rotated in the counterclockwise direction around the support shaft 30. Also, the stopper gate 20 is lifted by the actuation arm 400. Therefore, the stopper portion 360 of the stopper gate 20 is placed in a state retreated from the gate hole 470 of the first frame member 310. Also, the stopper portion 360 of the stopper gate 20 is spaced from an inclined guide plane 17B of the document tray portion 17 (the stopper gate 20 is opened) in a state where the scan unit 270 is mounted on the upper cover 260 of the apparatus main body 250.

On the contrary, if the stopper drive section 33 is turned from the energized state to the non-energized state, the actuation arm 400 is rotated in clockwise direction around the support shaft 430 owing to a biasing force of the extension coil spring 440. Thereby, the output shaft 390 of the stopper drive portion 33 is pulled out of the main body of the stopper drive portion 33. Also, the stopper gate 20 is pressed down by the actuation arm 400. Therefore, the stopper portion 360 of the stopper gate 20 is disposed in a state projecting downward from the gate hole 470 of the first frame member 310. Also, the stopper portion 360 of the stopper gate 20 is pushed against the inclined guide plane 17B of the document tray portion 17 (the stopper gate 20 is closed) in a state where the scan unit 270 is mounted on the upper cover 260 of the apparatus main body 250.

Figure 31:
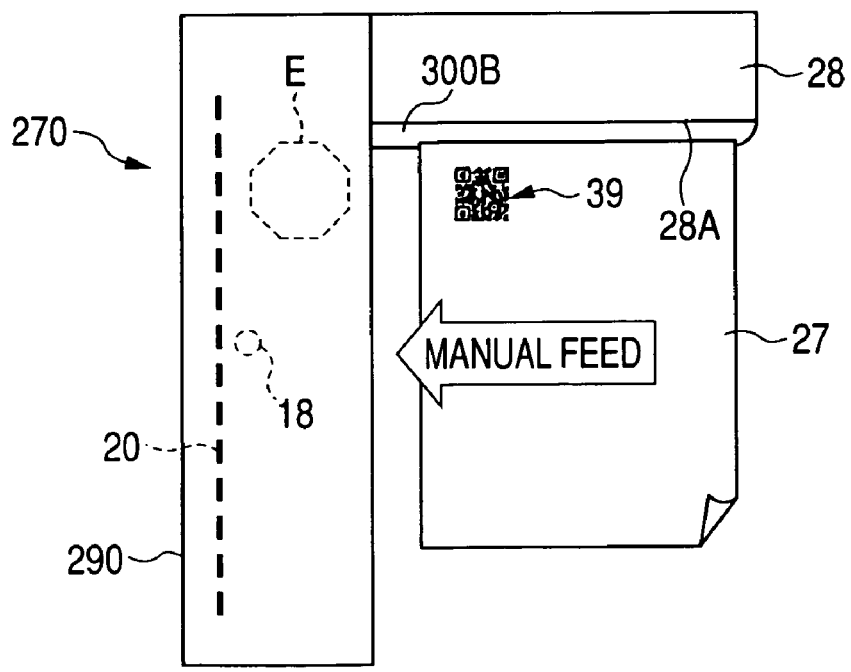
FIG. 31 is a view of a scan unit, as seen from the above.

FIG. 31 is a view of the scan unit 270, as seen from the above. A guide plane 300A of the side guide 300 is disposed in parallel to a thrusting direction (arrow direction) when manually inserting the document 27. The document 27 of destruction and discarding object is inserted in an orientation where a recorded part (printed part) of the QR code 39 is placed at the corner part on the top side. At this time, one side end of the document 27 is contacted with and moved along the guide plane 300A of the side guide 300 to position the document 27 in the direction orthogonal to the thrusting direction. Also, one side end neighborhood of the document 27 is laid on a chute face 300B of the side guide 300.

Thereby, the recorded part of the QR code 39 is positioned within the code reading area E with the bar code scanner 19 in a state where the leading edge of the document 52 is pushed against the stopper gate 20 by manual insertion of the user. Also, the insert sensor 18 is disposed in front of (directly close to) the stopper gate 20 in the insertion direction of the document. Therefore, when the leading edge of the document 52 manually inserted by the user is pushed against the stopper gate 20, the insert sensor 18 is switched from the off state to the on state immediately before it. Thereby, the timing when the insert sensor 18 is turned on indicates the timing when the QR code 39 printed on the document 52 is disposed within the code reading area E.

Figure 32:
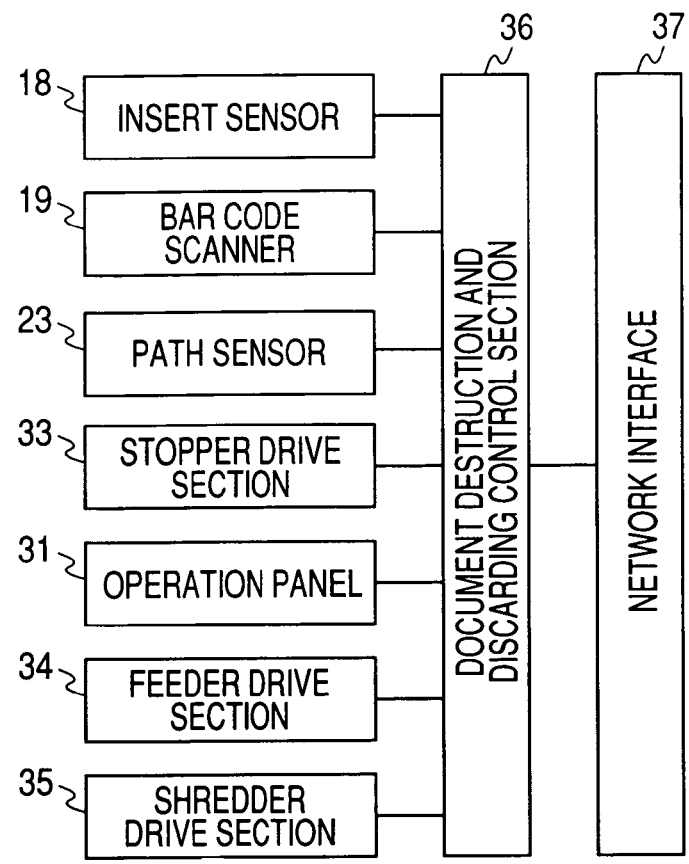
FIG. 32 is a block diagram showing a document destruction and discarding apparatus according to a fourth mechanical embodiment.

FIG. 32 is a block diagram showing the fourth mechanical embodiment of the document destruction and discarding apparatus 3. This document destruction and discarding apparatus 3 comprises an operation panel 31, a feeder drive section 34, a shredder drive section 35, a document destruction and discarding control section 36 and a network interface 37, in addition to the components as described above.

The operation panel 31 is operated by the user who uses the document destruction and discarding apparatus 3 and mounted on the upper cover 260 of the apparatus main body 250. The operation panel 31 is composed of the operation buttons (e.g., a start button, a stop button) and a display panel for displaying various operation screens including an operation state of the document destruction and discarding apparatus 3 and an operation guidance (guide message).

The feeder drive section 34 rotates the feed rolls 21 and 22. The feeder drive section 34 may have a motor as the drive source. The shredder drive section 35 drives and rotates the shredder portion 24. The shredder drive section 35 may have a motor as the drive source.

The document destruction and discarding control section 36 controls various processing operations involving the destruction and discarding of document in accordance with a given control program. This document destruction and discarding control section 36 controls the operation of the bar code scanner 19, the operation panel 31, the stopper drive section 33, the feeder drive section 34 and the shredder drive section 35 which are electrically connected. Also, the document destruction and discarding control section 36 has the insert sensor 18 and the path sensor 23 which are electrically connected.

The network interface 37 is a communication interface for enabling the document destruction and discarding apparatus 3 to make the data transmission and reception with other apparatuses (including the document generation apparatus 1 and the document management apparatus 2) on the network 4. The data transmission and reception through the network interface 37 is controlled by the document destruction and discarding control section 36.

Next, a document management method employing the document management system with the above configuration will be described below. First of all, the document treated in the invention is assigned an intrinsic document ID and generated by the document generation apparatus 1. The document ID may be composed of numerals alone, or an appropriate combination of numerals and alphabets or symbols. In the following, a specific management method in treating the document that is a voucher for auditing or tax inspection will be described.

Figure 33A:
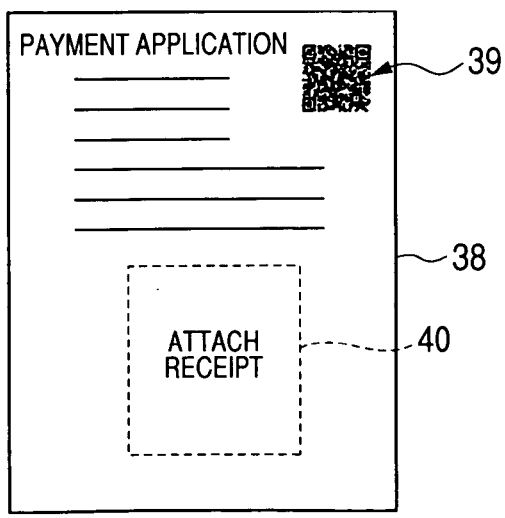
FIG. 33 is a view for explaining a creation example of document.

First of all, the document data (electronic data) with bar code that is a pattern of the document is inputted into the document generation apparatus 1, and the document data is printed on the paper by the image output section 8, whereby the grounded paper for the payment application as shown in FIG. 33A is created. The document data may be created on the document management apparatus 2, and inputted from this document management apparatus 2 via the network 4 into the document generation apparatus 1, or separately the document data may be created on a server apparatus for creating the document data, and inputted from this server apparatus via the network 4 into the document generation apparatus 1.

Figure 33B:
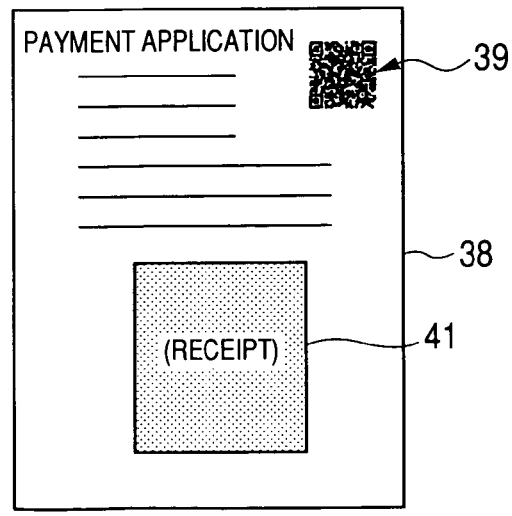

Thus, the QR code 39 including the document ID assigned to the payment application 38 as one information is additionally printed at the corner part of the payment application 38 that is generated by the document generation apparatus 1. That is, the payment application 38 that is generated by the document generation apparatus 1 corresponds to the "document with the document ID appended". Also, the ground paper of the payment application 38 is provided with an area 40 to attach the receipt. Therefore, the applicant creates the script of the payment application 38 by attaching the receipt 41 on the ground paper of the payment application 38, as shown in FIG. 33B, and making additional writing and stamp (seal), as needed.

If the payment application 38 is created in this way, this payment application 38 is set on a manuscript stand of the document generation apparatus 1, and an image of the payment application 38 is read by the image reading section 6. Then, the image data of the payment application 38 read by the image reading section 6 is transmitted to the document management apparatus 2 via the network 4. Also, the original of the payment application 38 that has been read is bound and stored in a file.

On the other hand, the document management apparatus 2 receiving the image data (scan data) of the payment application 38 from the document generation apparatus 1 accumulates its image data in the database section 14, and the image of the QR code 39 included in the image data is analyzed by the bar code analysis section 12, whereby the decode information for the document ID assigned to the payment application 38 is extracted. The document ID acquired in this way is registered in the document management table by the document management control section 15. The document management table is created within the database section 14.

FIG. 34 is a view showing one example of the document management table. The document management table has the document ID, the document generation date and time, the document storage period and the document destruction and discarding date and time, which are registered associated with each other, as shown in FIG. 34. When the document generation date and time and the document destruction and discarding date and time are registered, it is desirable that the time is the standard time acquired from a time distribution server or a time authentication server on the Internet via the network 4. The document ID may be registered by decoding the QR code in the bar code analysis section 12, or when the document data with bar code is created on the document management apparatus 2 or another server apparatus, the document ID assigned to the document by the document management apparatus 2 itself, or another server apparatus may be registered. The document generation date and time indicates the date and time when the document is generated. In this embodiment, the date and time when the document generation apparatus 1 transmits the image data read from the document such as the payment application 38 to the document management apparatus 2, or the document management apparatus 2 receives the image data of the document transmitted from the document generation apparatus 1 is registered as the "document generation date and time".

The document storage period indicates the storage period of the document in date and time. It is required that the document with the document ID registered in the document management table is stored till the document storage period expires. However, if the document storage period is registered as "no designation", the document is treated to be destroyed and discarded at any time, or if the document storage period is registered as "permanent", the document is treated not to be destroyed and discarded at any time.

Generally, for the receipt, the storage period is decided by its received amount of money. Therefore, if the information for setting the document storage period, in addition to the information of the document ID, is contained in the QR code printed on the payment application, for example, the document storage period can be automatically set from the decode information of the bar code analysis section 12. Specifically, if the information specifying the storage period of the payment application 38 as six years is contained in the QR code 39, the document storage period can be set to the date and time after six years from the generation date and time of the payment application 38. Besides, if the information indicating the received amount of money in the receipt attached on the payment application 38 is contained in the QR code 39, the storage period of the receipt can be automatically deduced from that information, and set in the document storage period of the document management table. Further, the document storage period of the document management table can be set or changed by manual input (manual operation) of the user, employing the user interface 16 provided for the document management apparatus 2.

The document destruction and discarding date and time indicates the date and time when the document is destroyed and discarded. The destruction and discarding of the document is performed by the document destruction and discarding apparatus 3. Therefore, the document destruction and discarding date and time of the document management table is registered in the date and time when a notification of completing the destruction and discarding of the document (hereinafter referred to a "destruction and discarding completion notification") is issued from the document destruction and discarding apparatus 3 to the document management apparatus 2 by specifying the document ID of the document that is destroyed and discarded.

As for the document management table, the user ID of the user who creates the document on the document generation apparatus 1 may be registered as a document creator in the document management table, or the user ID of the user who destroys and discards the document on the document destruction and discarding apparatus 3 may be registered as the person who destroys and discards the document in the document management table. In this case, the ID information of the user who creates or destroys and discards the document can be acquired employing the existent user authentication technique (e.g., user authentication technique employing the IC card).

Figure 35:
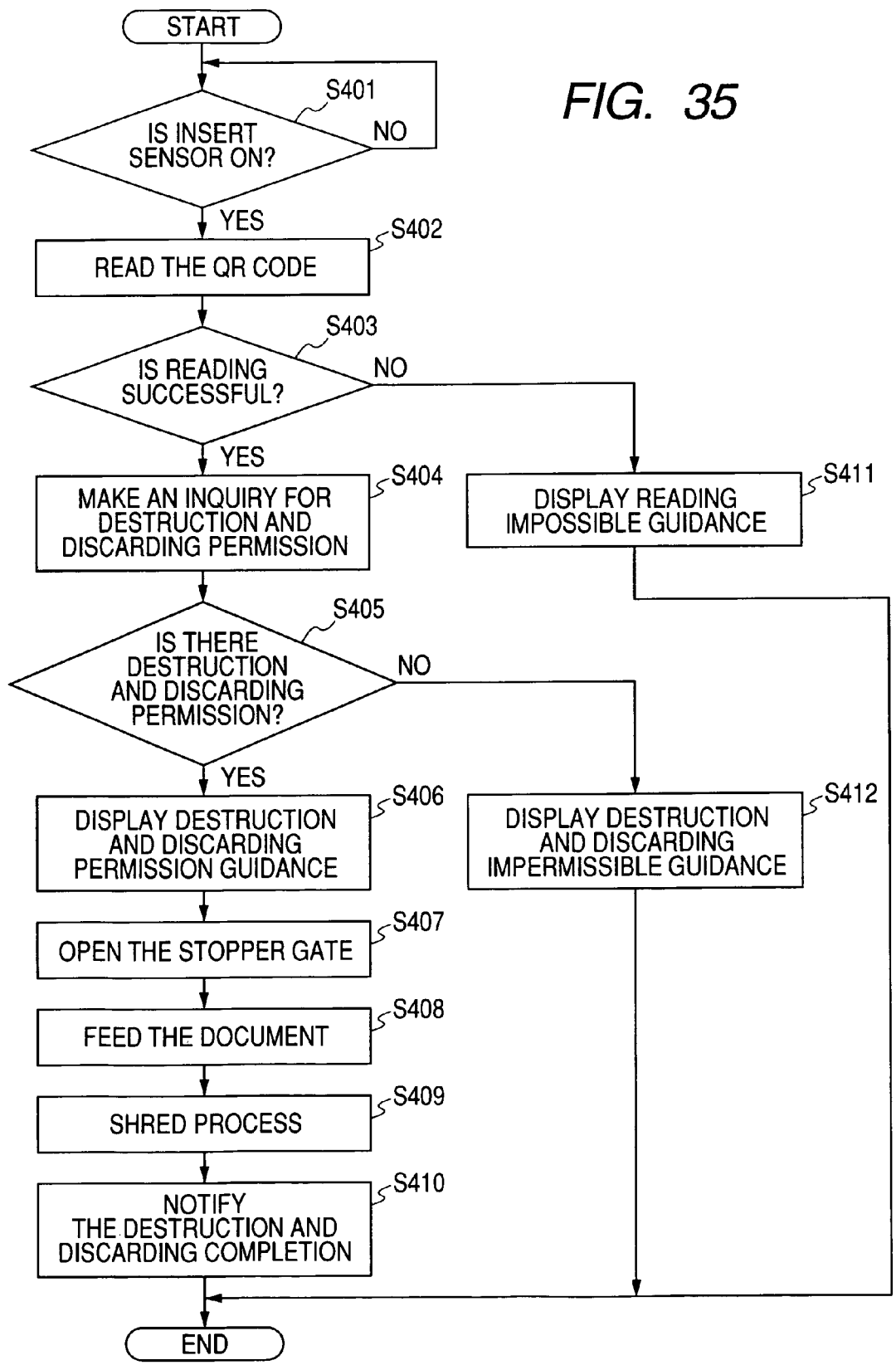
FIG. 35 is a flowchart showing a processing procedure for the document destruction and discarding apparatus according to the fourth mechanical embodiment.

FIG. 35 is a flowchart showing a processing procedure for destroying and discarding the document according to the mechanical embodiment 4 of the document destruction and discarding apparatus 3. This document destruction and discarding apparatus 3 has a normal destruction and discarding mode in which the document destruction and discarding process is performed without reading the document ID (QR code in this embodiment) of the document of destruction and discarding object and a scan destruction and discarding mode in which the document destruction and discarding process is performed by reading the document ID of the document of destruction and discarding object and making an inquiry for document destruction and discarding permission to the document management apparatus 2 with the read document ID designated, if the destruction and discarding permission is given from the document management apparatus 2. And the flowchart of FIG. 35 represents the processing procedure in the scan destruction and discarding mode.

In the normal destruction and discarding mode, when the document destruction and discarding apparatus 3 is on standby, and the start button provided on the operation panel 31 is pressed by the user, the document destruction and discarding control section 36 instructs the stopper drive section 33, the feeder driver section 34 and the shredder drive section 35 to start the driving to open the stopper gate 20, and start the driving of the feed rolls 21 and 22 and the shredder portion 24. Thereby, if the user who uses the document destruction and discarding apparatus 3 lays the document of destruction and discarding object on the document tray portion 17 and inserts it deeply, the leading edge of the document is nipped by the feed rolls 21, pulled into the inside of the apparatus, directly conveyed by the feed rolls 21 and 22, and shredded by the shredder portion 24.

Also, if the stop button of the operation panel 31 is depressed by the user after the start button of the operation panel 31 is depressed, or a predetermined time passes since the start button is depressed, the document destruction and discarding control section 36 instructs the stopper drive section 33, the feeder drive section 34 and the shredder drive section 35 to stop the driving to restore the stopper gate 20 to the closed state, and stop the driving of the feed rolls 21 and 22 and the shredder portion 24. Thereby, the document destruction and discarding apparatus 3 returns to a standby state again.

On the contrary, in the scan destruction and discarding mode, the user who uses the document destruction and discarding apparatus 3 lays the document of destruction and discarding object on the document tray portion 17 and inserts it deeply. At this time, if the QR code 39 is printed on the document of destruction and discarding object, the document 27 is inserted in an orientation where the print face of the QR code 39 is on the top face (face upward) and the printed part of the QR code 39 is on the downstream side (deep side) in the thrusting direction, as shown in FIG. 31.

Figure 36A:
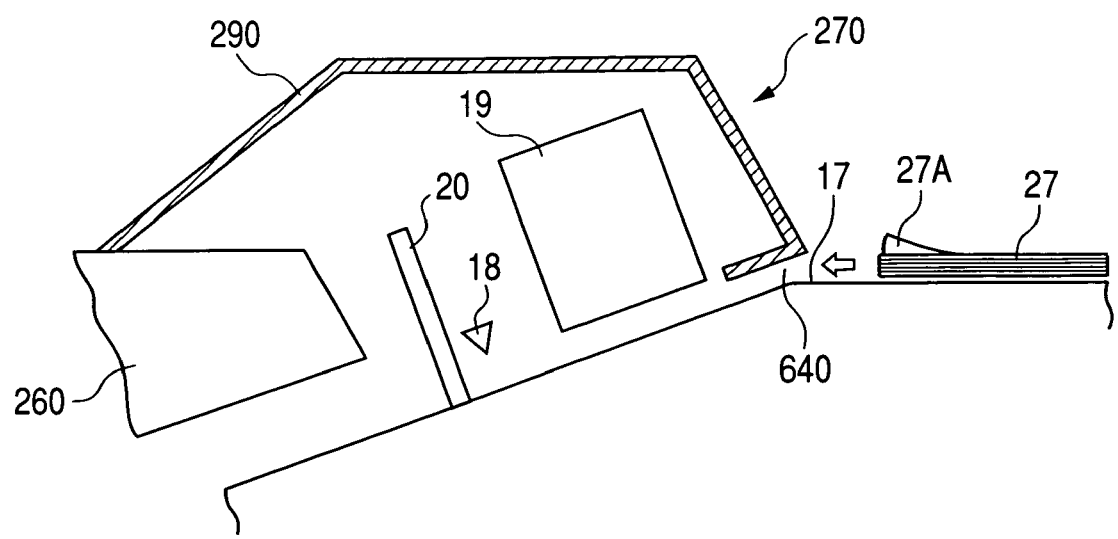
FIGS. 36A-C are views for explaining a nonconformity that may occur when the document is inserted in the document destruction and discarding apparatus.
Figure 36B:
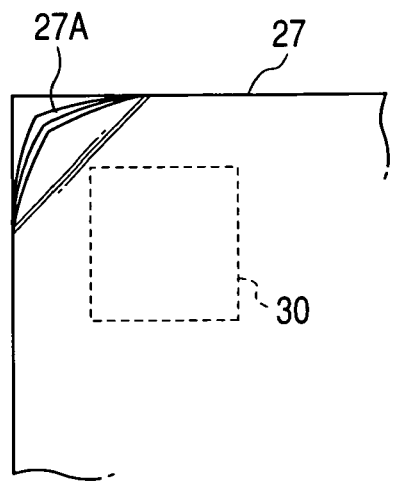
Figure 36C:
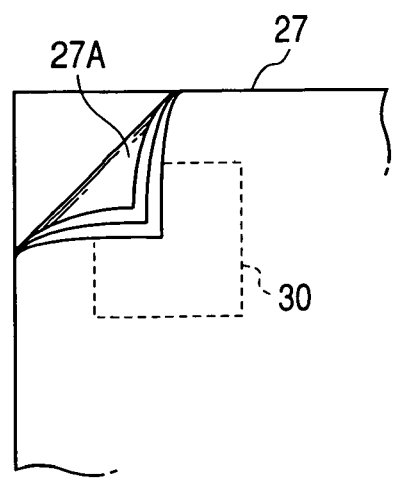

Herein, if the document 27 laid on the document tray portion 17 is an old document repeatedly perused, or the document circulated around many departments, the corner part of the document 27 often turns up, as shown in FIG. 36A. If the turn-up of the document occurs at the corner part near the printed part of the QR code 30 as shown in FIG. 36B, a turned up part 27A of the document 27 is pushed against a document insertion opening (document uptake opening) 64 into which the document 52 is inserted by manual insertion of the user, and the turned up part 27A is directly folded out and inserted into the deeper side of the document insertion opening. Then, a part of the QR code 27 is hidden because the turned up part 27A of the document 27 is folded out, as shown in FIG. 36C. As a result, the QR code 30 of the document 27 can not normally read by the bar code scanner 19.

Figure 37:
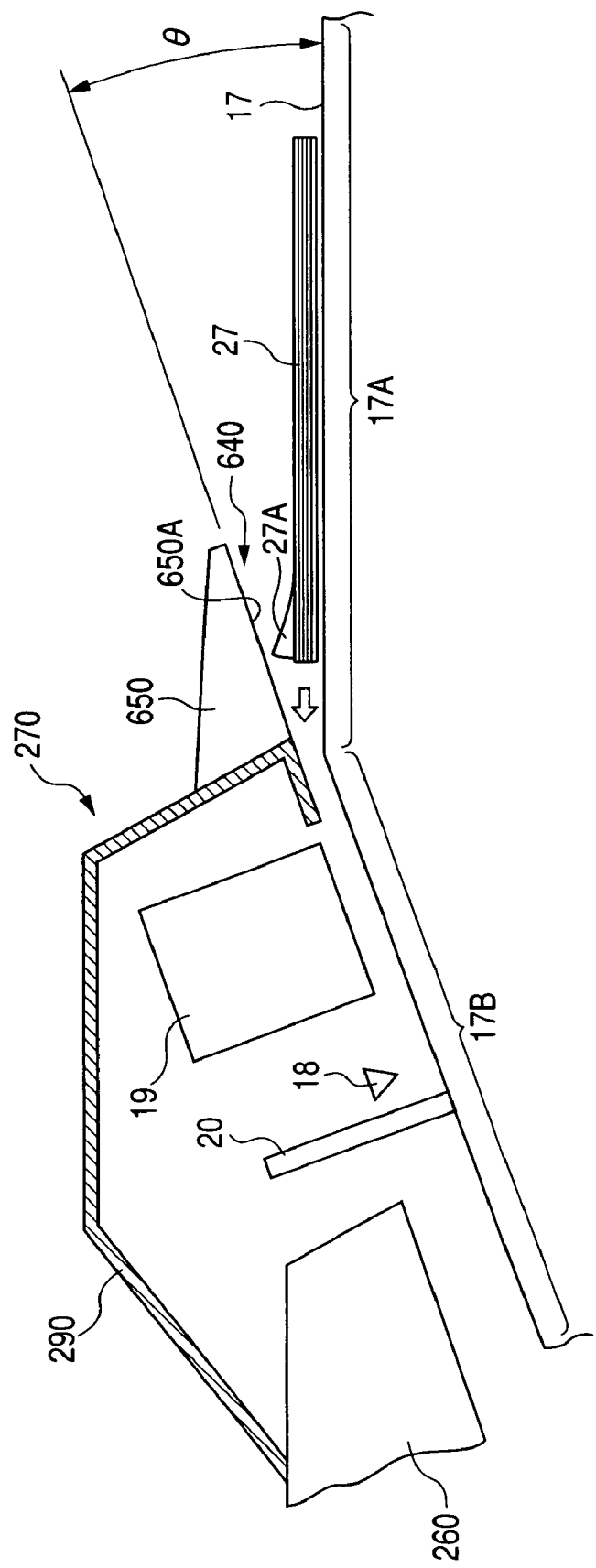
FIG. 37 is a view showing an apparatus constitution for resolving the nonconformity in inserting the document.

Thus, in the document destruction and discarding apparatus 3 according to this embodiment, a document uptake chute 650 is provided near the document insertion opening, integrally with or separately from the unit cover 290 of the scan unit 270, as shown in FIG. 37. The document uptake chute 650 is a member for correcting the turn-up of the document, when the turned up part 27A occurs at the leading edge of the document 27 laid on the document tray portion 17.

The document uptake chute 650 is provided to project from the front end part of the unit cover 290 to the horizontal guide plane 17A of the document tray portion 17. Also, the document uptake chute 650 has integrally a guide plane 650A disposed in parallel to the inclined guide plane 17B of the document tray portion 17. The guide plane 650A is disposed like a pent-roof above the document insertion opening, and formed to make a predetermined angle θ with the horizontal guide plane 17A of the document tray portion 17. The predetermined angle θ is set appropriately within a range from 15° to 30°, for example. The vertical gap between the horizontal guide plane 17A of the document tray portion 17 and the guide plane 650A of the document uptake chute 650 is gradually smaller toward the deep side of the document insertion opening in accordance with this angle θ.

By providing this document uptake chute 650 in the document insertion opening, even if the turned up part 27A occurs at the top end part of the document 27 laid on the document tray portion 17, the turned up part 27A of the document 27 is gradually pressed down while making contact with the guide plane 650A of the document uptake chute 650, when this document 27 is thrust into the document insertion opening by manual insertion of the user. Therefore, the turned up part 27A of the document 27 is not folded out, and is corrected by the document uptake chute 650. Accordingly, the QR code 39 of the document 27 can be normally read by the bar code scanner 19.

If the document is thrust in the above way, a signal of the insert sensor 18 is switched from the off state to the on state immediately before the leading edge of the document is pushed against the stopper gate 20. At this time, the document destruction and discarding control section 36 continually monitors the signal (on/off state) of the insert sensor 18 while the document destruction and discarding apparatus 3 is on standby (step S401). If the insert sensor 18 is turned on when the user inserts (thrusts) the document, an instruction of reading the bar code is issued to the bar code scanner 19. And the bar code scanner 19 reads the QR code printed on the document in accordance with this reading instruction (step S402). Then, the QR code printed on the document can be confronted with the bar code scanner 19 by suppressing the floating of the document with a first weight member 330 and a second weight member 340 at the top end side of the document, especially at the reading position (code reading area E) of the QR code with the bar code scanner 19. Accordingly, the bar code scanner 19 can securely read the QR code.

Next, the document destruction and discarding control section 57 judges whether or not the reading of the QR code is successful (step S403). Whether or not the reading of the QR code is successful is judged based on whether or not the document ID is normally decoded by the bar code scanner 19 from the QR code printed on the document. There are mainly two cases where the bar code scanner 19 fails in reading the QR code. The first case occurs when the QR code is not originally printed on the document, or when the QR code does not exist in the code reading area E (see FIG. 31) (case of no code) because the orientation of inserting the document (face up or down, or from the top end or rear end of the document) is unsuitable. The second case occurs when the QR code exists in the code reading area E but the QR code is remarkably contaminated or broken, or when the decode information of the QR code does not contain the document ID (case of code defect).

If the reading of the QR code is successful (Yes at step S403), an inquiry as to whether or not the document specified by the document ID contained in this QR code is permitted to destroy and discard is made to the document management apparatus 2 (step S404). The inquiry for the document destruction and discarding permission is made by creating an inquiry message for destruction and discarding permission with the document ID contained in the QR code read by the bar code scanner 19 designated, and transmitting this inquiry message from the network interface 37 via the network 4 to the document management apparatus 2. That is, the inquiry for the document destruction and discarding permission means the inquiry as to whether or not the document specified by the document ID designated in this inquiry may be destroyed and discarded. In this connection, if the reading of the QR code is successful, the information contained in this QR code may be simply displayed on the operation panel 31.

In the document management apparatus 2 receiving the inquiry message, the retrieval section 13 retrieves whether or not the document ID designated in the inquiry message is registered in the document management table. If the applicable document ID exists, the document storage period registered associated with the document ID is checked. And if the date and time (inquiry date and time) when the inquiry for document destruction and discarding permission is received from the document destruction and discarding apparatus 3 passes the document storage period, an answer message indicating that the document destruction and discarding permission is given to the document destruction and discarding apparatus 3 is returned. Also, if the data and time when the inquiry for document destruction and discarding permission is received from the document destruction and discarding apparatus 3 does not pass the document storage period, an answer message indicating that the document destruction and discarding permission is not given to the document destruction and discarding apparatus 3 (the destruction and discarding of the document is inhibited) is returned.

Thus, if the answer message is returned from the document management apparatus 2, the document destruction and discarding control section 36 receives that answer message via the network interface 37, and checks whether or not the content of the answer message gives the destruction and discarding permission for the document upon the inquiry from the self-apparatus (document destruction and discarding apparatus 3) (step S405). And if the answer message gives the destruction and discarding permission for the document, a prepared guidance for document permission (guide message) is displayed on the operation panel 31, and then an instruction of opening the stopper gate 20 is issued to the stopper drive section 33 to open the stopper gate 20 (steps S406 and S407). At this time, the document destruction and discarding control section 36 instructs the feeder drive section 34 to start rotating the feed rolls 21 and 22, and the feeder drive section 34 starts driving the rotation of the feed rolls 21 and 22 in accordance with this instruction. One example of the destruction and discarding permission guidance may be "This document is destroyed and discarded. Insert the document more deeply."

Thereafter, if the user thrusts in the document in accordance with the guidance displayed on the operation panel 31, the leading edge of the document is pushed against the nip part of the feed rolls 21, and the document is fed into the downstream side on the document conveying path, along with the rotation of the feed rolls 21 (step S408). Thus, the document fed by the feed rolls 21 is passed to the feed rolls 22 on the downstream side in the conveying direction, and conveyed to the shredder portion 24, along with the rotation of the feed rolls 22. At this time, the rear end of the document passes by the sensing position of the insert sensor 18, so that the signal of the insert sensor 18 is switched from the on state to the off state. Then, the document destruction and discarding control section 36 instructs the stopper drive section 33 to return the stopper gate 20 at a preset timing (e.g., timing when the rear end of the document gets rid of the feed roll 21), and thereby restore the stopper gate 20 to its original state (closed state).

Also, the leading edge of the document passes by the sensing position of the path sensor 23 during the conveyance of the document by the feed rolls 22, so that the path sensor 23 is switched from the off state to the on state. Then, the document destruction and discarding control section 36 makes an instruction of starting the driving to the shredder drive section 35, and the shredder drive section 35 starts the driving of the shredder portion 24 upon receiving the instruction. Accordingly, the document fed by the feed rolls 22 is directly taken by the shredder portion 24, and shredded through the shred process (destruction and discarding process) (step S409).

Thereafter, the rear end of the document passes by the sensing position of the path sensor 23, so that the path sensor 23 is switched from the on state to the off state. Then, the document destruction and discarding control section 36 transmits a message of destruction and discarding completion notification that the destruction and discarding of the document is completed to the document management apparatus 2 by designating the document ID of the document, for which the document destruction and discarding permission is given ahead, in a certain time since the path sensor 23 is turned off (specifically the time taken since the rear end of the document is taken into the shredder portion 24 till the entire document is shredded) (step S410). The destruction and discarding completion notification message is transmitted via the network interface 37 across the network 4 to the document management apparatus 2. On the contrary, the document management apparatus 2 receiving the destruction and discarding completion notification message from the document destruction and discarding apparatus 3 registers the date and time when the message is received in the column of document destruction and discarding date and time as the destruction and discarding history information corresponding to the document ID designated in the message.

On the other hand, if the reading of the QR code is unsuccessful at step S403, a prepared reading impossible guidance is displayed on the operation panel 31 (step S411). One example of the reading impossible guidance may be "A code reading error occurred. Pull out the document." Also, if the document destruction and discarding permission is not given from the document management apparatus 2 at step S405, a prepared destruction and discarding impermissible guidance is displayed on the operation panel 31 (step S412). One example of the destruction and discarding impermissible guidance may be "This document can not be destroyed and discarded, because the document storage period does not expire. Pull out the document." Also, after the destruction and discarding completion notification is transmitted, the document destruction and discarding apparatus 3 directly returns to the standby state. However, after the reading impossible guidance is displayed at step S411, or the destruction and discarding impermissible guidance is displayed at step S412, the document destruction and discarding apparatus 3 returns to the standby state if the insert sensor 18 is switched form the on state to the off state (the user takes the document out of the document tray portion 17).

In the document management system as described above, the document ID appended to the document is managed corresponding to the document storage period in the document management apparatus 2, in which when the document is destroyed and discarded employing the document destruction and discarding apparatus 3, the document ID contained in the QR code is acquired by reading the QR code printed on the document of destruction and discarding object with the bar code scanner 19, an inquiry as to whether or not the document specified by this document ID is permitted to destroy and discard is made to the document management apparatus 2, and if an answer content to this inquiry is to give a destruction and discarding permission, the destruction and discarding process for the document is performed in the document destruction and discarding apparatus 3. Therefore, the person in charge does not need to confirm the possibility of destroying and discarding the document every time as conventionally performed, and the document in which the storage period has expired can be securely destroyed and discarded. Also, it is possible to avoid falsely destroying and discarding the document due to an artificial check error.

Also, for the document generated employing the document generation apparatus 1, the document ID appended to the document is managed corresponding to the document storage period in the document management apparatus 2, whereby the document can be managed consistently from the generation to the destruction and discarding of the document.

Also, when the destruction and discarding process (shredding process) for the document is made in the document destruction and discarding apparatus 3, a message of destruction and discarding completion notification with the document ID of the document designated is transmitted to the document management apparatus 2, and the document management apparatus 2 receiving its notification message registers the document destruction and discarding date and time as the destruction and discarding history information corresponding to the applicable document ID in the document management table, whereby the date and time when the document is actually destroyed and discarded can be left as the history, together with the fact that the document is destroyed and discarded. Moreover, the user ID information of the person who disposes of document in charge of destroying and discarding the document can be acquired by the user authentication technique and left as one destruction and discarding history information. As a result, it is possible to confirm later when and by whom the document designated by the certain document ID is destroyed and discarded.

Also, when the document generation process (printing process) is performed in the document generation apparatus 1, the date and time when the document is generated and the user ID information of the document creator in charge of generating the document are registered along with the document ID of the document in the document management table of the document management apparatus 2, whereby it is possible to confirm later when and by whom the document designated by the certain document ID is destroyed and discarded.

Since the scan unit 270 comprising the insert sensor 18, the bar code scanner 19 and the stopper gate 20 is removably mounted on the apparatus main body 250 (upper cover 260) of the document destruction and discarding apparatus 3, the apparatus main body 250 from which the scan unit 270 is removed is treated as standard equipment and the scan unit 270 may be optionally retrofitted to the apparatus main body 250 on the configuration for the document destruction and discarding apparatus 3.

While the QR code including the document ID is printed on the document in the above embodiment, the invention is not limited thereto, but the number or symbol indicating the document ID may be printed on the document. Also, the appendage of the document ID on the document is not limited to printing, but the document ID may be appended by labeling on the document.

While the document is fed via the feed rolls 21 and 22 to the shredder portion 24 in the first to fourth mechanical embodiments of the document destruction and discarding apparatus 3 as described above, the document is fed to the shredder portion 24 without intervention of the feed rolls 21 and 22 in the fifth to fourteenth embodiments as described below. The explanation of the same components as in the first to fourth embodiments is omitted.

To begin with, the following five mechanical embodiments in which the document destruction and discarding apparatus 3 is configured to destroy and discard only the document permitted for destruction and discarding, and the careless destruction and discarding of the document impermissible for destruction and discarding is prevented will be described below.

Fifth Mechanical Embodiment

Figure 38:
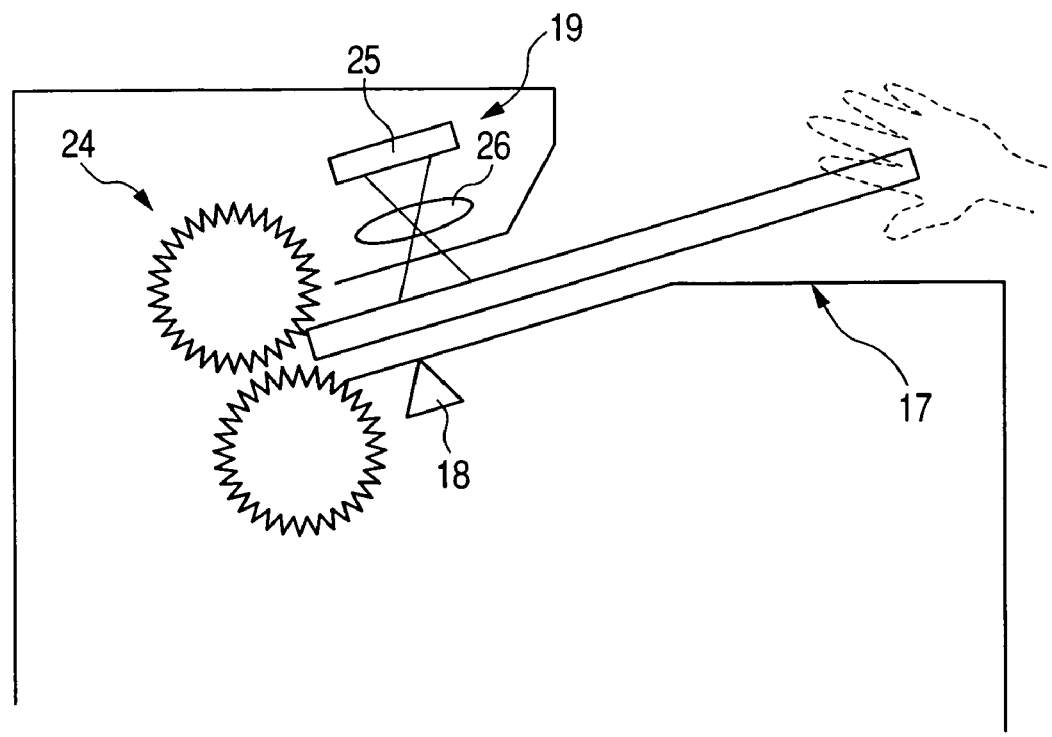
FIG. 38 is a schematic view showing a document destruction and discarding apparatus according to a fifth mechanical embodiment.

FIG. 38 is a schematic view showing a fifth mechanical embodiment of the document destruction and discarding apparatus 3.

This document destruction and discarding apparatus 3 is constructed employing a shredder device, for example, and comprises a document tray portion 17, an insert sensor 18, a bar code scanner 19 and a shredder portion 24, in which the document is manually inserted and directly passed to the shredder portion 24. They have the same constitution as in the above mechanical embodiments, and the explanation of them is omitted.

Figure 39:
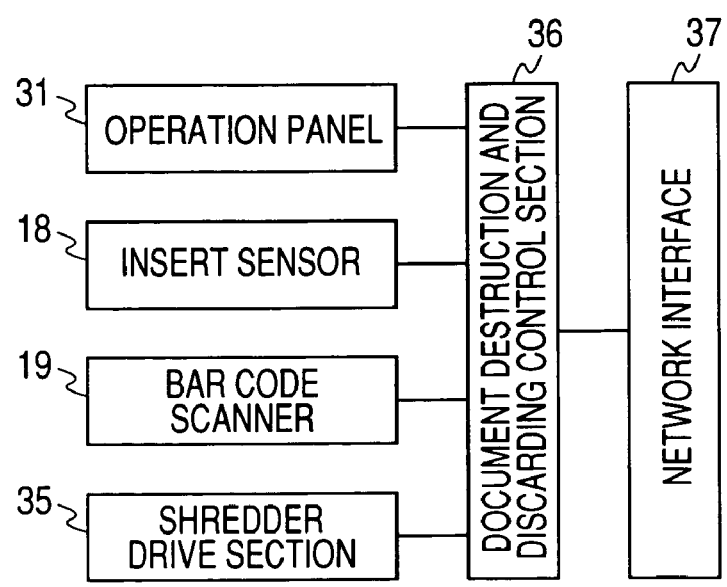
FIG. 39 is a block diagram showing the document destruction and discarding apparatus according to the fifth mechanical embodiment.

FIG. 39 is a block diagram showing the fifth mechanical embodiment of the document destruction and discarding apparatus 3.

The document destruction and discarding apparatus 3 comprises an operation panel 31, a shredder drive section 35, a document destruction and discarding control section 36, and a network interface 37, in addition to the components as described above.

They have the same constitution as in the above mechanical embodiments, and the explanation of them is omitted.

Figure 40:
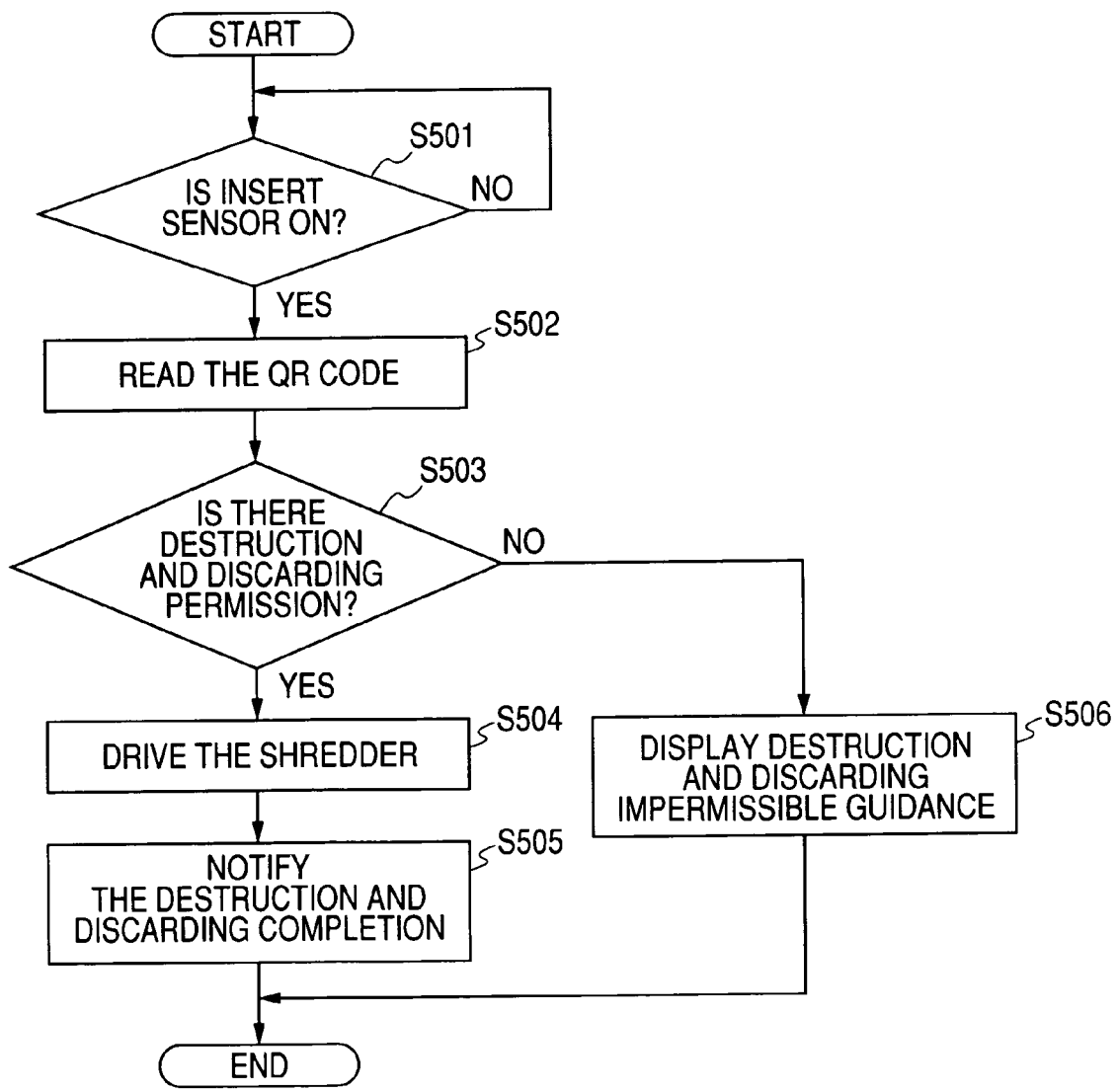
FIG. 40 is a flowchart showing a processing procedure for the document destruction and discarding apparatus according to the fifth mechanical embodiment.

FIG. 40 is a flowchart showing a processing procedure for destroying and discarding the document in the fifth mechanical embodiment of the document destruction and discarding apparatus 3. The process of the document management apparatus 2 is the same as those of the above mechanical embodiments, and its explanation is omitted.

The document destruction and discarding control section 36 continually monitors the signal (on/off state) of the insert sensor 18 while the document destruction and discarding apparatus 3 is on standby (step S501). If the insert sensor 18 is turned on when the user manually inserts the document, the document destruction and discarding control section 36 issues an instruction of reading the bar code to the bar code scanner 19. And the barcode scanner 19 reads the QR code printed on the document in accordance with this reading instruction (step S502).

Next, as for the document specified by the document ID contained in the read QR code, an inquiry as to whether or not the destruction and discarding of the document is permitted is made to the document management apparatus 2 (step S503). The inquiry for document destruction and discarding permission is made by creating an inquiry message for destruction and discarding permission with the document ID contained in the QR code read by the bar code scanner 19 designated and transmitting this inquiry message from the network interface 37 via the network 4 to the document management apparatus 2.

And if the answer message is to give the document destruction and discarding permission, the document destruction and discarding control section 36 makes an instruction of starting the driving to the shredder drive section 35, and the shredder drive section 35 starts to drive the shredder portion 24 upon receiving this instruction. Accordingly, the document fed by manual insertion is directly taken into the shredder portion 24, and shredded through the shred process (destruction and discarding process) (step S504). Before making an instruction of starting the driving to the shredder drive section 35, as in the above mechanical embodiment, it may be also possible to confirm whether or not the content of the answer message is to give the destruction and discarding permission for the document to the inquiry from the self-apparatus (document destruction and discarding apparatus 3).

Thereafter, the rear end of the document passes by the sensing position of the insert sensor 18, so that the insert sensor 18 is switched from the on state to the off state. Then, the document destruction and discarding control section 36 transmits a message of destruction and discarding completion notification that the destruction and discarding of the document is completed to the document management apparatus 2 by designating the document ID of the document, for which the document destruction and discarding permission is given ahead, in a certain time since the insert sensor 18 is turned off (specifically the time taken since the rear end of the document is taken into the shredder portion 24 till the entire document is shredded) (step S505).

On the other hand, if the destruction and discarding permission for the document is not given from the document management apparatus 2 (no answer, destruction and discarding inhibition) at step S503, a prepared destruction and discarding impermissible guidance to report that the destruction and discarding of the document is not permitted is displayed on the operation panel 31 (step S506). One example of the destruction and discarding impermissible guidance may be "Destruction and discarding of this document is inhibited for some reason. Pull out the document." It is desirable that the report includes the reason. Also, after the destruction and discarding completion notification is transmitted, the document destruction and discarding apparatus 3 directly returns to the standby state. However, after the destruction and discarding impermissible guidance is displayed at step S506, the document destruction and discarding apparatus 3 returns to the standby state if the insert sensor 18 is switched form the on state to the off state (the user takes the document out of the document tray portion 17).

In this mechanical embodiment, if the answer (message) is to give the destruction and discarding permission for the document, the driving of the shredder portion 24 is immediately started. However, in the case where the driving of the shredder portion 24 is made by another means (start button), the driving of the shredder portion 24 may be released from the regulated state, if the answer (message) is to give the destruction and discarding permission for the document.

Sixth Mechanical Embodiment

Figure 41:
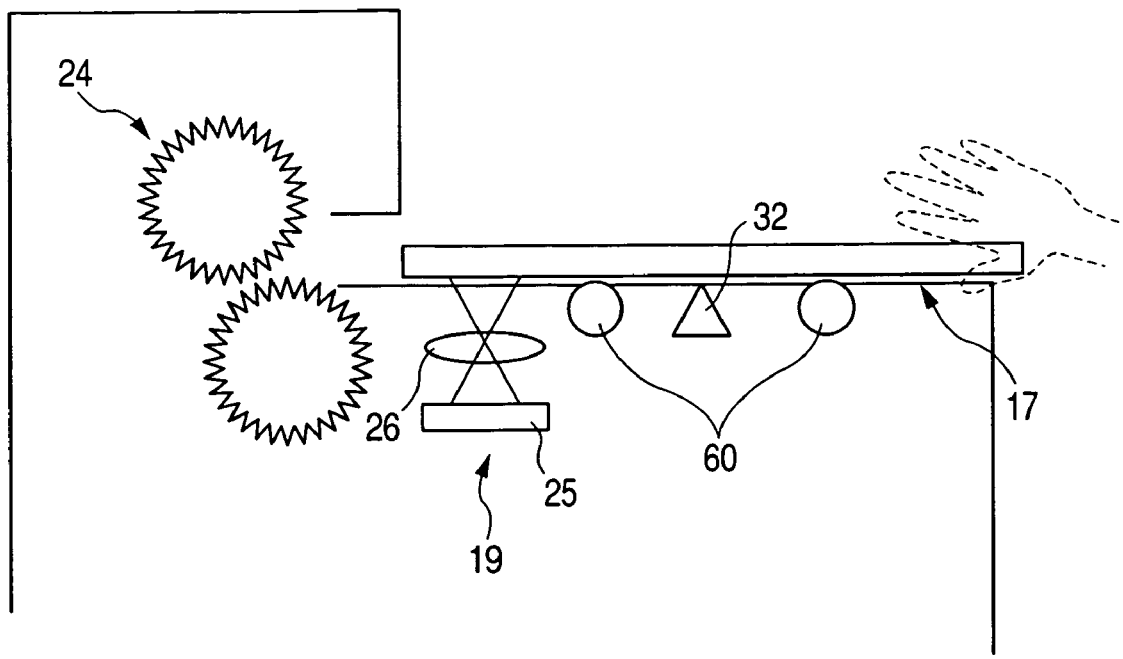
FIG. 41 is a schematic view showing a document destruction and discarding apparatus according to a sixth mechanical embodiment.

FIG. 41 is a schematic view showing a sixth mechanical embodiment of the document destruction and discarding apparatus 3.

This document destruction and discarding apparatus 3 is constructed employing a shredder device, for example, and comprises a document tray portion 17, a bar code scanner 19, a shredder portion 24, a set sensor 32, and the conveying rolls 60, in which the document is fed to the shredder portion 24 by the conveying rolls 60.

The bar code scanner 19 is provided on the document tray and reads the QR code from below. In this type, it is required that the document is laid on the document tray 17 so that the QR code of the document may be on the lower side. The bar code scanner 19 may read the QR code from above as in the above embodiments.

The conveying rolls 60 convey the document along the conveying path to the shredder portion 24 by rotating in contact with the lower side of the document. The other constitution is the same as in the above mechanical embodiments, and its explanation is omitted.

Figure 42:
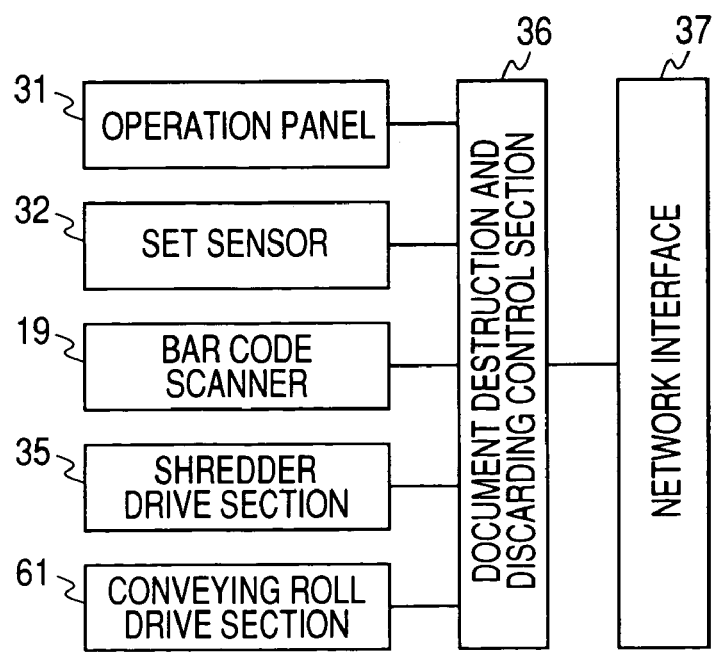
FIG. 42 is a block diagram showing the document destruction and discarding apparatus according to the sixth mechanical embodiment.

FIG. 42 is a block diagram showing the sixth mechanical embodiment of the document destruction and discarding apparatus 3.

The document destruction and discarding apparatus 3 comprises an operation panel 31, a shredder drive section 35, a document destruction and discarding control section 36, a network interface 37, and a conveying roll drive section 61, in addition to the components as described above. The conveying roll drive section 61 drives the conveying rolls 60.

The other constitution is the same as in the above mechanical embodiments, and its explanation is omitted.

Instead of the conveying roll drive section 61 and the conveying rolls 60, the pull-in roll 43 and the pull-in drive section 48 may be applied.

Figure 43:
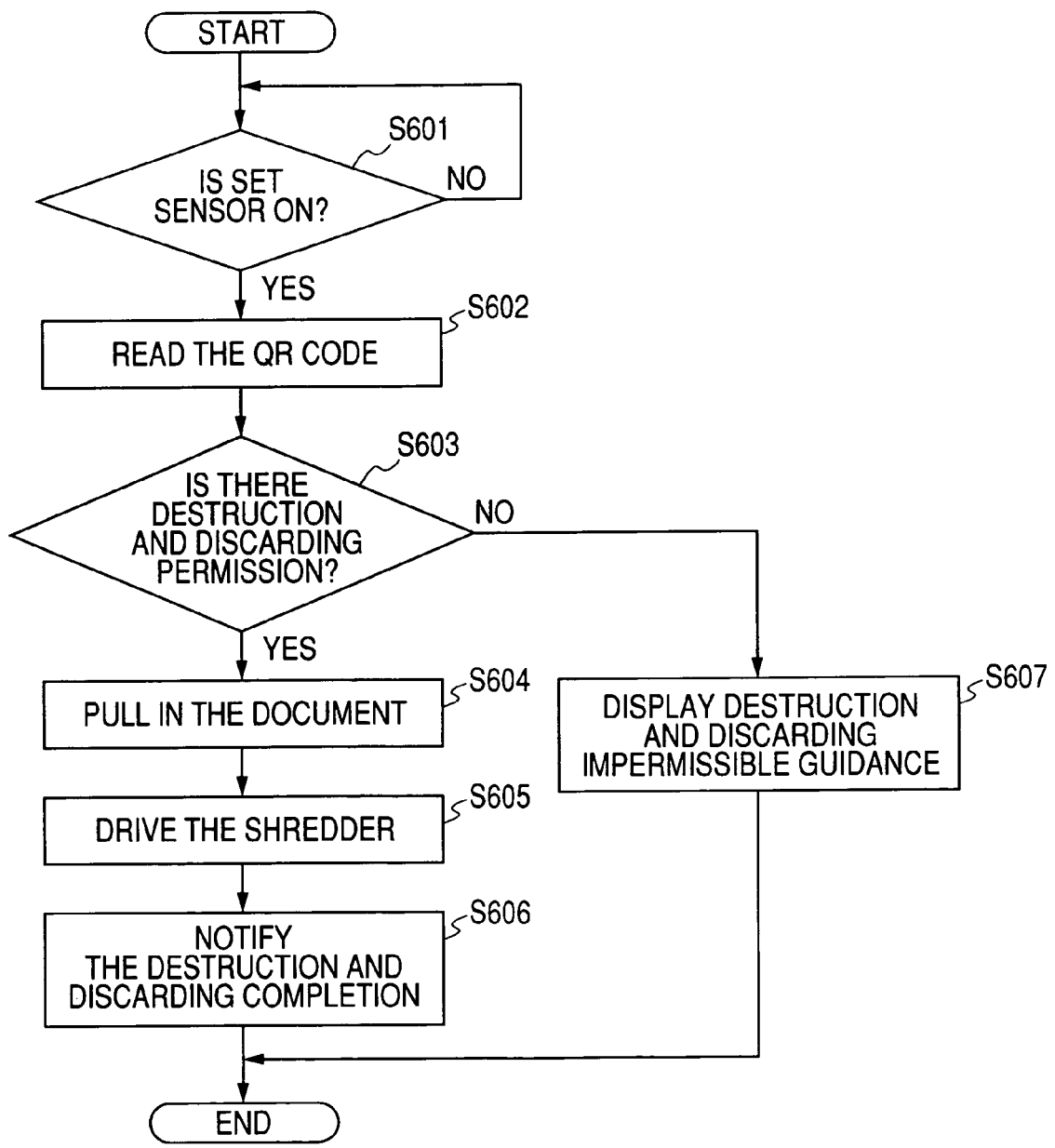
FIG. 43 is a flowchart showing a processing procedure for the document destruction and discarding apparatus according to the sixth mechanical embodiment.

FIG. 43 is a flowchart showing a processing procedure for destroying and discarding the document in the sixth mechanical embodiment of the document destruction and discarding apparatus 3. The process of the document management apparatus 2 is the same as those of the above mechanical embodiments, and its explanation is omitted.

The document destruction and discarding control section 36 continually monitors the signal (on/off state) of the set sensor 32 while the document destruction and discarding apparatus 3 is on standby (step S601). If the set sensor 32 is turned on when the user lays the document on the document tray portion 17, the document destruction and discarding control section 36 issues an instruction of reading the bar code to the bar code scanner 19. And the bar code scanner 19 reads the QR code printed on the document in accordance with this reading instruction (step S602).

Next, as for the document specified by the document ID contained in the read QR code, an inquiry as to whether or not the destruction and discarding of the document is permitted is made to the document management apparatus 2 (step S603). The inquiry for document destruction and discarding permission is made by creating an inquiry message for destruction and discarding permission with the document ID contained in the QR code read by the bar code scanner 19 designated and transmitting this inquiry message from the network interface 37 via the network 4 to the document management apparatus 2.

And if the answer message is to give the document destruction and discarding permission, the document destruction and discarding control section 36 instructs the conveying roll drive section 61 to start the driving, and the conveying roll drive section 61 starts to drive the conveying rolls 60 to convey the document to the shredder portion 24 (step S604). Concurrently, the shredder drive section 36 also starts to drive the shredder portion 24 (step S605). Accordingly, the document is directly conveyed to the shredder portion 24, taken in, and shredded there. It may be also possible to confirm whether or not the content of the answer message is to give a destruction and discarding permission for the document to the inquiry from the self-apparatus (document destruction and discarding apparatus 3) before making an instruction of starting the driving to the conveying roll drive section 61, as in the above mechanical embodiments.

While the shredder portion 24 starts to be driven at the same time the conveying roll drive section starts to drive in this mechanical embodiment, the shredder portion 24 needs to be driven when the document is conveyed, and may be driven at the preceding or succeeding timing.

Thereafter, the rear end of the document passes by the sensing position of the set sensor 32, so that the set sensor 32 is switched from the on state to the off state. Then, the document destruction and discarding control section 36 transmits a message of destruction and discarding completion notification that the destruction and discarding of the document is completed to the document management apparatus 2 by designating the document ID of the document, for which the document destruction and discarding permission is given ahead, in a certain time since the set sensor is turned off (specifically the time taken since the rear end of the document is taken into the shredder portion 24 till the entire document is shredded) (step S606).

On the other hand, if the destruction and discarding permission for the document is not given from the document management apparatus 2 (no answer, destruction and discarding inhibition) at step S603, a prepared destruction and discarding impermissible guidance to report that the destruction and discarding of the document is not permitted is displayed on the operation panel 31 (step S607). One example of the destruction and discarding impermissible guidance may be "Destruction and discarding of this document is inhibited for some reason. Pull out the document." It is desirable that the report includes the reason. Also, after the destruction and discarding completion notification is transmitted, the document destruction and discarding apparatus 3 immediately returns to the standby state. However, after the destruction and discarding impermissible guidance is displayed at step S607, the document destruction and discarding apparatus 3 returns to the standby state if the set sensor 32 is switched form the on state to the off state (the user takes the document out of the document tray portion 17).

In this mechanical embodiment, if the answer (message) is to give the destruction and discarding permission for the document, the driving of the conveying roll drive section 61 is immediately started in this mechanical embodiment. However, in the case where the driving of the conveying roll drive section 61 is made by another means (start button), the driving of the conveying roll drive section 61 may be released from the regulated state, if the answer (message) is to give the destruction and discarding permission for the document.

Seventh Mechanical Embodiment

Figure 44:
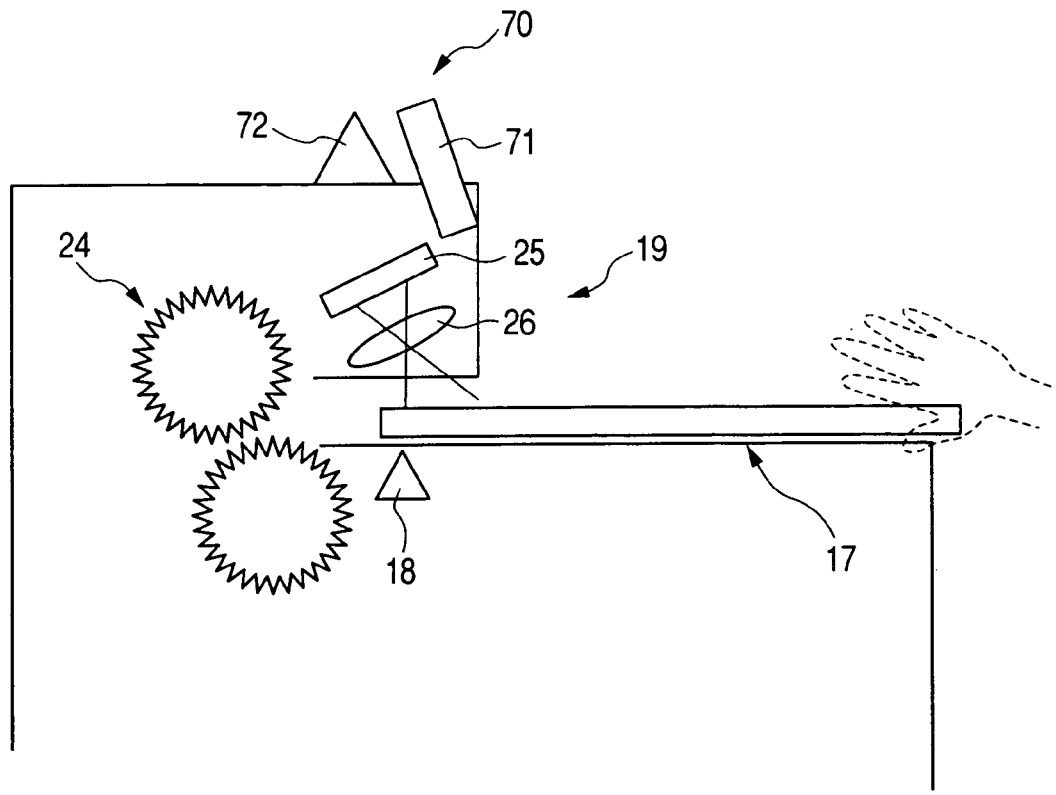
FIG. 44 is a schematic view showing a document destruction and discarding apparatus according to a seventh mechanical embodiment.

FIG. 44 is a schematic view showing a seventh mechanical embodiment of the document destruction and discarding apparatus 3.

This document destruction and discarding apparatus 3 is constructed employing a shredder device, for example, and comprises a document tray portion 17, an insert sensor 18, a bar code scanner 19, a shredder portion 24, and a report portion 70, in which the document is directly fed to the shredder portion 24 by manual insertion.

The report portion 70 has a display portion 71 for displaying and reporting whether or not the document may be destroyed and discarded, and a sound source portion 72 for reporting whether or not the document may be destroyed and discarded in sound (voice).

The report portion 70 may be anyone of the display portion 71 and the sound source portion 72.

The other constitution is the same as in the above mechanical embodiments, and its explanation is omitted.

Figure 45:
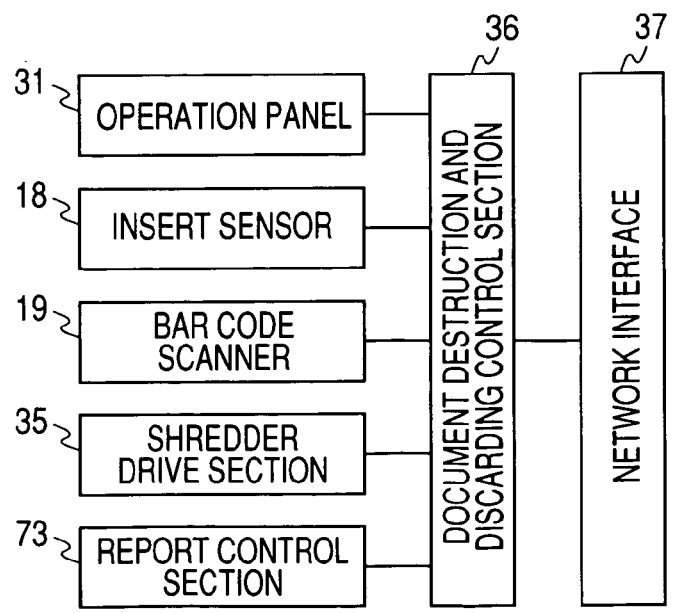
FIG. 45 is a block diagram showing the document destruction and discarding apparatus according to the seventh mechanical embodiment.

FIG. 45 is a block diagram showing the seventh mechanical embodiment of the document destruction and discarding apparatus 3.

The document destruction and discarding apparatus 3 comprises an operation panel 31, a shredder drive section 35, a document destruction and discarding control section 36, a network interface 37, and a report control section 73, in addition to the components as described above. The report control section 73 controls the display portion 71 in the report portion 70 to display, and controls the sound source 72. The other constitution is the same as in the above mechanical embodiments, and its explanation is omitted.

Figure 46:
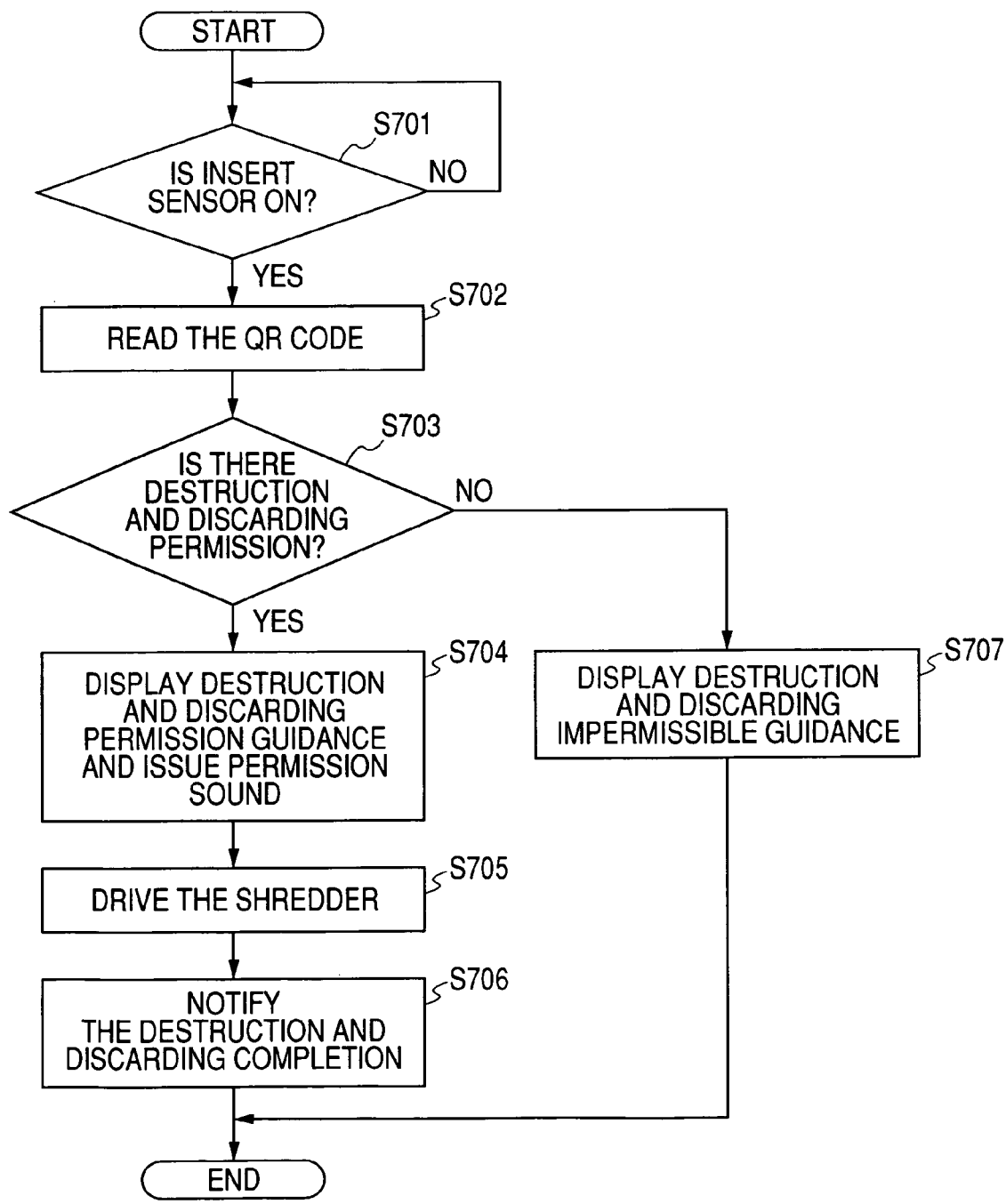
FIG. 46 is a flowchart showing a processing procedure for the document destruction and discarding apparatus according to the seventh mechanical embodiment.

FIG. 46 is a flowchart showing a processing procedure for destroying and discarding the document in the seventh mechanical embodiment of the document destruction and discarding apparatus 3. The process of the document management apparatus is the same as those of the above mechanical embodiments, and its explanation is omitted.

The document destruction and discarding control section 36 continually monitors the signal (on/off state) of the insert sensor 18 while the document destruction and discarding apparatus 3 is on standby (step S701). If the insert sensor 18 is turned on when the user inserts the document, the document destruction and discarding control section 36 issues an instruction of reading the bar code to the bar code scanner 19. And the bar code scanner 19 reads the QR code printed on the document in accordance with this reading instruction (step S702).

Next, as for the document specified by the document ID contained in the read QR code, an inquiry as to whether or not the destruction and discarding of the document is permitted is made to the document management apparatus 2 (step S703). The inquiry for document destruction and discarding permission is made by creating an inquiry message for destruction and discarding permission with the document ID contained in the QR code read by the bar code scanner 19 designated and transmitting this inquiry message from the network interface 37 via the network 4 to the document management apparatus 2.

And if the answer message is to give the document destruction and discarding permission, the document destruction and discarding control section 36 instructs the report control section 73 to start the reporting, and the report control section 73 starts to make a report with the report portion 70 (display portion 71, sound source 72) upon receiving this instruction. And a message "Insert the document deeply." is displayed on the display portion 71, and a sound (voice, permission sound) informing that the document may be destroyed and discarded is made by the sound source 72 (step S704). Concurrently, the driving of the shredder portion 24 is started (step S705). Accordingly, the document is directly conveyed to the shredder portion 24 by the user, taken in, and shredded there. It may be also possible to confirm whether or not the content of the answer message is to give a destruction and discarding permission for the document to the inquiry from the self-apparatus (document destruction and discarding apparatus 3) before making an instruction of starting the report to the report control section 73, as in the above mechanical embodiments.

While the shredder drive section 35 starts the driving at the same time when the report portion 70 (display portion 71, sound source 72) starts the report in this mechanical embodiment, the shredder drive section 35 needs to be driven when the document is conveyed to the shredder portion 24, and may be driven at the preceding or succeeding timing when the report portion 70 (display portion 71, sound source 72) starts the report.

Thereafter, the rear end of the document passes by the sensing position of the insert sensor 18, so that the insert sensor 18 is switched from the on state to the off state. Then, the document destruction and discarding control section 36 transmits a message of destruction and discarding completion notification that the destruction and discarding of the document is completed to the document management apparatus 2 by designating the document ID of the document, for which the document destruction and discarding permission is given ahead, in a certain time since the insert sensor is turned off (specifically the time taken since the rear end of the document is taken into the shredder portion 24 till the entire document is shredded) (step S706).

On the other hand, if the destruction and discarding permission for the document is not given from the document management apparatus 2 (no answer, destruction and discarding inhibition) at step S703, a prepared destruction and discarding impermissible guidance to report that the destruction and discarding of the document is not permitted is displayed on the operation panel 31 (step S707). One example of the destruction and discarding impermissible guidance may be "Destruction and discarding of this document is inhibited for some reason. Pull out the document." It is desirable that the report includes the reason.

Also, after the destruction and discarding completion notification is transmitted, the document destruction and discarding apparatus 3 immediately returns to the standby state. However, after the destruction and discarding impermissible guidance is displayed at step S707, the document destruction and discarding apparatus 3 returns to the standby state if the insert sensor 18 is switched form the on state to the off state (the user takes the document out of the document tray portion 17).

In this mechanical embodiment, if the answer (message) is to give the destruction and discarding permission for the document, the report portion 70 (display portion 71, sound source 72) immediately starts the report in this mechanical embodiment. However, in the case where the reporting of the report portion 70 (display portion 71, sound source 72) is made by another means (start button), the reporting of the report portion 70 (display portion 71, sound source 72) may be released from the regulated state, if the answer (message) is to give the destruction and discarding permission for the document.

Eighth Mechanical Embodiment

Figure 47:
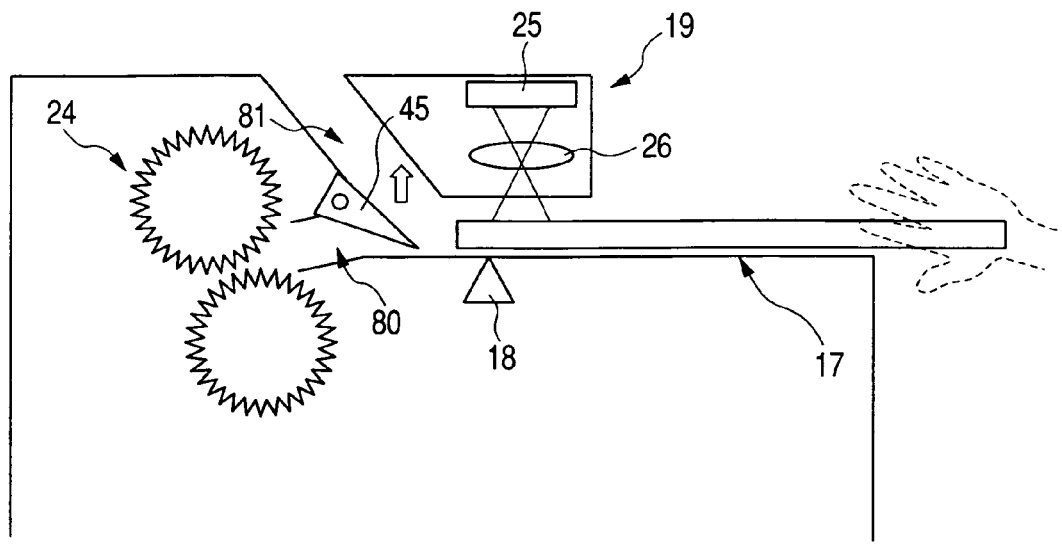
FIG. 47 is a schematic view showing a document destruction and discarding apparatus according to an eighth mechanical embodiment.

FIG. 47 is a schematic view showing an eighth mechanical embodiment of the document destruction and discarding apparatus 3.

This document destruction and discarding apparatus 3 is constructed employing a shredder device, for example, and comprises a document tray portion 17, an insert sensor 18, a bar code scanner 19, a shredder portion 24, and a branch gate 45, in which the document is directly fed to the shredder portion 24 by manual insertion.

Figure 48:
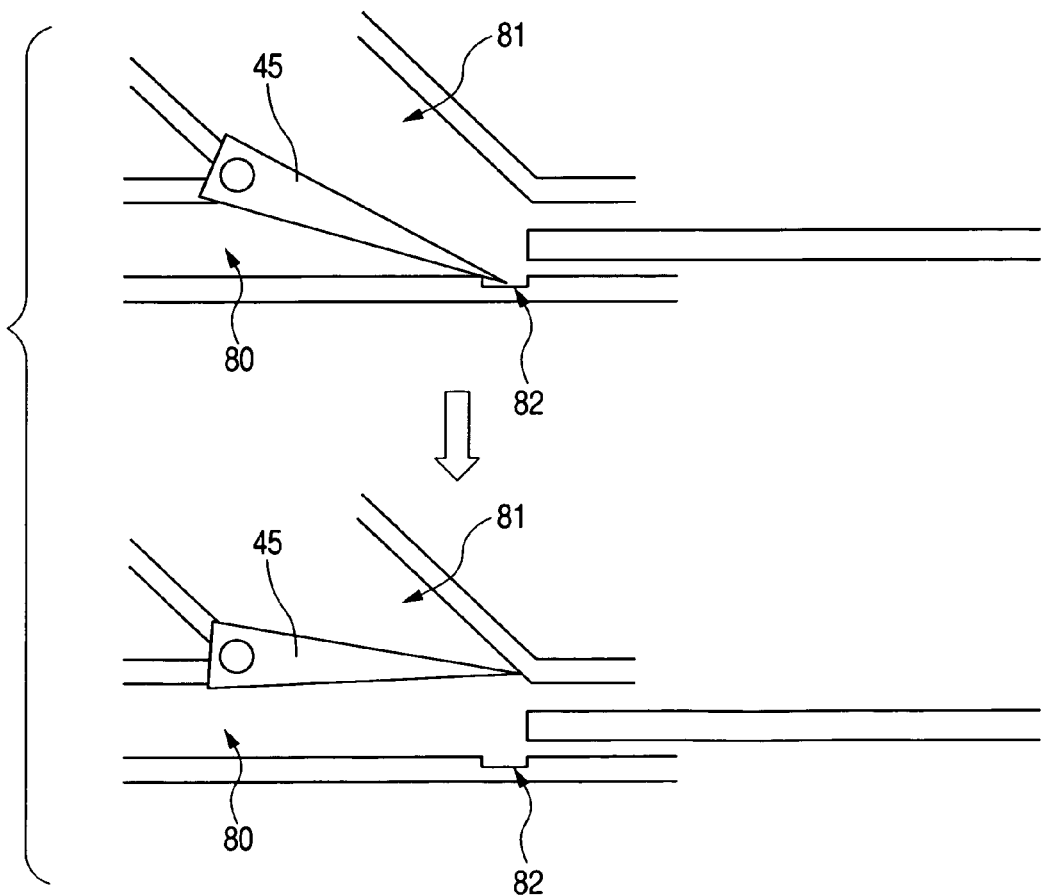
FIG. 48 is a schematic enlarged view showing path change means in larger scale.

The branch gate 45 switches the path on which the document is conveyed into a shredder conveying path 80 on which the document is conveyed to the shredder portion 24 and an upper conveying path 81 on which the document is conveyed upward from the shredder portion 24, as shown in FIG. 48. While the branch gate 45 is switched into the upper conveying path 81 extending upward from the shredder portion 24 in this mechanical embodiment, the branch gate 45 may be switched into any other path (e.g., path under the shredder portion 24) as long as the path does not lead to the shredder portion 24. Also, in a state where the branch gate 45 is positioned downward, the top end part enters into a groove portion 82. In this case, the document is prevented from entering under the branch gate 45. The other constitution is the same as in the above mechanical embodiments, and its explanation is omitted.

Figure 49:
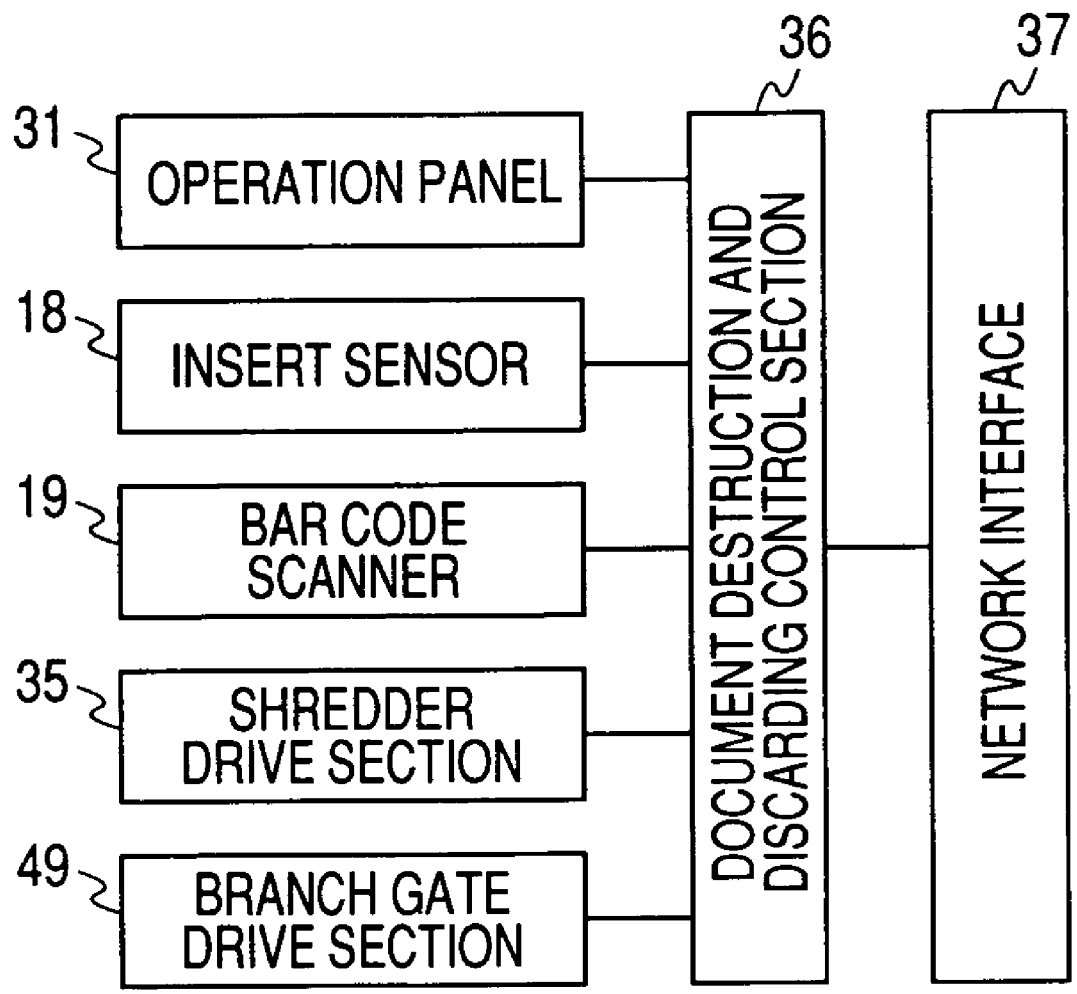
FIG. 49 is a block diagram showing the document destruction and discarding apparatus according to the eighth mechanical embodiment.

FIG. 49 is a block diagram showing the eighth mechanical embodiment of the document destruction and discarding apparatus 3.

The document destruction and discarding apparatus 3 comprises an operation panel 31, a shredder drive section 35, a document destruction and discarding control section 36, a network interface 37, and a branch gate drive section 49, in addition to the components as described above. They are the same as in the above embodiments, and its explanation is omitted.

Figure 50:
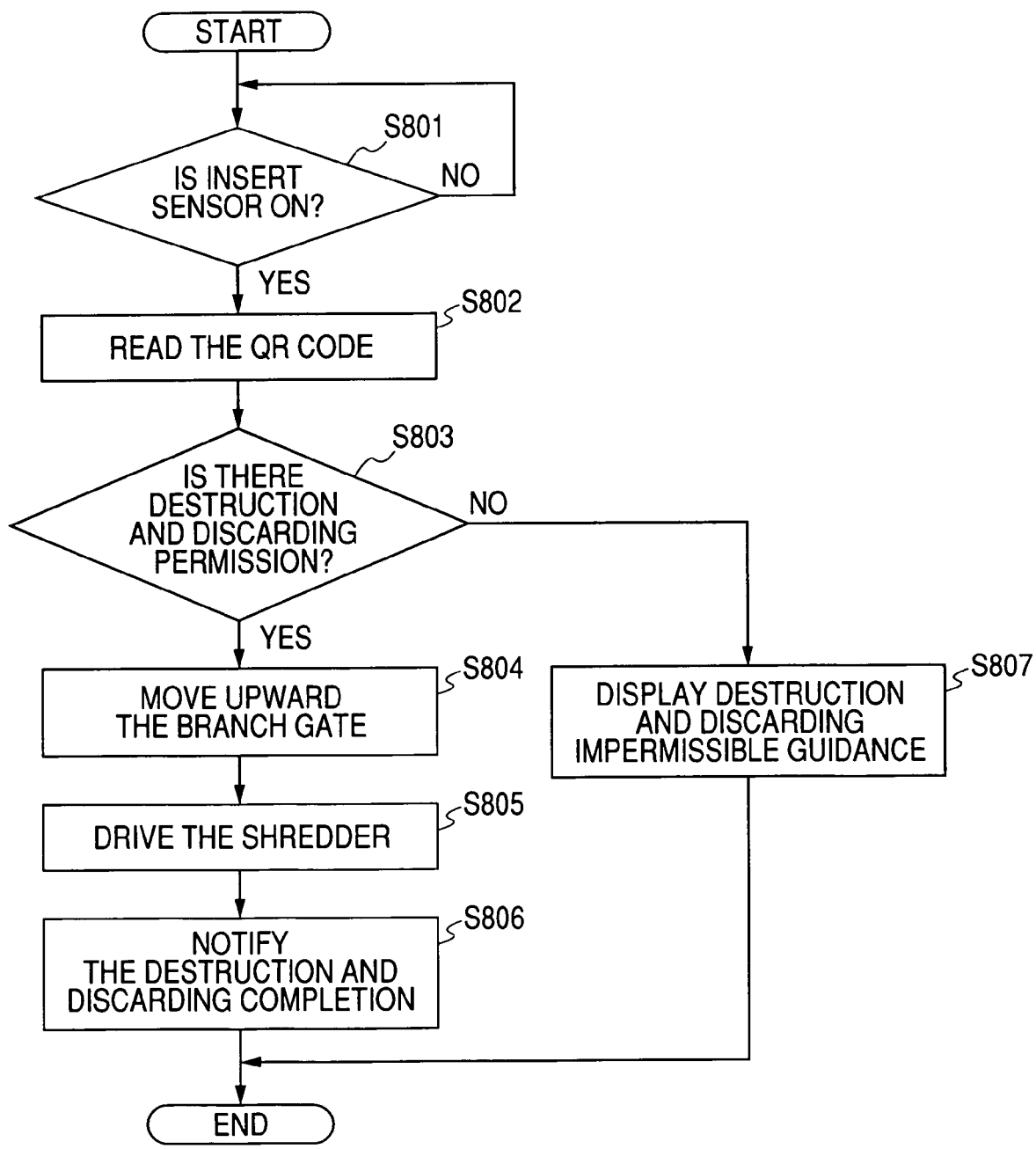
FIG. 50 is a flowchart showing a processing procedure for the document destruction and discarding apparatus according to the eighth mechanical embodiment.

FIG. 50 is a flowchart showing a processing procedure for destroying and discarding the document in the eighth mechanical embodiment of the document destruction and discarding apparatus 3. The process of the document management apparatus 2 is the same as those of the above mechanical embodiments, and its explanation is omitted.

The document destruction and discarding control section 36 continually monitors the signal (on/off state) of the insert sensor 18 while the document destruction and discarding apparatus 3 is on standby (step S801). If the insert sensor 18 is turned on when the user inserts the document, the document destruction and discarding control section 36 issues an instruction of reading the bar code to the bar code scanner 19. And the bar code scanner 19 reads the QR code printed on the document in accordance with this reading instruction (step S802).

Next, as for the document specified by the document ID contained in the read QR code, an inquiry as to whether or not the destruction and discarding of the document is permitted is made to the document management apparatus 2 (step S803). The inquiry for document destruction and discarding permission is made by creating an inquiry message for destruction and discarding permission with the document ID contained in the QR code read by the bar code scanner 19 designated and transmitting this inquiry message from the network interface 37 via the network 4 to the document management apparatus 2.

And if the answer message is to give the document destruction and discarding permission, the document destruction and discarding control section 36 instructs the branch gate drive section 49 to change the path, and the branch gate drive section 49 starts to change the path with the branch gate 45 upon receiving this instruction. That is, the path on which the document is conveyed is switched from the upper conveying path 81 extending upward from the shredder portion 24 into the shredder conveying path 80 toward the shredder portion 24 (see FIG. 48) (step S804). Concurrently, the driving of the shredder drive section 35 is started (step S805) Accordingly, the document is directly conveyed on the shredder conveying path 80 to the shredder portion 24, taken in, and shredded there.

It may be also possible to confirm whether or not the content of the answer message is to give a destruction and discarding permission for the document to the inquiry from the self-apparatus (document destruction and discarding apparatus 3) before making an instruction of changing the path to the branch gate drive section 49, as in the above mechanical embodiments.

While the shredder drive section 35 starts the driving at the same time the branch gate drive section 49 starts to change the path in this mechanical embodiment, the shredder portion 24 needs to be driven when the document is conveyed, and may be driven at the preceding or succeeding timing.

Thereafter, the rear end of the document passes by the sensing position of the insert sensor 18, so that the insert sensor 18 is switched from the on state to the off state. Then, the document destruction and discarding control section 36 transmits a message of destruction and discarding completion notification that the destruction and discarding of the document is completed to the document management apparatus 2 by designating the document ID of the document, for which the document destruction and discarding permission is given ahead, in a certain time since the insert sensor is turned off (specifically the time taken since the rear end of the document is taken into the shredder portion 24 till the entire document is shredded) (step S806).

On the other hand, if the destruction and discarding permission for the document is not given from the document management apparatus 2 (no answer, destruction and discarding inhibition) at step S803, a prepared destruction and discarding impermissible guidance to report that the destruction and discarding of the document is not permitted is displayed on the operation panel 31 (step S807). One example of the destruction and discarding impermissible guidance may be "Destruction and discarding of this document is inhibited for some reason. Pull out the document." It is desirable that the report includes the reason. Also, after the destruction and discarding completion notification is transmitted, the document destruction and discarding apparatus 3 immediately returns to the standby state. However, after the destruction and discarding impermissible guidance is displayed at step S807, the document destruction and discarding apparatus 3 returns to the standby state if the insert sensor 18 is switched form the on state to the off state (the user takes the document out of the document tray portion 17).

In this mechanical embodiment, if the answer (message) is to give the destruction and discarding permission for the document, the branch gate drive section 49 immediately starts to change the path. However, in the case where the reporting of the branch gate drive section 49 is made by another means (start button), the driving of the branch gate drive section 49 may be released from the regulated state, if the answer (message) is to give the destruction and discarding permission for the document, whereby there is the same effect.

Ninth Mechanical Embodiment

Figure 51:
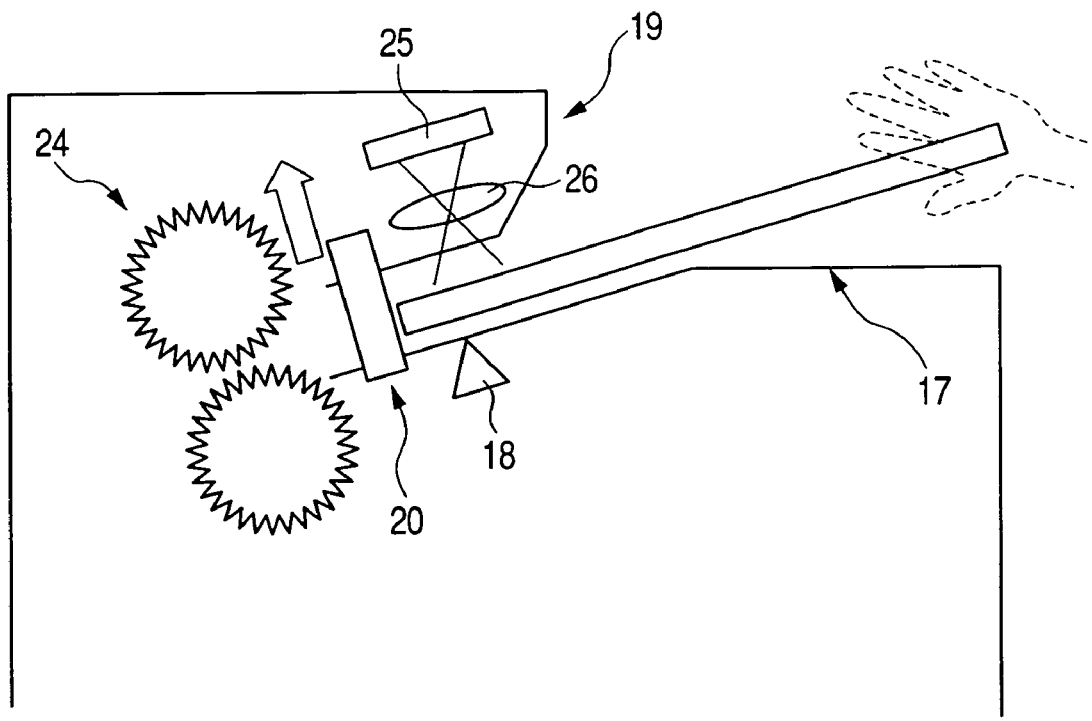
FIG. 51 is a schematic view showing a document destruction and discarding apparatus according to a ninth mechanical embodiment.

FIG. 51 is a schematic view showing a ninth mechanical embodiment of the document destruction and discarding apparatus 3.

This document destruction and discarding apparatus 3 is constructed employing a shredder device, for example, and comprises a document tray portion 17, an insert sensor 18, a bar code scanner 19, a shredder portion 24, and a stopper gate 20, in which the document is directly fed to the shredder portion 24 by manual insertion.

The stopper gate 20 has the same constitution as in the above mechanical embodiment, and the explanation is omitted. The other constitution is the same as in the above mechanical embodiments, and its explanation is omitted.

The stopper gate 20 only needs to physically stop the conveyance of the document, and is not limited to this form (e.g., the stopper gate may press the document in one conveying direction and regulate the document from being conveyed.)

Figure 52:
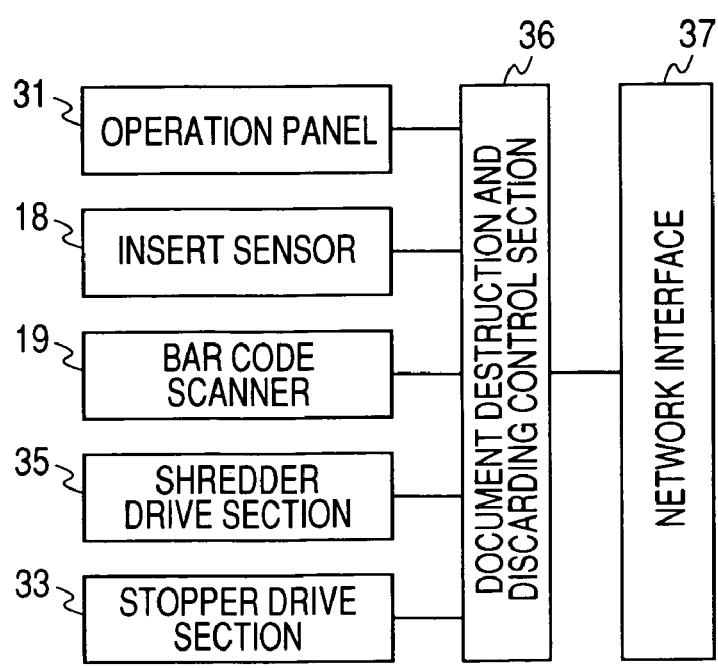
FIG. 52 is a block diagram showing the document destruction and discarding apparatus according to the ninth mechanical embodiment.

FIG. 52 is a block diagram showing the ninth mechanical embodiment of the document destruction and discarding apparatus 3.

The document destruction and discarding apparatus 3 comprises an operation panel 31, a shredder drive section 35, a document destruction and discarding control section 36, a network interface 37, and a stopper drive section 33, in addition to the components as described above. They are the same as in the above embodiments, and its explanation is omitted.

Figure 53:
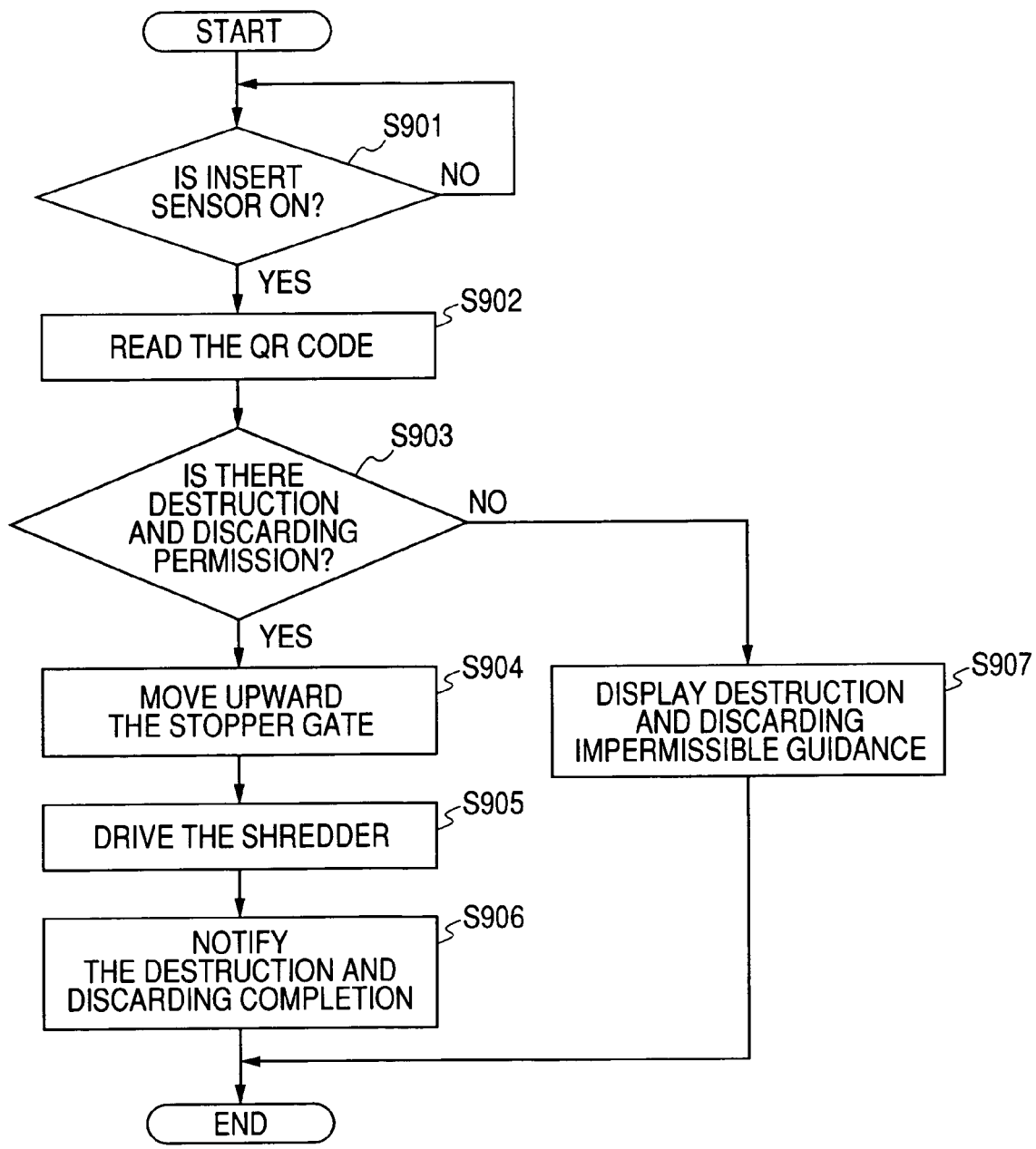
FIG. 53 is a flowchart showing a processing procedure of the document destruction and discarding apparatus according to the ninth mechanical embodiment.

FIG. 53 is a flowchart showing a processing procedure for destroying and discarding the document in the ninth mechanical embodiment of the document destruction and discarding apparatus 3. The process of the document management apparatus is the same as those of the above mechanical embodiments, and its explanation is omitted.

The document destruction and discarding control section 36 continually monitors the signal (on/off state) of the insert sensor 18 while the document destruction and discarding apparatus 3 is on standby (step S901). If the insert sensor 18 is turned on when the user inserts the document, the document destruction and discarding control section 36 issues an instruction of reading the bar code to the bar code scanner 19. And the bar code scanner 19 reads the QR code printed on the document in accordance with this reading instruction (step S902).

Next, as for the document specified by the document ID contained in the read QR code, an inquiry as to whether or not the destruction and discarding of the document is permitted is made to the document management apparatus 2 (step S903). The inquiry for document destruction and discarding permission is made by creating an inquiry message for destruction and discarding permission with the document ID contained in the QR code read by the bar code scanner 19 designated and transmitting this inquiry message from the network interface 37 via the network 4 to the document management apparatus 2.

And if the answer message is to give the document destruction and discarding permission, the document destruction and discarding control section 36 instructs the stopper drive section 33 to lift the stopper gate 20, and the stopper drive section 33 starts to lift the stopper gate 20 upon receiving this instruction. That is, the stopper gate 20 is placed from the state of closing the conveying path to the state of opening the conveying path (step S904). Concurrently, the driving of the shredder drive section 35 is started (step S905). Accordingly, the document is directly conveyed to the shredder portion 24, taken in, and shredded there.

It may be also possible to confirm whether or not the content of the answer message is to give a destruction and discarding permission for the document to the inquiry from the self-apparatus (document destruction and discarding apparatus 3) before making an instruction of starting the driving to the stopper drive section 33, as in the above mechanical embodiments. While the shredder drive section 35 starts the driving at the same time the stopper drive section 33 starts the driving in this mechanical embodiment, the shredder portion 24 needs to be driven when the document is conveyed, and may be driven at the preceding or succeeding timing.

Thereafter, the rear end of the document passes by the sensing position of the insert sensor 18, so that the insert sensor 18 is switched from the on state to the off state. Then, the document destruction and discarding control section 36 transmits a message of destruction and discarding completion notification that the destruction and discarding of the document is completed to the document management apparatus 2 by designating the document ID of the document, for which the document destruction and discarding permission is given ahead, in a certain time since the insert sensor is turned off (specifically the time taken since the rear end of the document is taken into the shredder portion 24 till the entire document is shredded) (step S906).

On the other hand, if the destruction and discarding permission for the document is not given from the document management apparatus 2 (no answer, destruction and discarding inhibition) at step S903, a prepared destruction and discarding impermissible guidance to report that the destruction and discarding of the document is not permitted is displayed on the operation panel 31 (step S907). One example of the destruction and discarding impermissible guidance may be "Destruction and discarding of this document is inhibited for some reason. Pull out the document." It is desirable that the report includes the reason.

Also, after the destruction and discarding completion notification is transmitted, the document destruction and discarding apparatus 3 immediately returns to the standby state. However, after the destruction and discarding impermissible guidance is displayed at step S907, the document destruction and discarding apparatus 3 returns to the standby state if the insert sensor 18 is switched form the on state to the off state (the user takes the document out of the document tray portion 17).

In this mechanical embodiment, if the answer (message) is to give the destruction and discarding permission for the document, the stopper drive section immediately starts the upward movement operation of the stopper gate 20. However, in the case where the upward movement operation of the stopper gate 20 is made by another means (start button), the upward movement operation of the stopper gate 20 may be released from the regulated state, if the answer (message) is to give the destruction and discarding permission for the document.

Herein, another form of the stopper gate 20 and another form of the dropper drive section 33 will be described below.

Figure 54A:
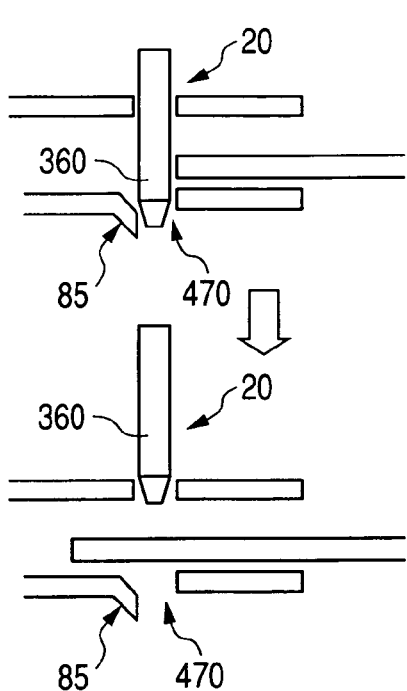
FIGS. 54A and 54B are schematic views showing another form of a gate portion according to the ninth mechanical embodiment.
Figure 54B:
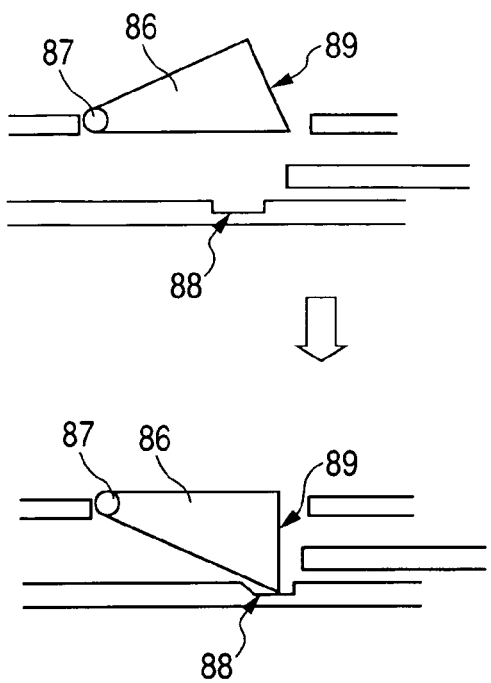

FIG. 54 is a schematic view showing another form of the stopper gate 20.

The stopper gate 20 as shown in (A) has fundamentally the same constitution as that of the fourth embodiment. A different point is that an inclined portion 85 is formed in a region of a gate hole 470 on the slide plane, with which the document slides on the conveying path, on the downstream side (on the side of the shredder potion 24). Also, this inclined portion 85 is set to be lower than a region of the gate hole 470 on the upstream side. With such a constitution, the corner of the document is prevented from being caught in the gate hole 470.

More particularly, in a case where the stopper gate 20 and the stopper portion 360 are integrally formed in a rectangular plate member, for example, one slender opening (or groove) conforming with this rectangular plate member is formed, considering that the conveying path of the document is fully intercepted. In this case, there is possibility that the document may be caught in the one slender opening (or groove). Thus, the stopper portion 360 is formed like a column, as in the fourth mechanical embodiment, and the opening (or groove) is correspondingly made short, whereby the document is prevented from entering. However, in the document destruction and discarding apparatus 3 in which the documents of various sizes are destroyed and discarded, there is possibility that the corner of the document enters even in the short opening (or groove), whereby it is desired to have a structure for preventing the document from being trapped in such a manner that the downstream side of the gate hole 470 is inclined or made lower than the upstream side as in this form.

The stopper gate 20 as shown in (B) has a swinging portion 86 in which one end of the conveying path on the downstream side is attached to be vertically swung around a swinging axis 87. At the other end of the swinging portion 86, a contact face 89 contacting with the document is formed. This contact face 89 is formed to be a vertical plane that is almost vertical in a state intercepting the conveying path. This is intended to prevent the swinging portion 86 from retracting, when the document is pushed into the contact face 89 in a direction toward the shredder portion 24, and to force the swinging portion 86 to quickly retract in a state where the document is contact with the contact face 87. Also, when the swinging portion 86 is located downward, a lower end of the top end part enters in the groove 88 to prevent the document from entering under the swinging portion 86.

FIG. 55 is a schematic view further showing another form of the stopper gate 20.

Figure 55A:
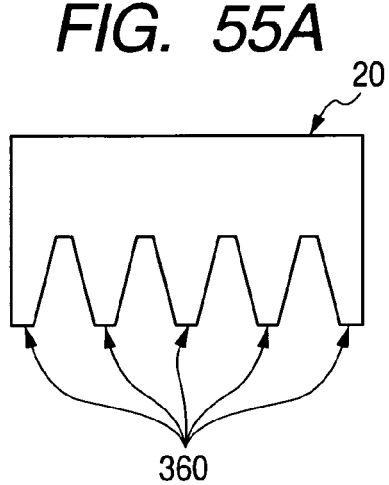
FIGS. 55A and 55B are schematic views showing another form of the gate portion according to the ninth mechanical embodiment.
Figure 55B:
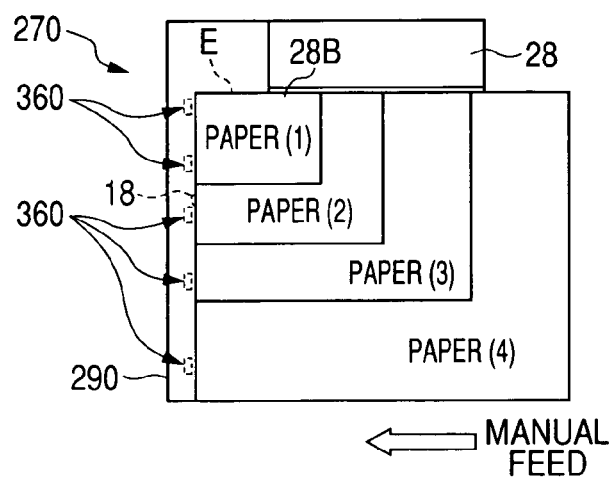

FIG. 55A is a schematic view of the stopper gate 20 as seen from an advancing direction (front face) of the document, and FIG. 55B is a schematic view of the paper tray 17 as seen from above.

Herein, the stopper gate 20 is fundamentally the same as in the fourth mechanical embodiment. A different point is that the number of columnar gate portions 360 is different, in which five columnar gate portions 360 are provided in this form (two in the fourth mechanical embodiment). The stopper gate 20 of this form stops the paper size of various standards at least two positions. That is, this constitution is desirable in consideration of the lighter weight of the stopper gate 20, preventing the document of small size from passing through the columnar gate portions 360, and stably stopping the conveyance of the document.

Figure 56:
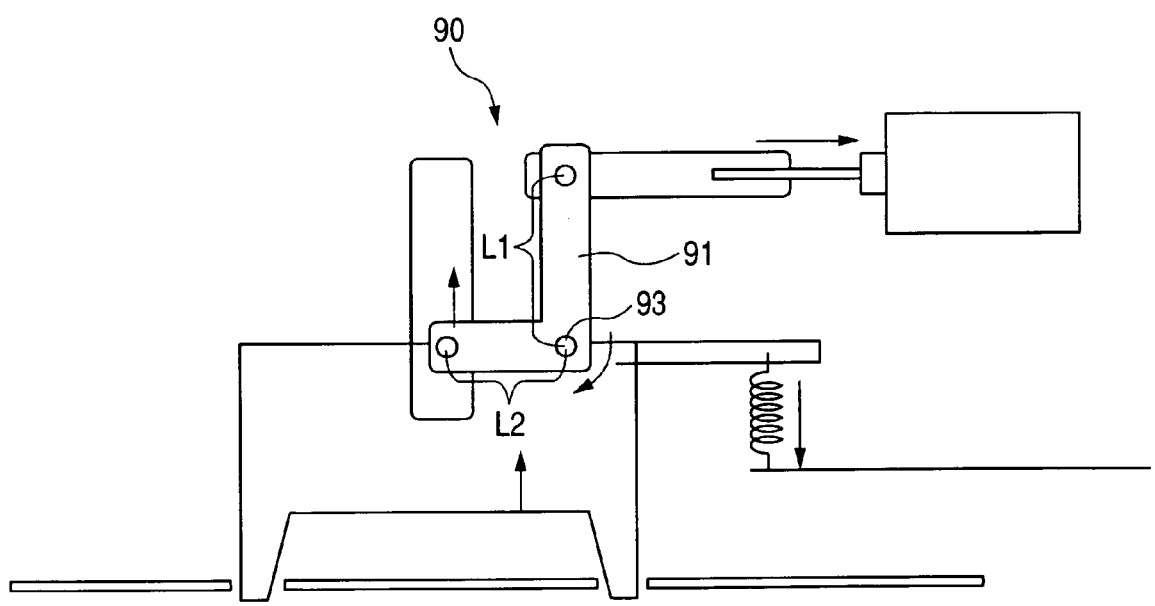
FIG. 56 is a schematic view showing another driving mechanism according to the ninth mechanical embodiment.

FIG. 56 is a schematic view showing another form of a drive mechanism of the stopper drive section 33.

The stopper drive section 33 is fundamentally the same as in the fourth mechanical embodiment. A different point is that the lever ratio of a lever 91 (actuation arm 400 in the fourth mechanical embodiment) like L-character is different. The L-character lever 91 of this form is made freely swingable around the swinging axis 93, in which the lever ratio is set such that L1 may be greater than L2. With this constitution, a drive force of the stopper drive section 33 is expanded to drive the stopper gate 20. Also, besides the L-character lever 91, when the stopper drive section is connected via a gear, the drive force is expanded by setting the gear ratio. In this form, a solenoid is employed, but a motor may be employed as the drive source. Also, the stopper gate 20 is provided with a spring for pressing it down. This spring is provided so that the gate portion may be securely lowered.

In the stopper gate 20 of this form, the gate portion 360 is made smoothly movable in a state where the document is pressed against the gate portion 360. In this case, the stopper drive section 33 is prevented from producing high output unnecessarily.

Figure 57:
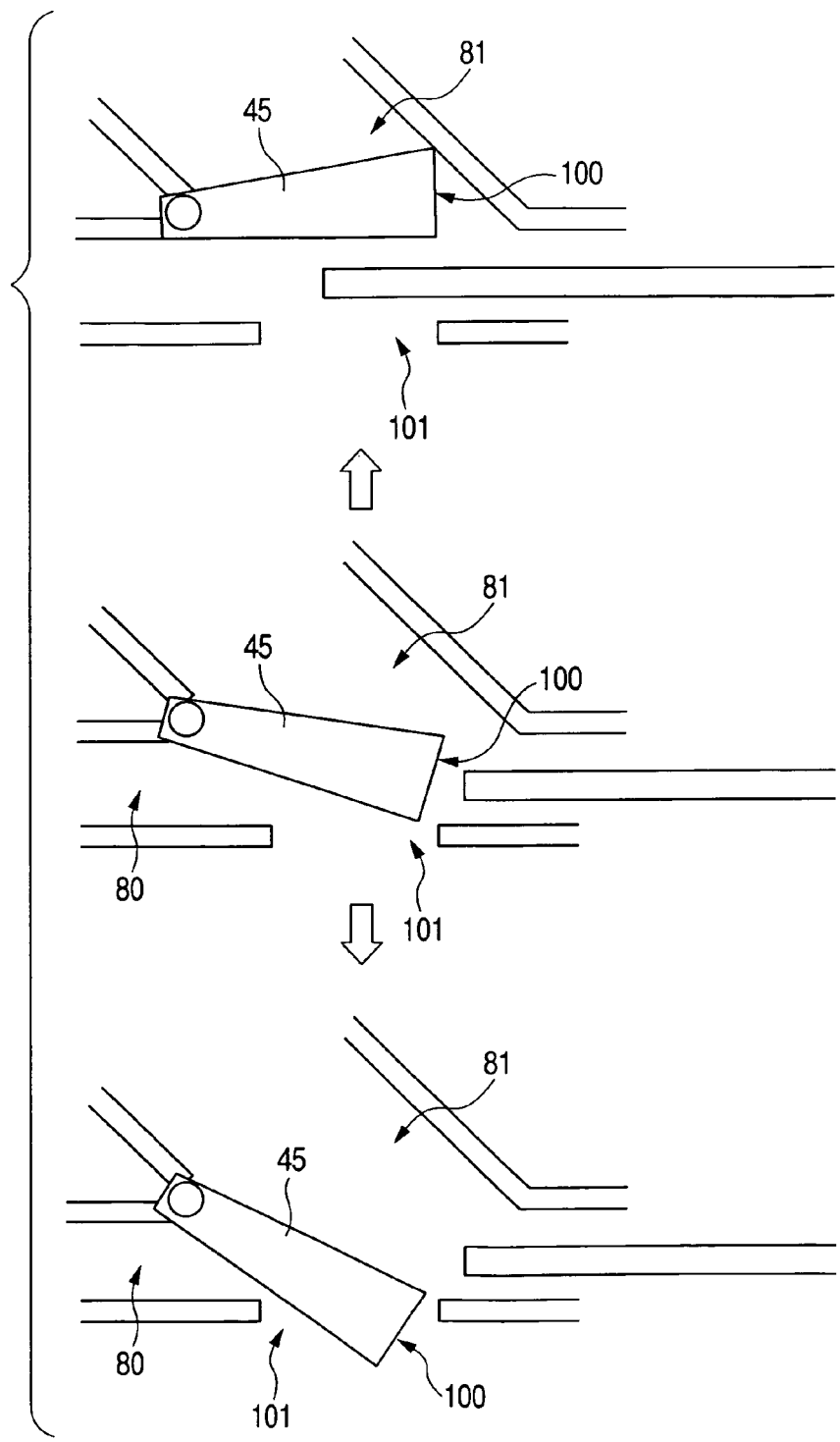
FIG. 57 is a schematic view showing another form of the ninth mechanical embodiment.

FIG. 57 is a view for explaining another form having the functions of both the eighth mechanical embodiment and the ninth mechanical embodiment of the document destruction and discarding apparatus 3.

A basic constitution is the same as in the eighth mechanical embodiment. A different point is that a gate face 100 contacting the document is formed at the top end part of a branch gate 45. Also, a branch gate opening portion 101 is formed on the conveying path so that the branch gate 45 may be movable downward.

Figure 58:
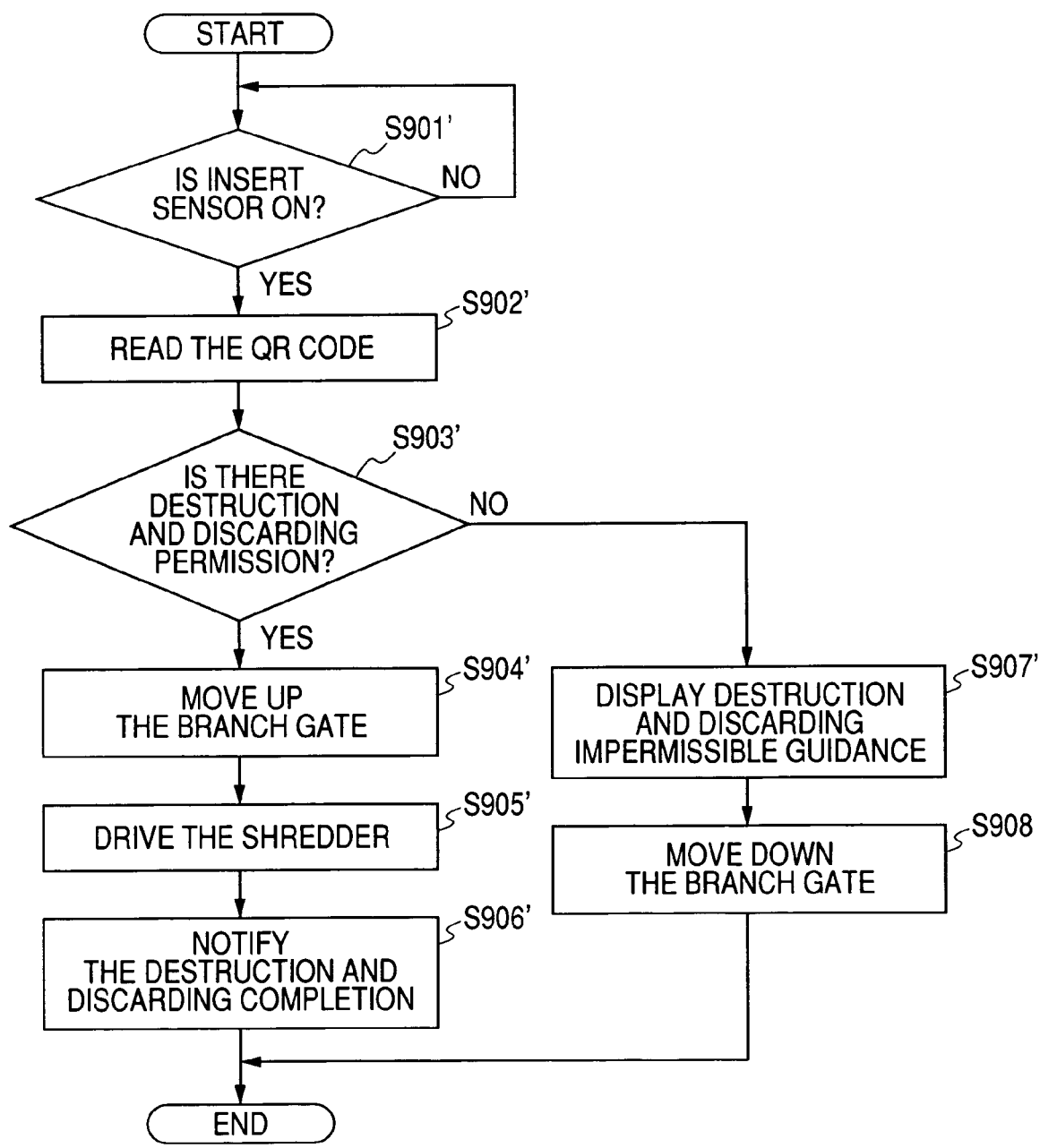
FIG. 58 is a flowchart showing a processing procedure for another form of the ninth mechanical embodiment.

Also, a processing procedure of this form as shown in FIG. 58 is fundamentally the same as in the ninth mechanical embodiment. A different point is that step S908 exists after step S907'. That is, when the document is not given a destruction and discarding permission, the branch gate 45 is moved down to switch the conveying path into an upper conveying path 81. In this case, when the destruction and discarding permission is not given, the document can be conveyed and easily taken out if the document is directly pushed.

Next, the following five mechanical embodiments will be described below in which the document destruction and discarding apparatus 3 is configured to prevent the destruction and discarding of the document that must not be destroyed and discarded, so that the document that must not be destroyed and discarded is prevented from being carelessly destroyed and discarded.

Tenth Mechanical Embodiment

Figure 59:
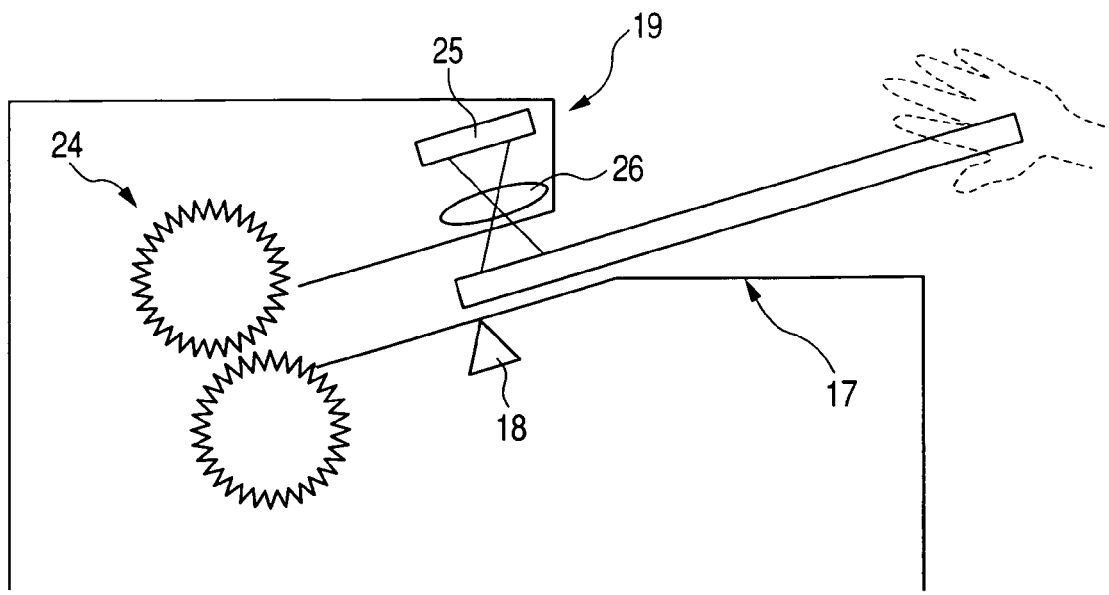
FIG. 59 is a schematic view showing a document destruction and discarding apparatus according to a tenth mechanical embodiment.

FIG. 59 is a schematic view showing a tenth mechanical embodiment of the document destruction and discarding apparatus 3.

This document destruction and discarding apparatus 3 is constructed employing a shredder device, for example, and comprises a document tray portion 17, an insert sensor 18, a bar code scanner 19, and a shredder portion 24, in which the document is directly fed to the shredder portion 24 by manual insertion.

They have fundamentally the same constitution as in the fifth mechanical embodiment, except that the distance between the shredder portion 24 and the bar code scanner 19 is set to be longer than the fifth mechanical embodiment. This distance is set to prevent the document from being conveyed to the shredder portion 24 during the time of preventing the destruction and discarding of the document, because it takes some time to prevent the destruction and discarding of the document that must not be destroyed and discarded. The other constitution is the same as in the fifth mechanical embodiment, and its explanation is omitted.

Figure 60:
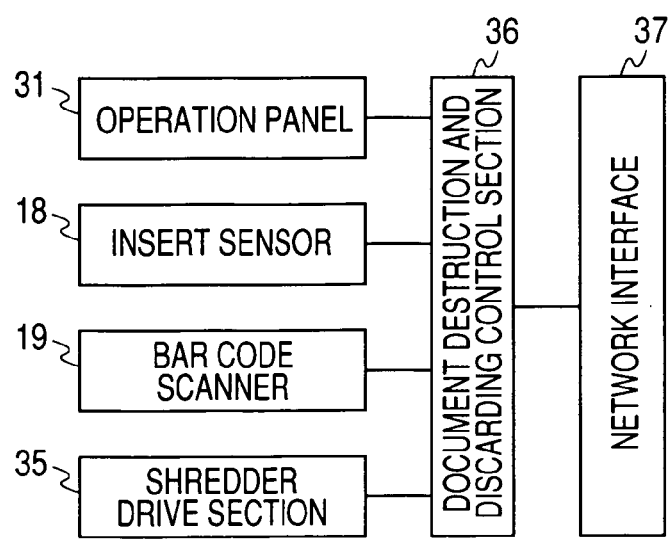
FIG. 60 is a block diagram showing the document destruction and discarding apparatus according to the tenth mechanical embodiment.

FIG. 60 is a block diagram showing the tenth mechanical embodiment of the document destruction and discarding apparatus 3.

The document destruction and discarding apparatus 3 comprises an operation panel 31, a barcode scanner 19, a shredder drive section 35, a document destruction and discarding control section 36, and a network interface 37, in addition to the components as described above. They are the same as in the fifth mechanical embodiment, and its explanation is omitted.

Figure 61:
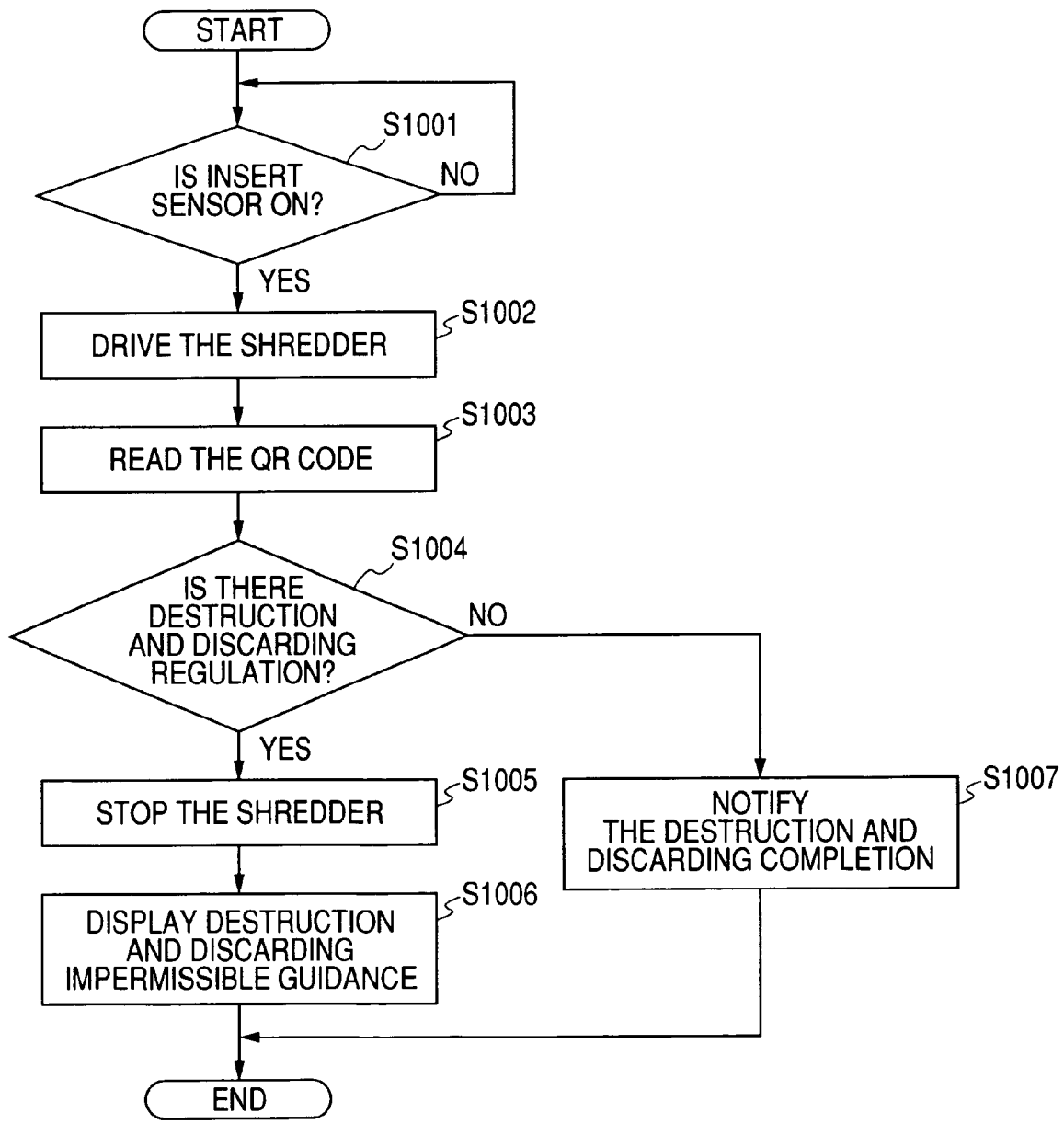
FIG. 61 is a flowchart showing a processing procedure for the document destruction and discarding apparatus according to the tenth mechanical embodiment.

FIG. 61 is a flowchart showing a processing procedure for destroying and discarding the document in the tenth mechanical embodiment of the document destruction and discarding apparatus 3. The process of the document management apparatus 2 is the same as those of the above mechanical embodiments, and its explanation is omitted.

The document destruction and discarding control section 36 continually monitors the signal (on/off state) of the insert sensor 18 while the document destruction and discarding apparatus 3 is on standby (step S1001). If the insert sensor 18 is turned on when the user inserts the document, the document destruction and discarding control section 36 issues an instruction of starting the driving to the shredder drive section 35. And the shredder drive section 35 starts to drive the shredder portion 24 upon receiving this instruction (step S1002) At the same time, the document destruction and discarding control section 26 issues an instruction of reading the bar code to the bar code scanner 19. And the bar code scanner 19 reads the QR code printed on the document in accordance with this reading instruction (step S1003).

Next, as for the document specified by the document ID contained in the read QR code, an inquiry as to whether or not the document is regulated to destroy and discard is made to the document management apparatus 2 (step S1004). The inquiry for a document destruction and discarding permission is made by creating an inquiry message for destruction and discarding regulation with the document ID contained in the QR code read by the bar code scanner 19 designated and transmitting this inquiry message from the network interface 37 via the network 4 to the document management apparatus 2.

And if the answer message is to give the document destruction and discarding regulation, the document destruction and discarding control section 36 instructs the shredder drive section 35 to stop. Then, the shredder drive section 35 stops driving the shredder portion 24 upon receiving this instruction. To stop the shredder portion soon, the shredder portion 24 may be braked separately. Accordingly, the document fed by manual insertion is prevented from being taken into the shredder portion 24, and thereby not shredded through the shred process, because the shredder portion 24 is stopped before it is conveyed to the shredder portion 24 (step S1005).

It may be also possible to confirm whether or not the content of the answer message is to give a destruction and discarding regulation for the document to the inquiry from the self-apparatus (document destruction and discarding apparatus 3) before making an instruction of stopping the driving to the shredder drive section 35, as in the above mechanical embodiments.

Thereafter, a prepared destruction and discarding impermissible guidance to report that the destruction and discarding of the document is not permitted is displayed on the operation panel 31 (step S1006). One example of the destruction and discarding impermissible guidance may be "Destruction and discarding of this document is inhibited for some reason. Pull out the document." It is desirable that the report includes the reason. After the destruction and discarding impermissible guidance is displayed at step S1006, the document destruction and discarding apparatus 3 returns to the standby state if the insert sensor 18 is switched form the on state to the off state (the user takes the document out of the document tray portion 17).

On the other hand, if the destruction and discarding regulation for the document is not given from the document management apparatus 2 (no answer, destruction and discarding permission) at step S1004, the document fed by manual insertion is directly conveyed to the shredder portion 24, taken in, and shredded there. And the rear end of the document passes by the sensing position of the insert sensor 18, so that the insert sensor 18 is switched from the on state to the off state. Then, the document destruction and discarding control section 36 transmits a message of destruction and discarding completion notification that the destruction and discarding of the document is completed to the document management apparatus 2 by designating the document ID of the document, for which the document destruction and discarding permission is given ahead, in a certain time since the insert sensor 18 is turned off (specifically the time taken since the rear end of the document is taken into the shredder portion 24 till the entire document is shredded) (step S1007).

Eleventh Mechanical Embodiment

Figure 62:
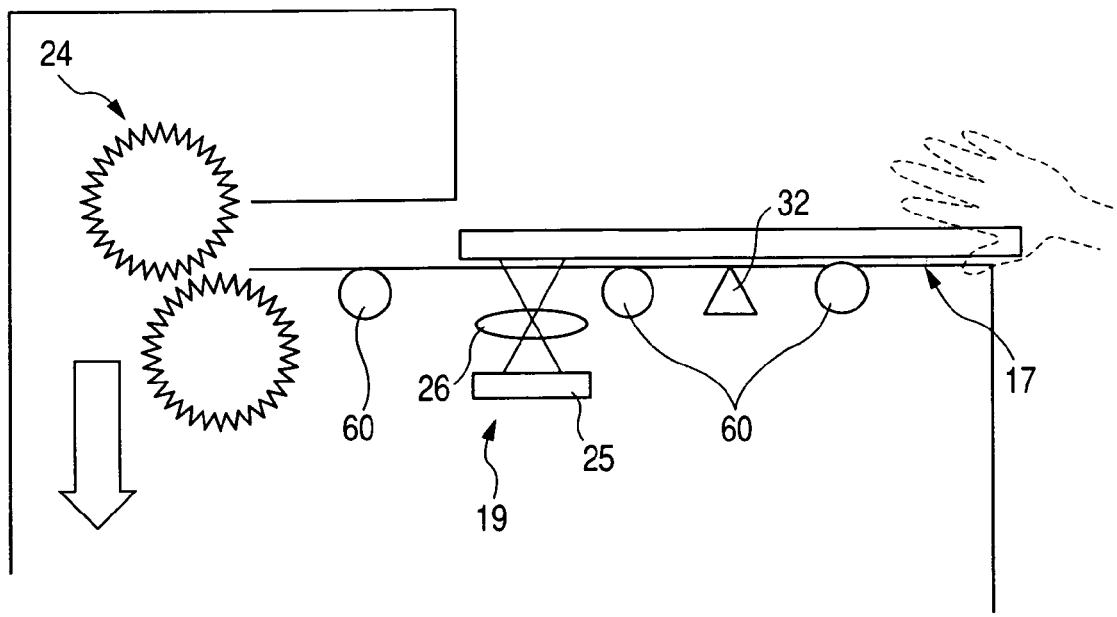
FIG. 62 is a schematic view showing a document destruction and discarding apparatus according to an eleventh mechanical embodiment.

FIG. 62 is a schematic view showing an eleventh mechanical embodiment of the document destruction and discarding apparatus 3.

This document destruction and discarding apparatus 3 is constructed employing a shredder device, for example, and comprises a document tray portion 17, a bar code scanner 19, a shredder portion 24, a set sensor 32 and a conveying roll 60, in which the document is fed to the shredder portion 24 by the conveying roll 60. They have fundamentally the same constitution as in the sixth mechanical embodiment, except that the distance between the shredder portion 24 and the bar code scanner 19 is set to be longer than in the sixth mechanical embodiment.

Figure 63:
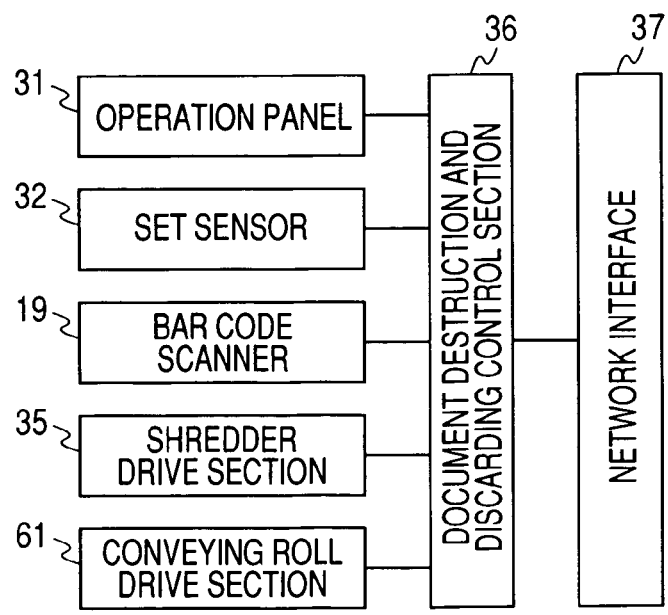
FIG. 63 is a block diagram showing the document destruction and discarding apparatus according to the eleventh mechanical embodiment.

FIG. 63 is a block diagram showing the eleventh mechanical embodiment of the document destruction and discarding apparatus 3.

The document destruction and discarding apparatus 3 comprises an operation panel 31, a shredder drive section 35, a document destruction and discarding control section 36, a network interface 37, and a conveying roll drive section 61, in addition to the components as described above. They are the same as in the sixth mechanical embodiment, and its explanation is omitted.

Figure 64:
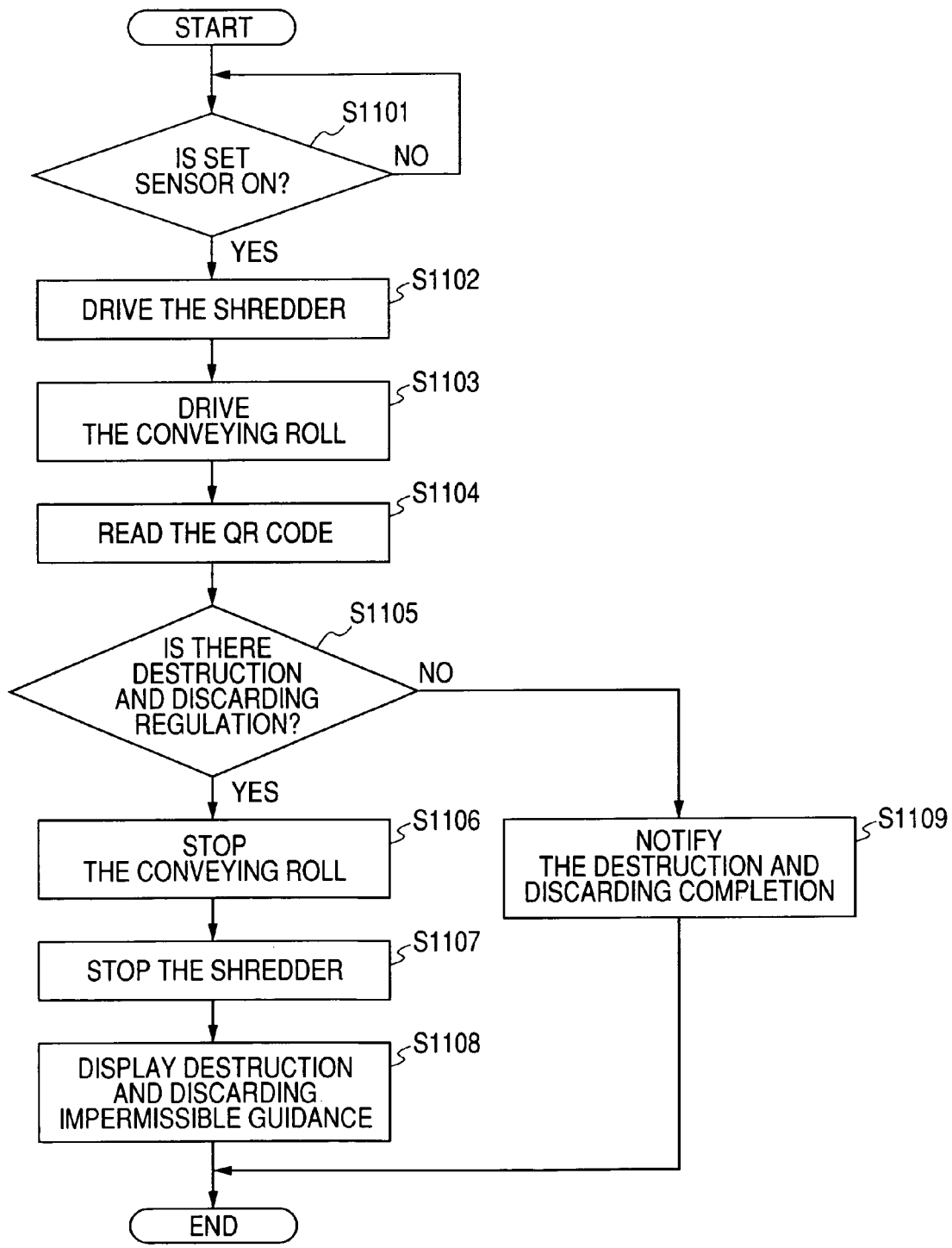
FIG. 64 is a flowchart showing a processing procedure for the document destruction and discarding apparatus according to the eleventh mechanical embodiment.

FIG. 64 is a flowchart showing a processing procedure for destroying and discarding the document in the eleventh mechanical embodiment of the document destruction and discarding apparatus 3. The process of the document management apparatus is the same as those of the above mechanical embodiments, and its explanation is omitted.

The document destruction and discarding control section 36 continually monitors the signal (on/off state) of the set sensor 32 while the document destruction and discarding apparatus 3 is on standby (step S1101). If the set sensor 32 is turned on when the user lays the document on the document tray portion 17, the document destruction and discarding control section 36 issues an instruction of starting the driving to the shredder drive section 35. And the shredder drive section 35 starts to drive the shredder portion 24 upon receiving this instruction (step S1102). At the same time, the document destruction and discarding control section 36 issues an instruction of starting the driving to the conveying roll drive section 61. And the conveying roll drive section 61 starts to drive the conveying roll 60 upon receiving this instruction (step S1103) Further, the document destruction and discarding control section 26 issues an instruction of reading the bar code to the bar code scanner 19. And the bar code scanner 19 reads consecutively the QR codes printed on the documents in accordance with this reading instruction (step S1104).

Next, as for the document specified by the document ID contained in the read QR code, an inquiry as to whether or not the document is regulated to destroy and discard is made to the document management apparatus 2 (step S1105). The inquiry for document destruction and discarding regulation is made by creating an inquiry message for destruction and discarding regulation with the document ID contained in the QR code read by the bar code scanner 19 designated and transmitting this inquiry message from the network interface 37 via the network 4 to the document management apparatus 2.

And if the answer message is to give the document destruction and discarding regulation, the document destruction and discarding control section 36 instructs the conveying roll drive section 61 to stop. Then, the conveying roll drive section 61 stops driving the conveying roll 60 upon receiving this instruction. To stop the conveying roll soon, the conveying roll 60 may be braked separately. Since the conveying roll 60 is stopped till the document is conveyed to the shredder portion 24, the document is prevented from being taken into the shredder portion 24, and thereby not shredded through the shred process (step S1106).

It may be also possible to confirm whether or not the content of the answer message is to give a destruction and discarding regulation for the document to the inquiry from the self-apparatus (document destruction and discarding apparatus 3) before making an instruction of stopping the driving to the conveying roll drive section 61, as in the above mechanical embodiments.

Thereafter, the document destruction and discarding control section 36 makes an instruction of stopping driving the shredder portion 24 to the shredder drive section 35, and the shredder portion 24 stops (S1107). Also, a prepared destruction and discarding impermissible guidance to report that the destruction and discarding of the document is not permitted is displayed on the operation panel 31 (step S1108). One example of the destruction and discarding impermissible guidance may be "Destruction and discarding of this document is inhibited for some reason. Pull out the document." It is desirable that the report includes the reason. After the destruction and discarding impermissible guidance is displayed at step S1107, the document destruction and discarding apparatus 3 returns to the standby state if the insert sensor 18 is switched form the on state to the off state (the user takes the document out of the document tray portion 17).

On the other hand, if the destruction and discarding regulation for the document is not given from the document management apparatus 2 (no answer, destruction and discarding permission) at step S1105, the document fed by manual insertion is directly conveyed to the shredder portion 24, taken in, and shredded there. And the rear end of the document passes by the sensing position of the insert sensor 18, so that the insert sensor 18 is switched from the on state to the off state. Then, the document destruction and discarding control section 36 transmits a message of destruction and discarding completion notification that the destruction and discarding of the document is completed to the document management apparatus 2 by designating the document ID of the document, for which the document destruction and discarding permission is given ahead, in a certain time since the insert sensor 18 is turned off (specifically the time taken since the rear end of the document is taken into the shredder portion 24 till the entire document is shredded) (step S1109).

Twelfth Mechanical Embodiment

Figure 65:
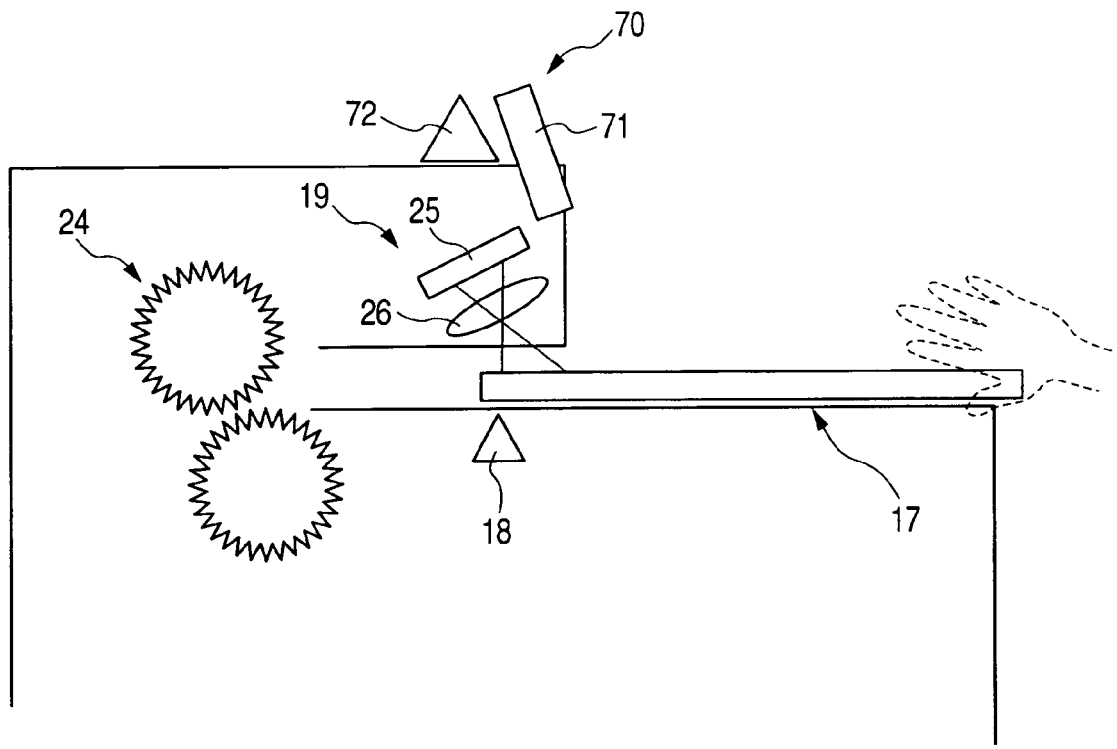
FIG. 65 is a schematic view showing a document destruction and discarding apparatus according to a twelfth mechanical embodiment.

FIG. 65 is a schematic view showing a twelfth mechanical embodiment of the document destruction and discarding apparatus 3.

This document destruction and discarding apparatus 3 is constructed employing a shredder device, for example, and comprises a document tray portion 17, an insert sensor 18, a bar code scanner 19, a shredder portion 24 and a report portion 70, in which the document is fed to the shredder portion 24 by manual insertion.

They have fundamentally the same constitution as in the seventh mechanical embodiment, except that the distance between the shredder portion 24 and the bar code scanner 19 is set to be longer than in the seventh mechanical embodiment. This distance is set to prevent the document from being conveyed to the shredder portion 24 for a prevention time of destroying and discarding the document, because it takes some time to prevent the destruction and discarding of the document that must not be destroyed and discarded. The other constitution is the same as in the seventh mechanical embodiment, and its explanation is omitted.

Figure 66:
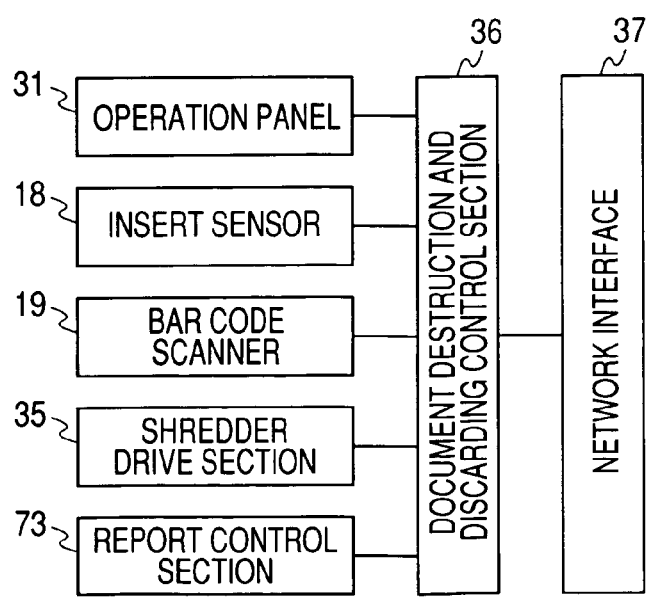
FIG. 66 is a block diagram showing the document destruction and discarding apparatus according to the twelfth mechanical embodiment.

FIG. 66 is a block diagram showing the twelfth mechanical embodiment of the document destruction and discarding apparatus 3.

The document destruction and discarding apparatus 3 comprises an operation panel 31, a shredder drive section 35, a document destruction and discarding control section 36, a network interface 37, and a report control section 73, in addition to the components as described above. They are the same as in the seventh mechanical embodiment, and its explanation is omitted.

Figure 67:
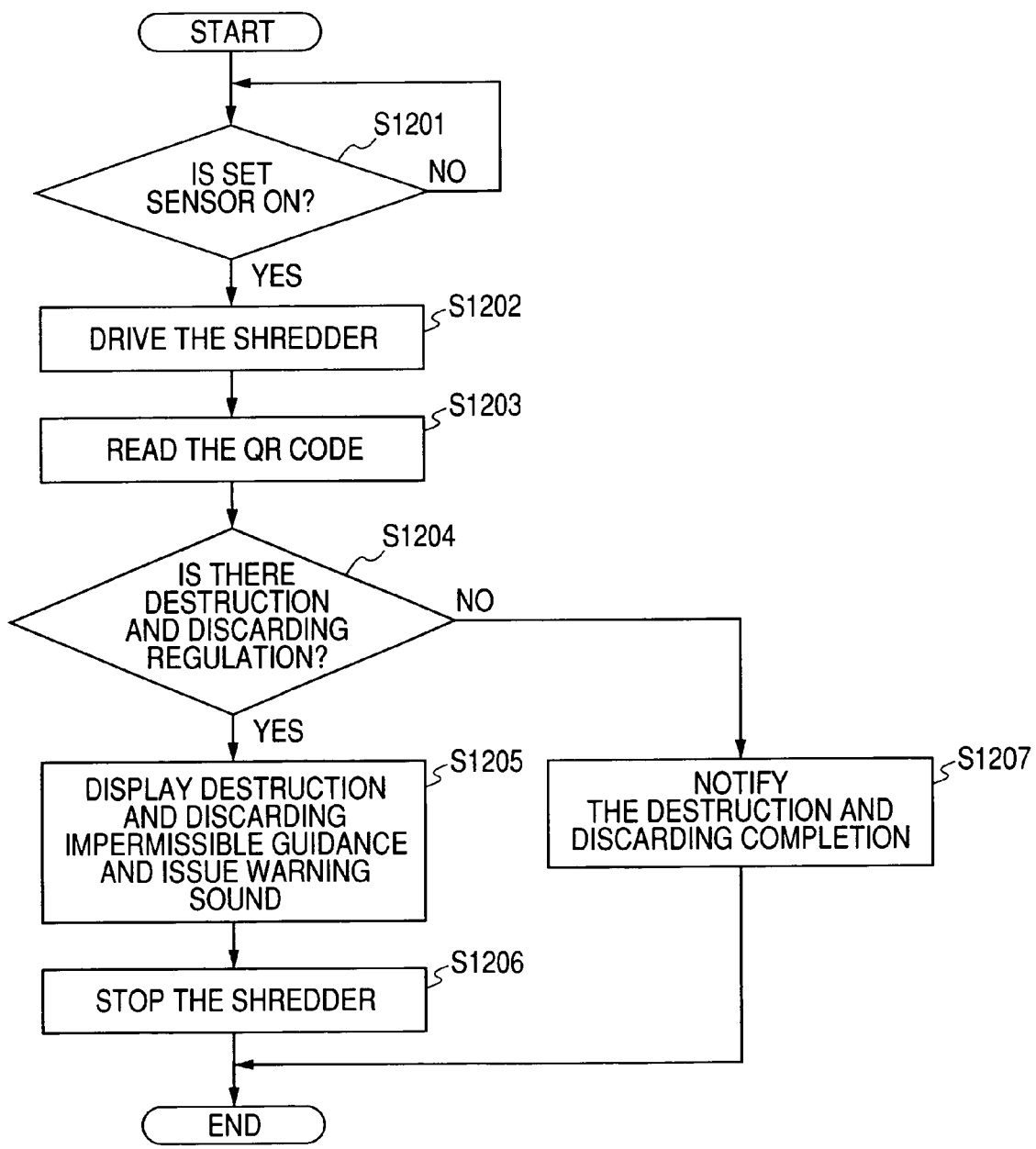
FIG. 67 is a flowchart showing a processing procedure for the document destruction and discarding apparatus according to the twelfth mechanical embodiment.

FIG. 67 is a flowchart showing a processing procedure for destroying and discarding the document in the twelfth mechanical embodiment of the document destruction and discarding apparatus 3. The process of the document management apparatus is the same as those of the above mechanical embodiments, and its explanation is omitted.

The document destruction and discarding control section 36 continually monitors the signal (on/off state) of the insert sensor 18 while the document destruction and discarding apparatus 3 is on standby (step S1201). If the insert sensor 18 is turned on when the user manually inserts the document, the document destruction and discarding control section 36 issues an instruction of starting the driving to the shredder drive section 35. And the shredder drive section 35 starts to drive the shredder portion 24 upon receiving this instruction (step S1202). At the same time, the document destruction and discarding control section 26 issues an instruction of reading the bar code to the bar code scanner 19. And the bar code scanner 19 reads the QR code printed on the document in accordance with this reading instruction (step S1203).

Next, as for the document specified by the document ID contained in the read QR code, an inquiry as to whether or not the document is regulated to destroy and discard is made to the document management apparatus 2 (step S1204). The inquiry for document destruction and discarding regulation is made by creating an inquiry message for destruction and discarding regulation with the document ID contained in the QR code read by the bar code scanner 19 designated and transmitting this inquiry message from the network interface 37 via the network 4 to the document management apparatus 2.

And if the answer message is to give the document destruction and discarding regulation, the report control section 73 starts to report with the report portion 70 (display portion 71, sound source 72). And a destruction and discarding impossible guidance "Do not insert the document." is displayed on the display portion 71, and a buzzer sound (voice, regulation sound) alerting that the document must not be destroyed and discarded is issued by the sound source 72 to make a report for regulating the destruction and discarding of the document that must not be destroyed and discarded.

Accordingly, the user is informed that the document fed by manual insertion must not be destroyed and discarded before the document arrives at the shredder portion 24, whereby the document is prevented from being taken into the shredder portion 24, and shredded through the shred process (destruction and discarding process) (step S1205).

It may be also possible to confirm whether or not the content of the answer message is to give a destruction and discarding regulation for the document to the inquiry from the self-apparatus (document destruction and discarding apparatus 3) before making an instruction of starting the report to the report portion 70, as in the above mechanical embodiments.

Thereafter, the document destruction and discarding control section 36 makes an instruction of stopping driving the shredder portion 24 to the shredder drive section 35, and the shredder portion 24 stops (S1206).

After the destruction and discarding impermissible guidance is displayed at step S1206, the document destruction and discarding apparatus 3 returns to the standby state if the insert sensor 18 is switched form the on state to the off state (the user takes the document out of the document tray portion 17).

On the other hand, if the destruction and discarding regulation for the document is not given from the document management apparatus 2 (no answer, destruction and discarding permission) at step S1204, the document fed by manual insertion is directly conveyed to the shredder portion 24, taken in, and shredded there. And the rear end of the document passes by the sensing position of the insert sensor 18, so that the insert sensor 18 is switched from the on state to the off state. Then, the document destruction and discarding control section 36 transmits a message of destruction and discarding completion notification that the destruction and discarding of the document is completed to the document management apparatus 2 by designating the document ID of the document, for which the document destruction and discarding permission is given ahead, in a certain time since the insert sensor 18 is turned off (specifically the time taken since the rear end of the document is taken into the shredder portion 24 till the entire document is shredded) (step S1207).

Thirteenth Mechanical Embodiment

Figure 68:
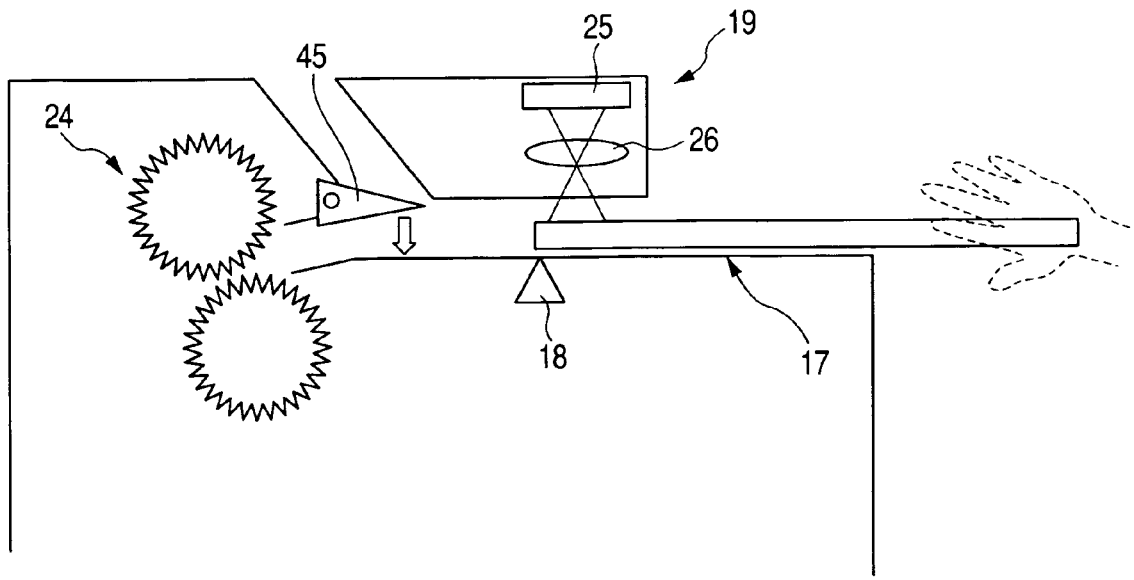
FIG. 68 is a schematic view showing a document destruction and discarding apparatus according to a thirteenth mechanical embodiment.

FIG. 68 is a schematic view showing a thirteenth mechanical embodiment of the document destruction and discarding apparatus 3.

This document destruction and discarding apparatus 3 comprises a document tray portion 17, a bar code scanner 19, a shredder portion 24 and a branch gate 45 for changing the conveying path of the document, in which the document is directly fed to the shredder portion 24 by manual insertion.

They have fundamentally the same constitution as in the eighth mechanical embodiment, except that the distance between the shredder portion 24 and the bar code scanner 19 is set to be longer than in the eighth mechanical embodiment. This distance is provided to prevent the document from being conveyed to the shredder portion 24 for a prevention time of destroying and discarding the document, because it takes some time to prevent the destruction and discarding of the document that must not be destroyed and discarded. The other constitution is the same as in the eighth mechanical embodiment, and its explanation is omitted.

Figure 69:
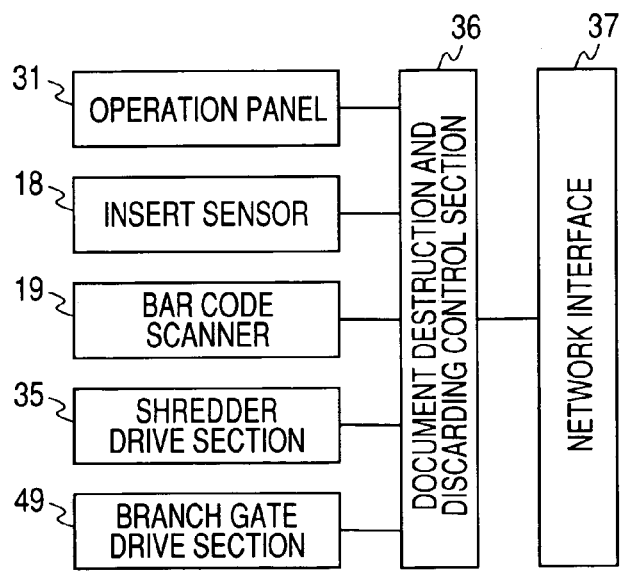
FIG. 69 is a block diagram showing the document destruction and discarding apparatus according to the thirteenth mechanical embodiment.

FIG. 69 is a block diagram showing the thirteenth mechanical embodiment of the document destruction and discarding apparatus 3.

The document destruction and discarding apparatus 3 comprises an operation panel 31, a shredder drive section 35, a document destruction and discarding control section 36, a network interface 37, and a branch gate drive section 49, in addition to the components as described above. They are the same as in the eighth mechanical embodiment, and its explanation is omitted.

Figure 70:
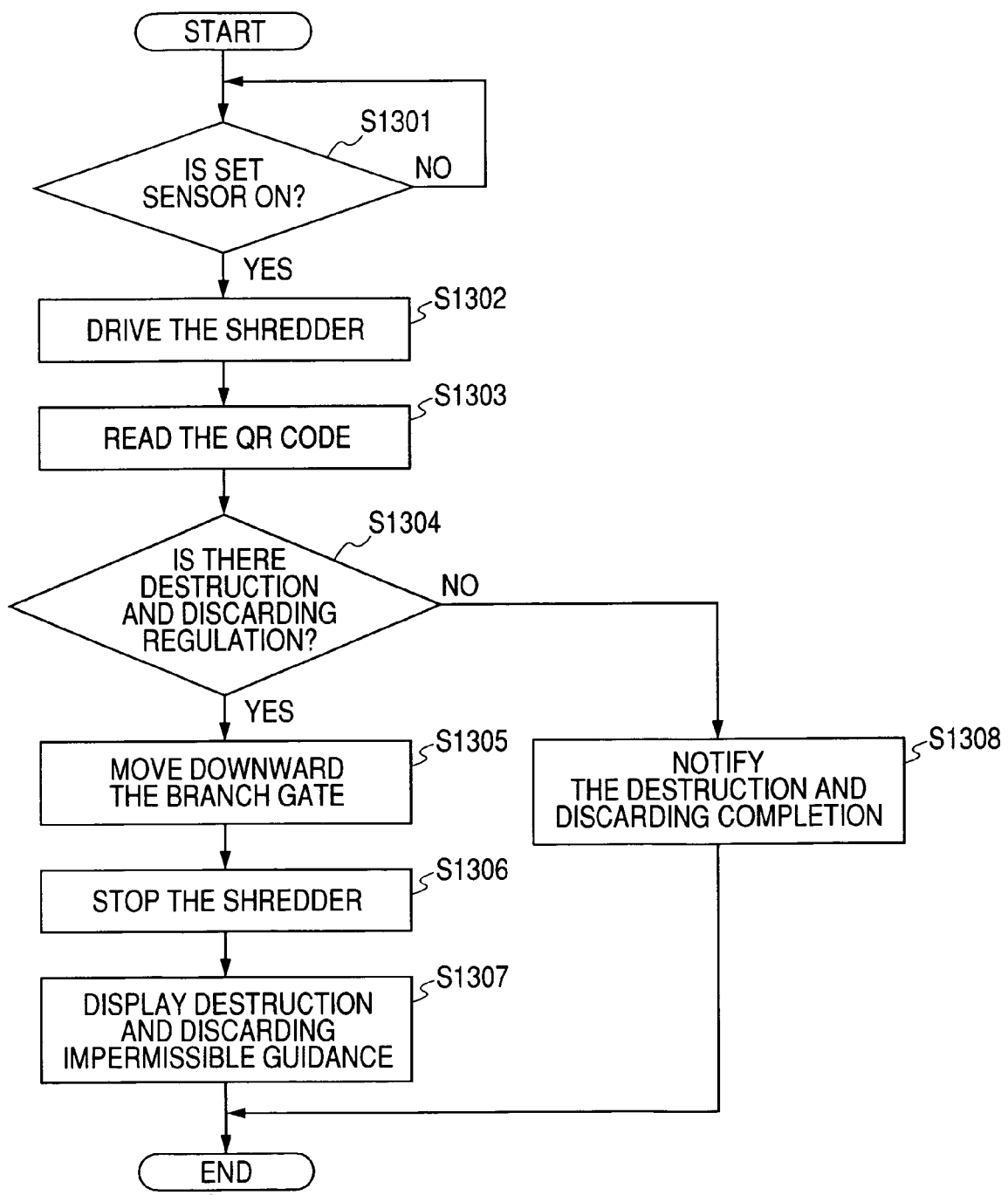
FIG. 70 is a flowchart showing a processing procedure for the document destruction and discarding apparatus according to the thirteenth mechanical embodiment.

FIG. 70 is a flowchart showing a processing procedure for destroying and discarding the document in the thirteenth mechanical embodiment of the document destruction and discarding apparatus 3. The process of the document management apparatus 2 is the same as those of the above mechanical embodiments, and its explanation is omitted.

The document destruction and discarding control section 36 continually monitors the signal (on/off state) of the insert sensor 18 while the document destruction and discarding apparatus 3 is on standby (step S1301). If the insert sensor 18 is turned on when the user manually inserts the document, the document destruction and discarding control section 36 issues an instruction of starting the driving to the shredder drive section 35. Then, the shredder drive section 35 starts to drive the shredder portion 24 upon receiving this instruction (step S1302). At the same time, the document destruction and discarding control section 26 issues an instruction of reading the bar code to the bar code scanner 19. And the bar code scanner 19 reads the QR code printed on the document in accordance with this reading instruction (step S1303).

Next, as for the document specified by the document ID contained in the read QR code, an inquiry as to whether or not the document is regulated to destroy and discard is made to the document management apparatus 2 (step S1304). The inquiry for document destruction and discarding permission is made by creating an inquiry message for destruction and discarding permission with the document ID contained in the QR code read by the bar code scanner 19 designated and transmitting this inquiry message from the network interface 37 via the network 4 to the document management apparatus 2.

And if the answer message is to give the document destruction and discarding regulation, the document destruction and discarding control section 36 makes an instruction of changing the path to the branch gate drive section 49. Then, the branch gate drive section 49 starts to change the path of the branch gate 45 upon receiving this instruction. That is, the branch gate drive section 49 moves the branch gate 45, so that the path on which the document is conveyed is switched from a shredder conveying path 80 toward the shredder portion 24 to an upper conveying path 81 extending upward from the shredder portion 24, whereby the path is changed to regulate the destruction and discarding of the document.

Accordingly, the path of the document is switched into the destruction and discarding prevention path by the time when the document fed by manual insertion arrives at the shredder portion 24, whereby the document is prevented from being taken into the shredder portion 24, and not shredded through the shred process (step S1305).

It may be also possible to confirm whether or not the content of the answer message is to give a destruction and discarding regulation for the document to the inquiry from the self-apparatus (document destruction and discarding apparatus 3) before making an instruction of changing the path to the branch gate drive section 49, as in the above mechanical embodiments.

Thereafter, the document destruction and discarding control section 36 makes an instruction of stopping driving the shredder portion 24 to the shredder drive section 35, and the shredder portion 24 stops (S1306). Also, a prepared destruction and discarding impermissible guidance to report that the destruction and discarding of the document is not permitted is displayed on the operation panel 31 (step S1307). One example of the destruction and discarding impermissible guidance may be "Destruction and discarding of this document is inhibited for some reason. Pull out the document." It is desirable that the report includes the reason. After the destruction and discarding impermissible guidance is displayed at step S1307, the document destruction and discarding apparatus 3 returns to the standby state if the insert sensor 18 is switched form the on state to the off state (the user takes the document out of the document tray portion 17).

On the other hand, if the destruction and discarding regulation for the document is not given from the document management apparatus 2 (no answer, destruction and discarding permission) at step S1304, the document fed by manual insertion is directly conveyed to the shredder portion 24, taken in, and shredded there. And the rear end of the document passes by the sensing position of the insert sensor 18, so that the insert sensor 18 is switched from the on state to the off state. Then, the document destruction and discarding control section 36 transmits a message of destruction and discarding completion notification that the destruction and discarding of the document is completed to the document management apparatus 2 by designating the document ID of the document, for which the document destruction and discarding permission is given ahead, in a certain time since the insert sensor 18 is turned off (specifically the time taken since the rear end of the document is taken into the shredder portion 24 till the entire document is shredded) (step S1308).

Fourteenth Mechanical Embodiment

Figure 71:
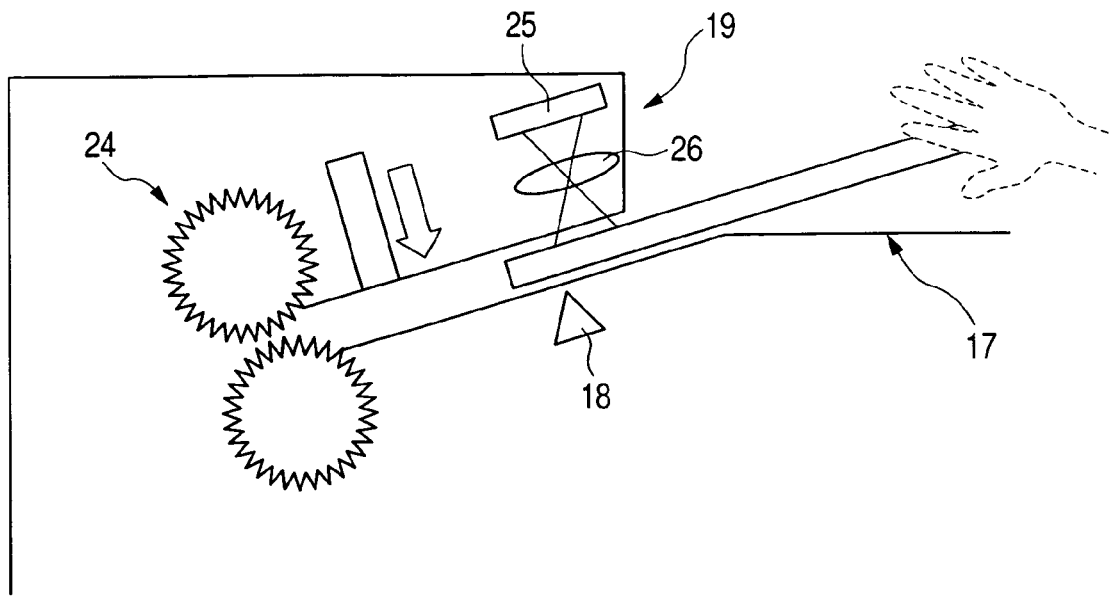
FIG. 71 is a schematic view showing a document destruction and discarding apparatus according to a fourteenth mechanical embodiment.

FIG. 71 is a schematic view showing a fourteenth mechanical embodiment of the document destruction and discarding apparatus 3.

This document destruction and discarding apparatus 3 comprises a document tray portion 17, a bar code scanner 19, a shredder portion 24 and a stopper gate 20 for intercepting the conveying path of the document, in which the document is directly fed to the shredder portion 24 by manual insertion.

They have fundamentally the same constitution as in the ninth mechanical embodiment, except that the distance between the shredder portion 24 and the bar code scanner 19 is set to be longer than in the ninth mechanical embodiment. This distance is set to prevent the document from being conveyed to the shredder portion 24 for a prevention time of destroying and discarding the document, because it takes some time to prevent the destruction and discarding of the document that must not be destroyed and discarded. The other constitution is the same as in the ninth mechanical embodiment, and its explanation is omitted.

Figure 72:
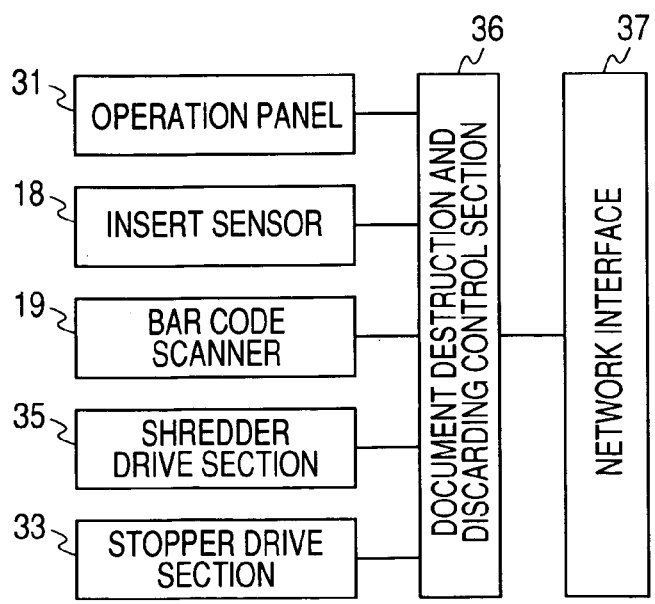
FIG. 72 is a block diagram showing the document destruction and discarding apparatus according to the fourteenth mechanical embodiment.

FIG. 72 is a block diagram showing the fourteenth mechanical embodiment of the document destruction and discarding apparatus 3.

The document destruction and discarding apparatus 3 comprises an operation panel 31, a shredder drive section 35, a document destruction and discarding control section 36, a network interface 37, and a stopper drive section 33, in addition to the components as described above. They are the same as in the ninth mechanical embodiment, and its explanation is omitted.

Figure 73:
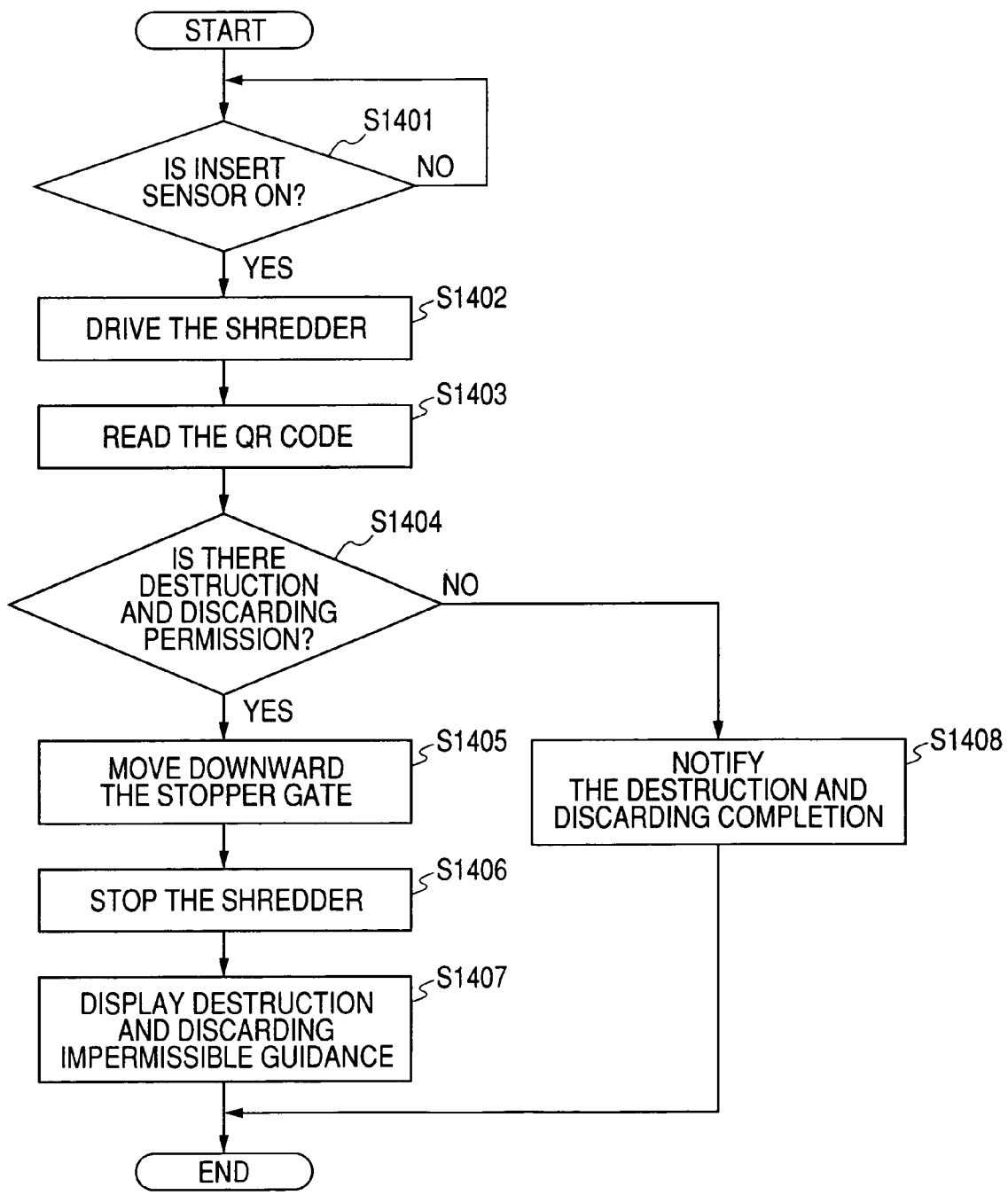
FIG. 73 is a flowchart showing a processing procedure for the document destruction and discarding apparatus according to the fourteenth mechanical embodiment.

FIG. 73 is a flowchart showing a processing procedure for destroying and discarding the document in the fourteenth mechanical embodiment of the document destruction and discarding apparatus 3. The process of the document management apparatus 2 is the same as those of the above mechanical embodiments, and its explanation is omitted.

The document destruction and discarding control section 36 continually monitors the signal (on/off state) of the insert sensor 18 while the document destruction and discarding apparatus 3 is on standby (step S1301). If the insert sensor 18 is turned on when the user manually inserts the document, the document destruction and discarding control section 36 issues an instruction of starting the driving to the shredder drive section 35. Then, the shredder drive section 35 starts to drive the shredder portion 24 upon receiving this instruction (step S1402). At the same time, the document destruction and discarding control section 26 issues an instruction of reading the bar code to the bar code scanner 19. And the bar code scanner 19 reads the QR code printed on the document in accordance with this reading instruction (step S1403).

Next, as for the document specified by the document ID contained in the read QR code, an inquiry as to whether or not the document is regulated to destroy and discard is made to the document management apparatus 2 (step S1404). The inquiry for document destruction and discarding permission is made by creating an inquiry message for destruction and discarding permission with the document ID contained in the QR code read by the bar code scanner 19 designated and transmitting this inquiry message from the network interface 37 via the network 4 to the document management apparatus 2.

And if the answer message is to give the document destruction and discarding regulation, the document destruction and discarding control section 36 makes an instruction of moving the stopper gate 20 downward to the stopper drive section 33. Then, the stopper drive section 33 issues an instruction of making the down movement of the stopper gate 20, and the stopper gate 20 is moved downward to block the conveying path to regulate the destruction and discarding of the document. Accordingly, the stopper gate is moved downward by the time when the document fed by manual insertion is conveyed to the shredder portion 24, whereby the document is prevented from being taken into the shredder portion 24, and not shredded through the shred process (destruction and discarding process) (step S1405). It may be also possible to confirm whether or not the content of the answer message is to give a destruction and discarding regulation for the document to the inquiry from the self-apparatus (document destruction and discarding apparatus 3) before making an instruction of lowering the stopper gate to the stopper drive section 33, as in the above mechanical embodiments.

Thereafter, the document destruction and discarding control section 36 makes an instruction of stopping driving the shredder portion 24 to the shredder drive section 35, and the shredder portion 24 stops (S1406). Also, a prepared destruction and discarding impermissible guidance to report that the destruction and discarding of the document is not permitted is displayed on the operation panel 31 (step S1407). One example of the destruction and discarding impermissible guidance may be "Destruction and discarding of this document is inhibited for some reason. Pull out the document." It is desirable that the report includes the reason. After the destruction and discarding impermissible guidance is displayed at step S1407, the document destruction and discarding apparatus 3 returns to the standby state if the insert sensor 18 is switched form the on state to the off state (the user takes the document out of the document tray portion 17).

On the other hand, if the destruction and discarding regulation for the document is not given from the document management apparatus 2 (no answer, destruction and discarding permission) at step S1404, the document fed by manual insertion is directly conveyed to the shredder portion 24, taken in, and shredded there. And the rear end of the document passes by the sensing position of the insert sensor 18, so that the insert sensor 18 is switched from the on state to the off state. Then, the document destruction and discarding control section 36 transmits a message of destruction and discarding completion notification that the destruction and discarding of the document is completed to the document management apparatus 2 by designating the document ID of the document, for which the document destruction and discarding permission is given ahead, in a certain time since the insert sensor 18 is turned off (specifically the time taken since the rear end of the document is taken into the shredder portion 24 till the entire document is shredded) (step S1408).

Effects of the Invention

Though the first to fourteenth mechanical embodiments of the document destruction and discarding apparatus 3 have been specifically described above, the effects of the first to fourteenth mechanical embodiments of the document destruction and discarding apparatus 3 will be described below.

The document destruction and discarding apparatus 3 can prevent the destruction and discarding of the document that must not be destroyed and discarded, because it is determined whether or not the document may be destroyed and discarded, and the destruction and discarding process is performed according to its determination result (first to fourteenth mechanical embodiments of the document destruction and discarding apparatus 3).

Since an inquiry as to whether or not the document may be destruction and discarding is made to the document management apparatus by designating the document ID appended to the document, and the destruction and discarding process is performed according to the answer content to this inquiry, it is possible to prevent the destruction and discarding of the document that must not be destroyed and discarded.

Also, even if the information as to whether or not the document may be destroyed and discarded is changed in a document storage process, it is only necessary to change this information, for example, whereby it is possible to prevent the destruction and discarding of the document that must not be destroyed and discarded, based on the reliable information at the time of destruction and discarding (first to fourteenth mechanical embodiments of the document destruction and discarding apparatus 3).

On the other hand, in the case where the document destruction and discarding apparatus 3 itself makes a determination whether or not the document may be destroyed and discarded, the destruction and discarding process for the document is performed based on the determination result of determination means for making the determination, whereby it is possible to prevent the destruction and discarding of the document that must not be destroyed and discarded.

Also, in the case where a determination is made based on the attribute information appended to the document, the destruction and discarding process for the document is performed based on the determination result, whereby it is possible to prevent the destruction and discarding of the document that must not be destroyed and discarded with a relatively simple constitution.

Moreover, in the case where an inquiry for the attribute information (period information, etc.) of the document is made to the document management apparatus 3 by designating the document DI appended to the document, and a determination is made based on the sent attribute information, the destruction and discarding process for the document is performed based on the determination result, whereby it is possible to prevent the destruction and discarding of the document that must not be destroyed and discarded.

In the case where the document is not destroyed and discarded in a fundamental state, the destruction and discarding process for the document is performed only when the document may be destroyed and discarded in this state of not destroying and discarding the document, whereby it is possible to prevent securely the destruction and discarding of the document that must not be destroyed and discarded. Also, even when the determination means for determining whether or not the document may be destroyed and discarded breaks down, for example, it is possible to prevent securely the destruction and discarding of the document that must not be destroyed and discarded, because it is fundamental that the document is not destroyed and discarded (first to ninth mechanical embodiments of the document destruction and discarding apparatus 3).

Since the shredder portion 24 for shredding the document is driven only when the document may be destroyed and discarded, the shredder portion 24 is not driven for the document that must not be destroyed and discarded, whereby it is possible to prevent securely the destruction and discarding of the document that must not be destroyed and discarded (first to fifth mechanical embodiments of the document destruction and discarding apparatus 3).

Since the conveying roll 60 is driven only when the document may be destroyed and discarded, the conveying roll 60 is not driven for the document that must not be destroyed and discarded, whereby it is possible to prevent the destruction and discarding of the document that must not be destroyed and discarded (sixth mechanical embodiments of the document destruction and discarding apparatus 3).

Since a report that the document is destroyed and discarded is issued only when the document may be destroyed and discarded, no report is given for the document that must not be destroyed and discarded, whereby it is possible to prevent the destruction and discarding of the document that must not be destroyed and discarded (seventh mechanical embodiments of the document destruction and discarding apparatus 3).

In the case where it is a fundamental state that the destruction and discarding of the document is regulated, the document is released from the state where the destruction and discarding of the document is regulated, only if the document may be destroyed and discarded. Therefore, it is possible to regulate the destruction and discarding of the document that must not be destroyed and discarded and prevent securely the destruction and discarding of the document that must not be destroyed and discarded (eighth and ninth mechanical embodiments of the document destruction and discarding apparatus 3).

Since the branch gate 45 of the document is changed to the conveying path on which the document can be destroyed and discarded only when the document may be destroyed and discarded, only the document permitted to destroy and discard can be destroyed and discarded, whereby it is possible to prevent securely the destruction and discarding of the document that must not be destroyed and discarded (eighth mechanical embodiment of the document destruction and discarding apparatus 3).

Since the stopper gate 20 for intercepting the conveying path of the document is moved down to allow the destruction and discarding of the document only when the document may be destroyed and discarded, only the document permitted to destroy and discard can be destroyed and discarded, whereby it is possible to prevent securely the destruction and discarding of the document that must not be destroyed and discarded.

Also, when the user tries to destroy and discard the document, for example, the gate portion for closing the conveying path can be recognized visually, or the document is pushed against the gate portion when the user thrusts the document into the conveying path, whereby the user can recognize that the destruction and discarding of the document is regulated in a fundamental state, suppressing the feeling of physical disorder to the user because the document can not be destroyed and discarded (ninth mechanical embodiment of the document destruction and discarding apparatus 3).

Since the stopper gate 20 moves the gate portion such that the gate portion is located downward in the state where the destruction and discarding of the document is regulated, or the gate portion is located upward in the state where the destruction and discarding of the document is permitted, the gate portion intercepts the conveying path owing to its dead weight, in the case where it is the fundamental state that the destruction and discarding of the document is regulated. Therefore, even when the gate means breaks down, for example, the gate portion intercepts the conveying path owing to its dead weight, whereby it is possible to prevent securely the destruction and discarding of the document that must not be destroyed and discarded (ninth mechanical embodiment of the document destruction and discarding apparatus 3).

In the case where the gate portion 360 is moved downward from the state where it is located upward to intercept the conveying path, there is possibility that the document passes through a gap between the slide face of the document on the conveying path and the gate portion 360. However, since a lower end part of the gate portion 360 extends beyond the slide face of the document on the conveying path in the state where the gate portion is located down, the document is prevented from passing between the gate portion and the slide face of the conveying path, whereby it is possible to prevent securely the destruction and discarding of the document that must not be destroyed and discarded (ninth mechanical embodiment of the document destruction and discarding apparatus 3).

Since the gate portion 360 is provided to be vertically swingable, the operation of releasing the gate portion 360 from intercepting the conveying path is expedited with a relatively simple constitution, whereby it is possible to prevent the destruction and discarding of the document that must not be destroyed and discarded and expedite the operation of releasing the regulation (ninth mechanical embodiment of the document destruction and discarding apparatus 3).

Since the gate portion 360 is connected to drive means via a drive force expansion mechanism for expanding the drive force, the gate portion 360 is moved excellently even in a state where the document is pressed against the gate portion, for example, whereby it is possible to prevent the destruction and discarding of the document that must not be destroyed and discarded and securely release the regulation (ninth mechanical embodiment of the document destruction and discarding apparatus 3).

Since the document is regulated from being destroyed and discarded in the case where the document must not be destroyed and discarded, it is possible to prevent the destruction and discarding of the document that must not be destroyed and discarded (tenth to fourteenth mechanical embodiments of the document destruction and discarding apparatus 3).

Since the driving of the shredder portion 24 is stopped in the case where the document must not be destroyed and discarded, it is possible to prevent securely the destruction and discarding of the document that must not be destroyed and discarded (tenth mechanical embodiment of the document destruction and discarding apparatus 3).

Since the driving of the conveying roll 60 is stopped in the case where the document must not be destroyed and discarded, it is possible to prevent securely the destruction and discarding of the document that must not be destroyed and discarded (eleventh mechanical embodiment of the document destruction and discarding apparatus 3).

Since the report portion 70 reports that the document must not be destroyed and discarded in the case where the document must not be destroyed and discarded, it is possible to prevent the destruction and discarding of the document that must not be destroyed and discarded (twelfth mechanical embodiment of the document destruction and discarding apparatus 3).

Since the branch gate 45 changes the conveying path of the document to the conveying path where the destruction and discarding of the document is impossible in the case where the document must not be destroyed and discarded, it is possible to prevent the destruction and discarding of the document that must not be destroyed and discarded (thirteenth mechanical embodiment of the document destruction and discarding apparatus 3).

Since the stopper gate 20 intercepts the conveying path of the document to make the destruction and discarding of the document impossible in the case where the document must not be destroyed and discarded, it is possible to prevent the destruction and discarding of the document that must not be destroyed and discarded.

Also, when the user tries to destroy and discard the document, the stopper gate 20 intercepting the conveying path can be recognized visually, or the document is pushed against the stopper gate 20 when the user thrusts the document into the conveying path, whereby the user can recognize that the destruction and discarding of the document is regulated, and feels less incompatible because the document can not be destroyed and discarded (fourteenth mechanical embodiment of the document destruction and discarding apparatus 3).

Since a report indicating that the destruction and discarding of the document is not permitted is displayed on the operation panel 31 (destruction and discarding impossible report means) in the case where the document must not be destroyed and discarded, the user feels less incompatible because the document cannot be destroyed and discarded (first to fourteenth mechanical embodiments of the document destruction and discarding apparatus 3).

Figure 74:
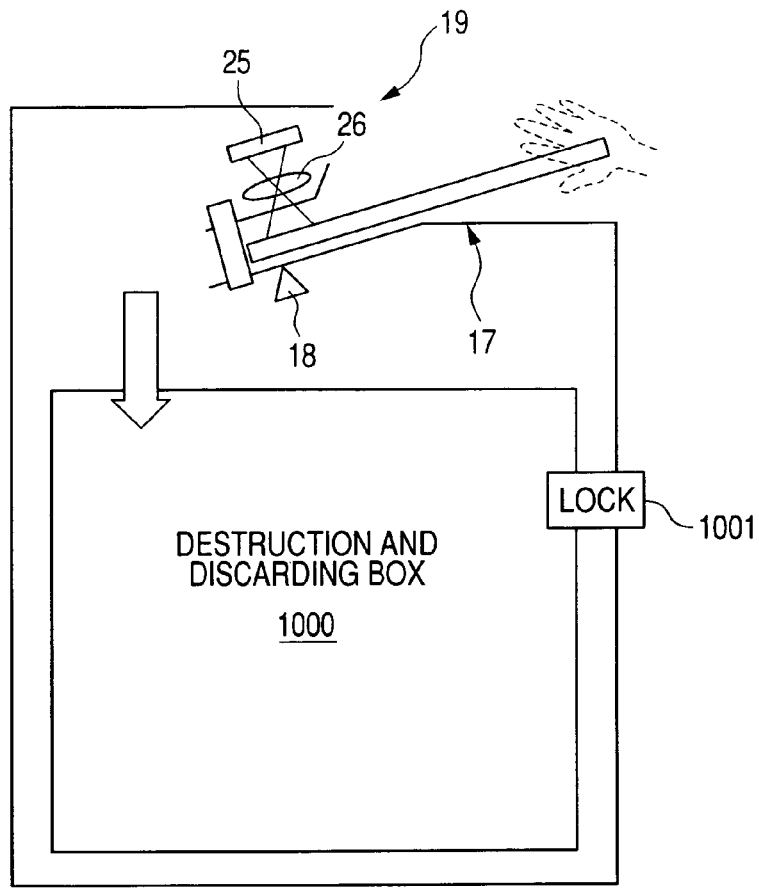
FIG. 74 is a schematic view showing an example in which a destruction and discarding BOX is applied instead of the shredder portion.

In the first to fourteenth mechanical embodiments of the document destruction and discarding apparatus 3 as described above, the shredder portion 24 is not necessarily required, because the destruction and discarding of the document is performed through the shred process (cutting) by the shredder portion 24. That is, a destruction and discarding box 1000 that is managed by fastening a lock 1001 so that the information leakage of the document does not occur may be provided, instead of the shredder portion 24, as shown in FIG. 74. That is, the invention is also applicable in the cases of the dealer making destruction and discarding of the documents accumulated in the destruction and discarding box 1000 not to leak the information at one's risk. That is, in the invention, it is only necessary to have destruction and discarding processing means for destroying and discarding the document not to leak the information.

Also, to determine whether or not the document may be destroyed and discarded, the bar code scanner 19 reads the document ID from the QR code printed on the document, an inquiry for destruction and discarding permission of the document is made to the document management apparatus 2 by designating the read document ID, and if an answer to this inquiry is destruction and discarding permission, the document may be destroyed and discarded, but the invention is not limited thereto.

That is, the document destruction and discarding apparatus 3 transmits the document ID to the document management apparatus 2 connected to the document destruction and discarding apparatus 3 via the document, and the document management apparatus 2 reads the information required to determine whether or not the document may be destroyed and discarded, based on this document ID, and transmits this information to the document destruction and discarding apparatus 3, whereby the document destruction and discarding apparatus may determine whether or not the document may be destruction and discarding based on the transmitted information.

Also, the document destruction and discarding apparatus 3 itself may retrieve and read the information required to determine whether or not the document may be destroyed and discarded via the network 4, and determine it by itself.

In addition, various determination methods may be conceived, but the invention is fundamentally applicable to any constitution as far as whether or not the document may be destroyed and discarded can be determined.

Figure 75:
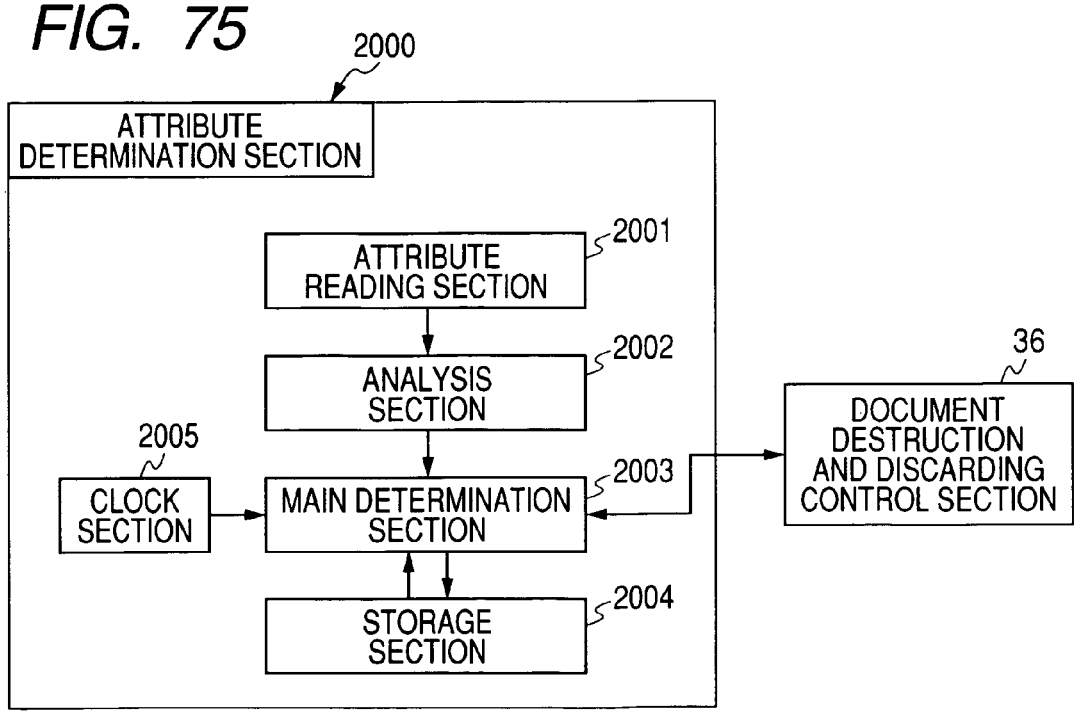
FIG. 75 is a functional block diagram for making the destruction and discarding determination from the attribute information.

Also, the document destruction and discarding apparatus 3 is connected to the network 4, but may not be connected to the network 4. For example, the QR code may contain the information required to determine whether or not the document may be destroyed and discarded, namely, the management information such as period information or amount of money. In this case, an attribute determination section 2000 may be provided as shown in the block diagram of FIG. 75. That is, the attribute determination section 2000 comprises an attribute information reading section 2001 for reading the attribute information, an analysis section 2002 for analyzing the image such as character or bar code read by the attribute information reading section 2001, a storage section 2004 for storing the information (storage period of the document, etc.) analyzed by the analysis section 2002, a clock section 2005 indicating the current clock, and a determination section 2003 for determining whether the document may be destroyed and discarded from the current time and the storage period, in which the determination section 2003 can determine whether or not the document may be destroyed and discarded by comparing the period information read from the QR code and the clock section 2005. This attribute determination section 2000 is adaptable to the first to fourteenth mechanical embodiments of the document destruction and discarding apparatus 3.

Also, in the invention, the document is managed according to the period associated with the document ID, but the invention is not limited to the management of the period. For example, whether or not the document may be destroyed and discarded is judged based on the amount of money in the application for payment, approver, creator who creates the document, and various conditions (management information).

Particularly, the original has the storage period fixed according to the amount of money, and some originals must not be destroyed and discarded according to the amount of money. Accordingly, it is beneficial to determine whether or not the document may be destroyed and discarded depending on the conditions such as the storage period and the amount of money.

While the destruction and discarding object is the document as one form of this embodiment, the invention is not limited to the destruction and discarding object of the document, but may be adaptable to various recording media such as CD and DVD.

Also, while the QR code printed on the document is employed to append the information such as document ID (identification number) to the document as one form of this embodiment, the invention is not limited thereto, but the numeral or symbol representing the document ID may be directly printed on the document, or the technique such as watermark or paper fingerprint may be employed. Also, the appendage of the document ID (identification number) to the document is not limited to printing, but the label may be attached or a small RFID storing the document ID (identification number) may be embedded, for example. Also, the information appended to the document (recording medium) is not limited to the document ID, but the paper ID specifying the paper may be appended to the document, in which the paper ID and the document ID may be managed associatively. Also, the management information such as management period may be directly appended to the document (recording medium) by the above technique.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording medium destruction and discarding system for destroying and discarding a recording medium, comprising:
    a registration unit that registers an identification information appended to the recording medium associated with an attribute information of the recording medium;
    a reading unit that reads the identification information appended to the recording medium;
    a determination unit that determines whether or not the recording medium may be destroyed and discarded based on the attribute information registered in the registration unit associated with the identification information read by the reading unit; and
    a destruction and discarding processing unit that performs a destruction and discarding process based on the determination result of the determination unit,
    wherein the attribute information includes a storage period of the recording medium,
    the registration unit determines the storage period on the basis of a money amount concerning the recording medium and registers the determined storage period as the attribute information of the recording medium, and
    the determination unit determines whether or not the recording medium may be destroyed and discarded based on the storage period registered by the registration unit.

2. The recording medium destruction and discarding system according to claim 1,
    wherein the reading unit reads the identification information from the recording medium manually inserted by a user.

3. The recording medium destruction and discarding system according to claim 1, further comprising:
a conveying unit that conveys the recording medium of destruction and discarding object;
wherein the reading unit reads the identification information from the recording medium conveyed to a predetermined position by the conveying unit.

4. The recording medium destruction and discarding system according to claim 1, further comprising:
a gate portion that stops the recording medium at a predetermined position at the time of inserting the recording medium of destruction and discarding object.

5. The recording medium destruction and discarding system according to claim 1, further comprising:
an insert sensor that senses that the recording medium is inserted at a position where the identification information can be read.

6. The recording medium destruction and discarding system according to claim 1,
wherein the identification information includes a document ID.

7. The recording medium destruction and discarding system according to claim 1,
wherein the recording medium includes a document.

8. The recording medium destruction and discarding system according to claim 1, further comprising:
a notification unit that notifies a user that the destruction and discarding of the recording medium is permitted, when the determination result indicates that the recording medium may be destroyed and discarded.

9. The recording medium destruction and discarding system according to claim 8,
wherein the notification unit displays a guide message.

10. The recording medium destruction and discarding system according to claim 1, further comprising:
a notification unit that notifies a user that the destruction and discarding of the recording medium is not permitted, when the determination result does not indicate that the recording medium may be destroyed and discarded.

11. The recording medium destruction and discarding system according to claim 10,
wherein the notification unit displays a guide message.

12. The recording medium destruction and discarding system according to claim 1,
wherein the registration unit registers a generation history information associated with the identification information, the generation history information including a recording medium generation date and time by a recording medium generation apparatus for generating the recording medium.

13. The recording medium destruction and discarding system according to claim 1,
wherein the registration unit registers a recording medium destruction and discarding date and time as the destruction and discarding history information.

14. The recording medium destruction and discarding system according to claim 1, further comprising:
a recording medium destruction and discarding unit, a destruction and discarding apparatus user authentication unit, and a recording medium destruction and discarding control unit.

15. The recording medium destruction and discarding system according to claim 1, further comprising:
a transmitting unit that transmits the identification information associated with a user authentication information to an external apparatus.

16. The recording medium destruction and discarding system according to claim 15,
wherein the recording medium destruction and discarding unit is activated in accordance with a destruction and discarding instruction from the external apparatus.

17. The recording medium destruction and discarding system according to claim 1, further comprising:
a display unit capable of changing the display contents in accordance with an instruction from the external apparatus.

18. The recording medium destruction and discarding system according to claim 1, further comprising:
a sensing unit that senses that the recording medium is destroyed and discarded; and
a transmitting unit that transmits the sensed result to the external apparatus.

19. The recording medium destruction and discarding system according to claim 18,
wherein the transmitting unit transmits the sensed result associated with the identification information to the external apparatus.

20. The recording medium destruction and discarding system according to claim 1, further comprising:
a mode selection unit that selects any one of a first destruction and discarding mode and a second destruction and discarding mode; and
an execution unit that performs the destruction and discarding process for the recording medium in accordance with a destruction and discarding mode selected by the mode selection unit;
wherein the first destruction and discarding mode includes performing a destruction and discarding process for the recording medium without reading the identification information of the recording medium; and
the second destruction and discarding mode includes:
reading the identification information of the recording medium of destruction and discarding object,
inquiring whether or not the recording medium may be destroyed and discarded by designating the read identification information, and
performing the destruction and discarding process for the recording medium if the determination result indicates that the recording medium may be destroyed and discarded.

21. The recording medium destruction and discarding system according to claim 20,
wherein the destruction and discarding processing unit makes a communication establishment request to the registration unit at a predetermined timing; and
the mode selection unit selects the destruction and discarding mode depending on whether or not the communication establishment with the registration unit is successful.

22. The recording medium destruction and discarding system according to claim 20,
wherein the mode selection unit selects the destruction and discarding mode in accordance with a switching instruction of the destruction and discarding mode when the switching instruction is issued from a user.

23. The recording medium destruction and discarding system according to claim 20,
wherein the mode selection unit selects the first destruction and discarding mode when the communication establishment with the registration unit is unsuccessful.

24. The recording medium destruction and discarding system according to claim 20, wherein the mode selection unit selects the second destruction and discarding mode when the communication establishment with the registration unit is successful.

25. The recording medium destruction and discarding system according to claim 1,
wherein the destruction and discarding processing unit further comprises: an apparatus main body including a shredder portion for performing the destruction and discarding process for the recording medium, and a scan unit detachably mounted on the apparatus main body and including a reading unit that reads the identification information from the recording medium.

26. The recording medium destruction and discarding system according to claim 25,
wherein the scan unit further comprises a gate portion that stops the recording medium at a predetermined position at the time of inserting the recording medium, and a float prevention unit that prevents the recording medium from floating at the predetermined position;
wherein the reading unit reads the identification information from the recording medium stopped at the predetermined position by the gate portion.

27. The recording medium destruction and discarding system according to claim 25,
wherein the scan unit further comprises a recording medium uptake chute that corrects a turn-up of the recording medium, the recording medium uptake chute including a guide plane disposed on an upper part of a recording medium insertion opening into which the recording medium of is inserted.

28. The recording medium destruction and discarding system according to claim 27,
wherein the destruction and discarding processing unit further comprises a cutting unit that cuts the recording medium, when the determination result indicates that the recording medium may be destroyed and discarded.

29. The recording medium destruction and discarding system according to claim 1,
wherein the destruction and discarding processing unit performs the destruction and discarding process for the recording medium, when the determination result indicates that the recording medium may be destroyed and discarded.

30. The recording medium destruction and discarding system according to claim 29,
wherein the destruction and discarding processing unit further comprises a conveying unit that conveys the recording medium so that the recording medium may be destroyed and discarded, when the determination result indicates that the recording medium may be destroyed and discarded.

31. The recording medium destruction and discarding system according to claim 29,
wherein the destruction and discarding processing unit further comprises a destruction and discarding reporting unit that reports a user that the recording medium is to be destroyed and discarded, when the determination result indicates that the recording medium may be destroyed and discarded.

32. The recording medium destruction and discarding system according to claim 29,
wherein the destruction and discarding processing unit further comprises a regulation unit that regulates the destruction and discarding of the recording medium; and
a regulation by the regulation unit is released when the determination result indicates that the recording medium may be destroyed and discarded.

33. The recording medium destruction and discarding system according to claim 32,
wherein the regulation unit includes a path change unit that changes a conveying path of the recording medium.

34. The recording medium destruction and discarding system according to claim 32,
wherein the regulation unit includes a gate portion that bars a conveying path of the recording medium.

35. The recording medium destruction and discarding system according to claim 34,
wherein the gate portion bars the conveying path of the recording medium vertically, and opens the barred conveying path by moving from a lower position to an upper position.

36. The recording medium destruction and discarding system according to claim 35,
wherein a lower end part of the gate portion is located downward beyond a slide face of the recording medium on the conveying path when the gate portion is at the lower position.

37. The recording medium destruction and discarding system according to claim 1,
wherein the destruction and discarding processing unit further comprises a regulation unit that regulates the destruction and discarding of the recording medium; and
the regulation unit regulates the destruction and discarding when the determination result indicates that the recording medium must not be destroyed and discarded.

38. The recording medium destruction and discarding system according to claim 37,
wherein the regulation unit further comprises a cutting stop unit that stops a driving of a cutting unit for cutting the recording medium, when the determination result indicates that the recording medium must not be destroyed and discarded.

39. The recording medium destruction and discarding system according to claim 37,
wherein the regulation unit further comprises a conveying stop unit that stops a driving of a conveying unit for conveying the recording medium, when the determination result indicates that the recording medium must not be destroyed and discarded.

40. The recording medium destruction and discarding system according to claim 37,
wherein the regulation unit further comprises a regulation reporting unit that reports a user that the recording medium must not be conveyed, when the determination result indicates that the recording medium must not be destroyed and discarded.

41. The recording medium destruction and discarding system according to claim 37,
wherein the regulation unit further comprises a regulation path change unit that changes the conveying path of the recording medium so that the recording medium is not destroyed and discarded, when the determination result indicates that the recording medium must not be destroyed and discarded.

42. The recording medium destruction and discarding system according to claim 37,
wherein the regulation unit further comprises a regulation gate portion that bars a conveying path of the recording medium so that the recording medium is not destroyed and discarded, when the determination result indicates that the recording medium must not be destroyed and discarded.

43. A recording medium destruction and discarding method for destroying and discarding a recording medium of destruction and discarding object, the method comprising:
- registering an identification information appended to the recording medium associated with an attribute information of the recording medium;
- reading the identification information appended to the recording medium;
- determining whether or not the recording medium may be destroyed and discarded based on the attribute information registered at the registering step associated with the identification information read at the reading step; and
- performing a destruction and discarding process based on the determination result obtained at the determining step,
- wherein the attribute information includes a storage period of the recording medium,
- the registration unit determines the storage period on the basis of a money amount concerning the recording medium and registers the determined storage period as the attribute information of the recording medium, and
- the determination unit determines whether or not the recording medium may be destroyed and discarded based on the storage period registered by the registration unit.

44. A recording medium destruction and discarding system for destroying and discarding a recording medium, comprising:
- means for registering an identification information appended to the recording medium associated with an attribute information of the recording medium;
- means for reading the identification information appended to the recording medium;
- means for determining whether or not the recording medium may be destroyed and discarded based on the attribute information associated with the identification information; and
- means for performing a destruction and discarding process based on the determination result,
- wherein the attribute information includes a storage period of the recording medium,
- the registration unit determines the storage period on the basis of a money amount concerning the recording medium and registers the determined storage period as the attribute information of the recording medium, and
- the determination unit determines whether or not the recording medium may be destroyed and discarded based on the storage period registered by the registration unit.

* * * * *